(12) United States Patent
Tanaka et al.

(10) Patent No.: US 7,209,514 B2
(45) Date of Patent: Apr. 24, 2007

(54) GPS RECEIVING APPARATUS AND GPS SATELLITE SIGNAL RECEIVING METHOD

(75) Inventors: Katsuyuki Tanaka, Kanagawa (JP); Jason Sanmiya, Tokyo (JP); Masayuki Takada, Tokyo (JP); Hideki Takahashi, Kanagawa (JP); Koichiro Teranishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 767 days.

(21) Appl. No.: 10/373,550

(22) Filed: Feb. 25, 2003

(65) Prior Publication Data

US 2003/0231704 A1 Dec. 18, 2003

(30) Foreign Application Priority Data

Feb. 27, 2002 (JP) ............................. 2002-051808

(51) Int. Cl.
*H04B 1/00* (2006.01)
(52) U.S. Cl. ...................... 375/150; 375/147; 375/148; 375/149; 375/130
(58) Field of Classification Search ........ 375/147–150, 375/130, 134, 137, 142, 146, 346; 342/357.12, 342/357.06, 357.03, 357.08, 357.1, 357.15, 342/357.09, 357.13, 357.16
See application file for complete search history.

(56) References Cited

U.S. PATENT DOCUMENTS 4,998,111 A * 3/1991 Ma et al. .................... 342/352
5,101,416 A * 3/1992 Fenton et al. ............... 375/150
5,329,549 A * 7/1994 Kawasaki ................... 375/150
5,410,750 A * 4/1995 Cantwell et al. ............ 455/306
6,151,353 A * 11/2000 Harrison et al. ............ 375/136
6,249,253 B1 * 6/2001 Nielsen et al. .............. 342/463
6,429,812 B1 * 8/2002 Hoffberg ................. 342/357.1

FOREIGN PATENT DOCUMENTS

| EP | 0 488 739 | 6/1992 |
|---|---|---|
| EP | 0 718 998 | 6/1996 |
| WO | WO 01 86318 | 11/2001 |
| WO | WO 02 13476 | 2/2002 |

* cited by examiner

*Primary Examiner*—Jean B. Corrielus
*Assistant Examiner*—Nader Bolourchi
(74) *Attorney, Agent, or Firm*—Frommer Lawrence & Haug LLP; William S. Frommer; Thomas F. Presson

(57) ABSTRACT

Disclosed is a GPS receiving apparatus including a synchronous acquisition unit and a synchronous hold unit. The synchronous acquisition unit detects a correlation between a spread code of a received signal from a GPS satellite and a spread code provided by the apparatus in order to detect a phase of the spread code of the received signal and a carrier frequency of the received signal. The synchronous hold unit has a plurality of channels and allocates one of the channels to one of a plurality of GPS satellites. The synchronous hold unit also establishes initial values based on the spread code phase of the received signal following detection by the synchronous acquisition unit as well as on the likewise-detected carrier frequency of the received signal, before starting synchronous hold of the spread code and the carrier frequency regarding the signal from the GPS satellite in question while decoding the signal from the GPS satellite.

38 Claims, 38 Drawing Sheets

F I G. 9
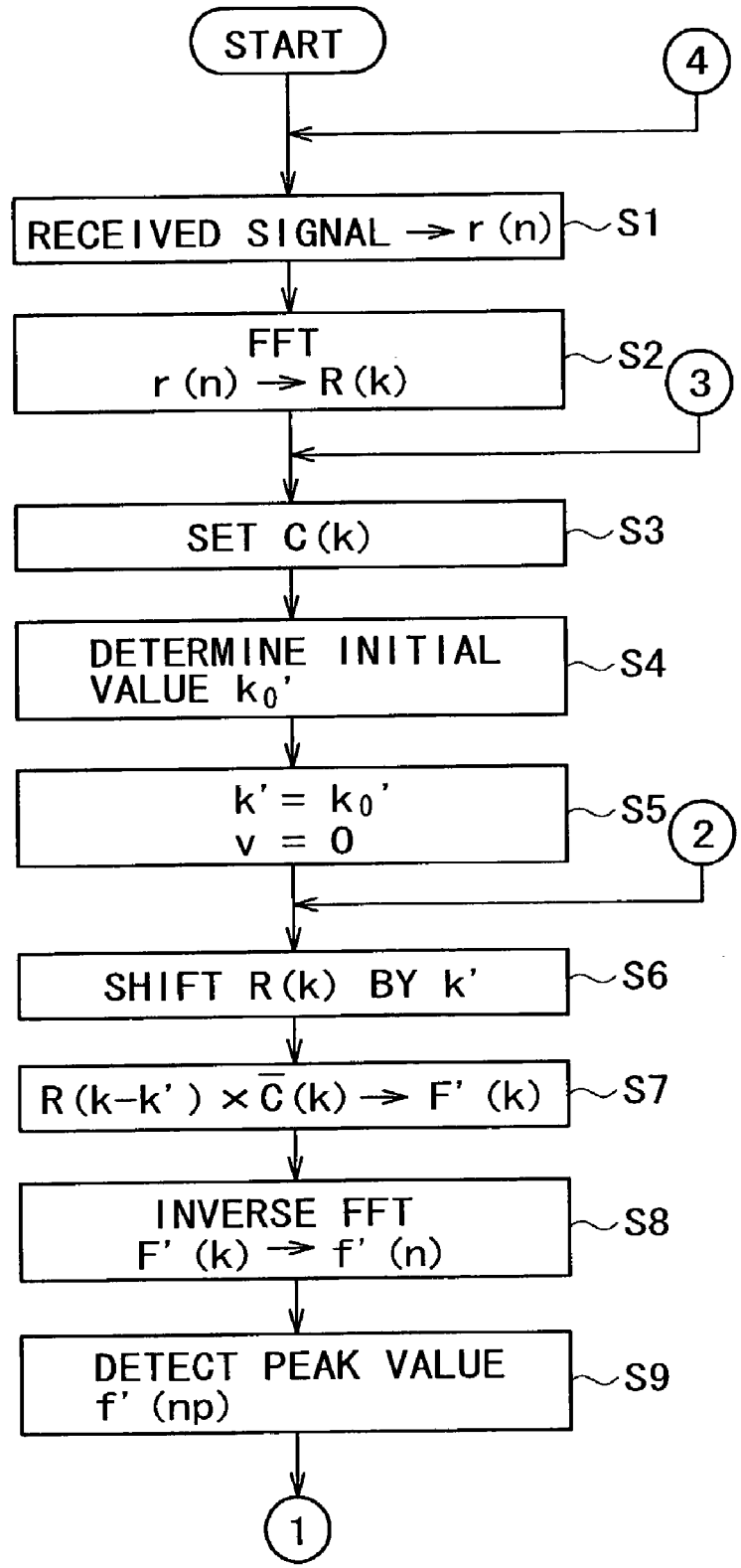

F I G. 1 9
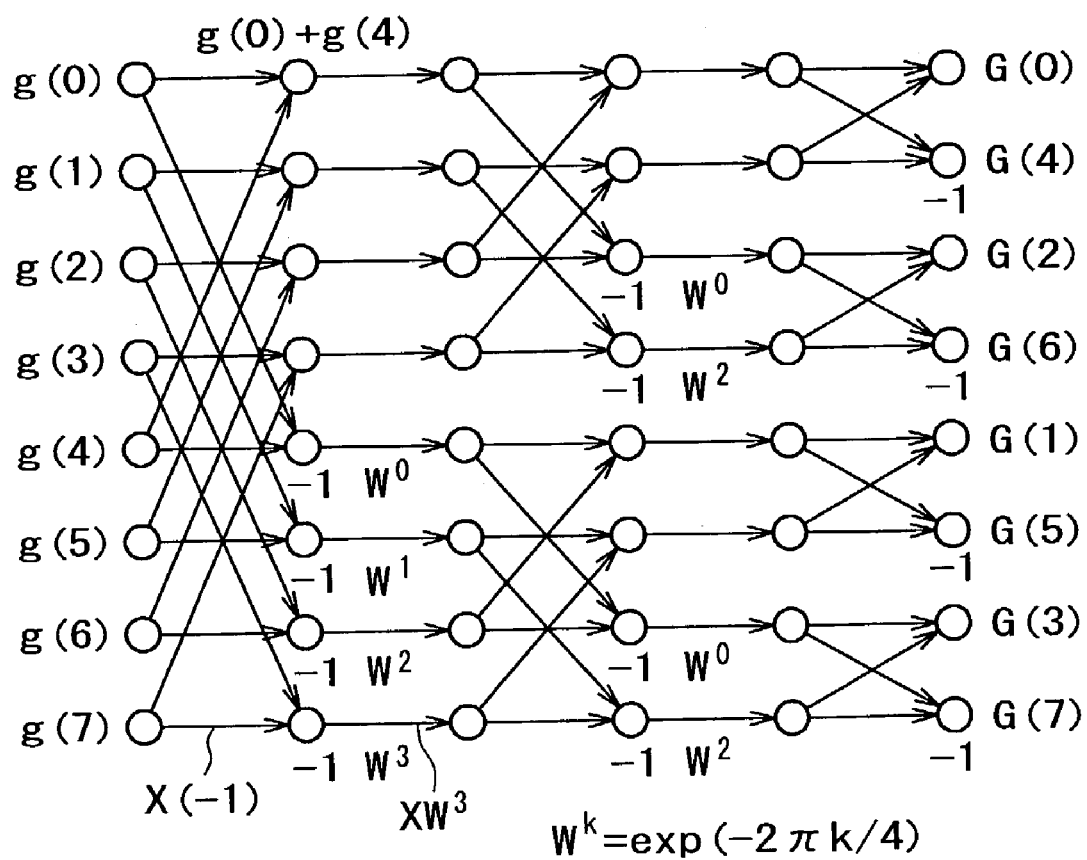

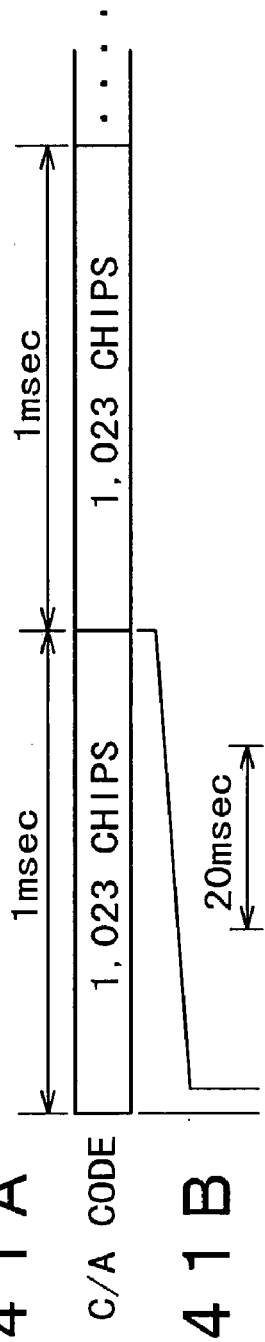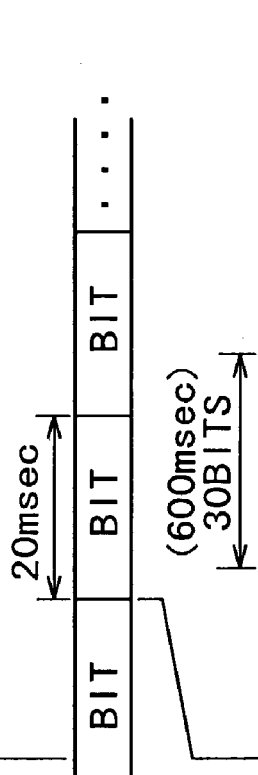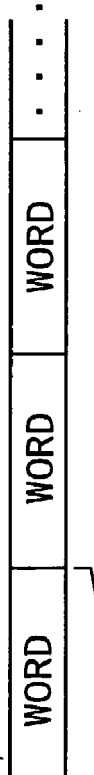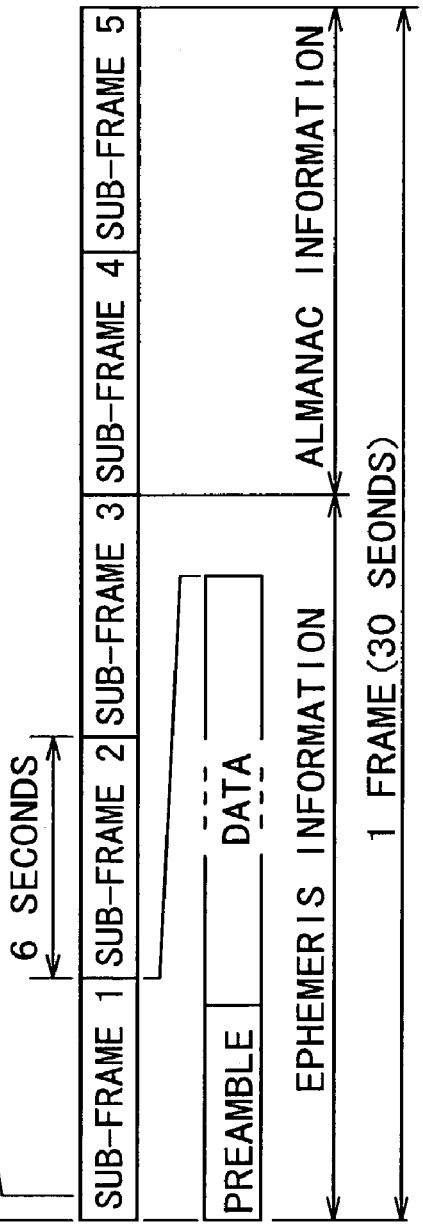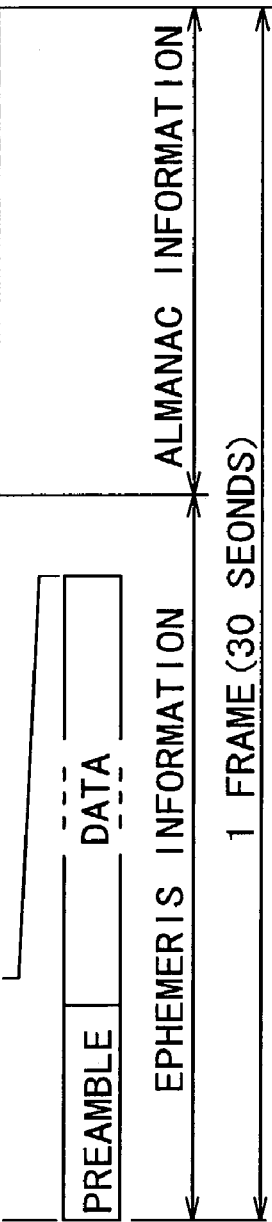

FIG. 43

[EXPRESSION (1)]

$$F[r(n) * c(n)] \iff F(k) = R(k)C(k)$$

[EXPRESSION (2)]

$$F(k) = R(k)\overline{C}(k) \quad \text{(WHERE DASH OVER THE LETTER SIGNIFIES COMPLEX CONJUGATE)}$$

[EXPRESSION (3)]

$$r(n) = A \cdot d(n) \cdot c(n) \cos 2\pi n \cdot f_0 + n(n)$$

[EXPRESSION (4)]

$$F[r(n) \cdot \exp(j2\pi n f_0 + \Phi_0)] = \exp(j\Phi_0) R(k - k_0)$$

[EXPRESSION (5)]

$$F'(k) = R(k - k_0)\overline{C}(k)$$

[EXPRESSION (6)]

$$|f'(n)| = \sqrt{f_R'(n)^2 + f_I'(n)^2}$$

[EXPRESSION (7)]

$$\Phi = \tan^{-1}(f_I'(n) / f_R'(n))$$

[EXPRESSION (8)]

$$F'(k) = R(kM - k')\overline{C}(k) = R(kM - k_0)\overline{C}(k)$$

GPS RECEIVING APPARATUS AND GPS SATELLITE SIGNAL RECEIVING METHOD

BACKGROUND OF THE INVENTION

The present invention relates to a GPS (Global Positioning System) receiving apparatus. More particularly, the invention relates to an apparatus and a method for synchronously acquiring and holding the spread code and carrier wave regarding signals received from GPS satellites.

In a GPS setup for measuring the position of a moving object by use of artificial satellites (GPS satellites), the basic function of a GPS receiving apparatus on board the object involves receiving signals from at least four GPS satellites, computing the position of the apparatus based on the received signals, and informing a user of the computed position.

In operation, the GPS receiving apparatus first decodes signals received from the GPS satellites (the signals are called the GPS satellite signals hereunder) to acquire orbit data about each GPS satellite. The GPS receiving apparatus then acquires its own three-dimensional position based on orbit and time information from the GPS satellites as well as on delay times of the GPS satellite signals using simultaneous equations. The signals from as many as four GPS satellites are needed for positioning computation because errors detected as differences between the internal time of the GPS receiving apparatus and the time of each satellite must be inhibited from aversely affecting the computation.

Civilian-use GPS receiving apparatuses perform their positioning computation by receiving spread spectrum signal waves called C/A (Clear and Acquisition) code on an L1 band from GPS satellites (of NAVSTAR).

The C/A code is a signal obtained by modulating a 1575.42-MHz carrier wave (called carrier hereunder) in BPSK (Binary Phase Shift Keying) using a PN (pseudorandom noise) series code such as Gold code having a chip rate of 1.023 MHz and a code length of 1,023 chips with 50-bps data spread therein. With its code length of 1,023 chips, the C/A code is a PN series code repeated at a rate of 1,023 chips per cycle (thus one cycle=1 millisecond), as shown in FIG. 41A.

The PN series code (spread code) used as the C/A code varies from one GPS satellite to another. The GPS receiving apparatus detects beforehand which GPS satellite uses what kind of PN series code. Navigation messages, to be discussed later, allow the GPS receiving apparatus to determine from which GPS satellites signals can be received in the present apparatus position at the present point in time. This makes it possible for the GPS receiving apparatus in a 3D positioning process to receive radio waves from at least four GPS satellites that can be acquired from where the apparatus is currently located. Upon receipt of the radio waves from the satellites, the GPS receiving apparatus performs spread spectrum decoding and positioning computation to find the current position of the apparatus.

As shown in FIG. 41B, 1 bit of satellite signal data (navigation message data) is transmitted in 20 periods of the PN series code. In other words, the satellite signal data are transmitted in increments of 20 milliseconds or at a rate of 50 bps. One period of the PN series code corresponds to 1,023 chips that are inverted depending on the bit being "1" or "0."

In the GPS setup, as shown in FIG. 41C, one word is made up of 30 bits (in 600 milliseconds). Ten words constitute one sub-frame (6 seconds) as depicted in FIG. 41D. As illustrated in FIG. 41E, the first word of one sub-frame has a preamble inserted therein which maintains a predetermined bit pattern regardless of the data being updated. The preamble is followed by transmitted data.

Five sub-frames make up one frame (30 seconds). Navigation message data are transmitted in increments of frames. The first three sub-frames in one frame constitute satellite-specific orbit information called ephemeris information. Ephemeris information is transmitted repeatedly, i.e., in increments of main frames (at intervals of 30 seconds). This information includes parameters by which to obtain the orbit of the satellite sending the information, and a signal transmission timestamp from the satellite.

The second word in the three sub-frames that make up the ephemeris information includes time data called a week number and TOW (time of week). The week number is information that is incremented weekly starting from Jan. 6 (Sunday), 1980 taken as week zero. TOW is time information that is incremented in units of six seconds starting from 00:00 on Sunday (i.e., incremented at intervals of sub-frames).

All GPS satellites have an atomic clock each and operate on common time information. Signal transmission timestamps from the GPS satellites are synchronized with their atomic clocks. Based on the two pieces of time information received (week number and TOW), the GPS receiving apparatus obtains an absolute time. In synchronizing with and locking onto radio wave transmissions from a satellite, the GPS receiving apparatus synchronizes its own time data shorter than six seconds with the time of that satellite within an accuracy specific to a reference oscillator incorporated in the GPS receiving apparatus.

The PN series code of each GPS satellite is generated in synchronism with its atomic clock. The ephemeris information from a given GPS satellite allows the GPS receiving apparatus to acquire the position and speed of that satellite which are used in positioning computation.

Ephemeris information constitutes a highly accurate calendar that is updated with relatively high frequency under control of ground-based control stations. The GPS receiving apparatus keeps the ephemeris information in a memory for use in positioning computation. Because of its inherent accuracy level, the ephemeris information obtained at a given point in time generally has a useful life of about two hours. Under the life time constraint, the GPS receiving apparatus monitors the elapse of time starting from the time that the ephemeris information is placed into the memory. When the useful life is judged to have elapsed, the GPS receiving apparatus updates the ephemeris information in the memory.

It takes at least 18 seconds (3 sub-frames) for the GPS receiving apparatus to acquire new ephemeris information and substitute the obtained information for what is currently held in the memory. If data are obtained halfway through a sub-frame period, a total of 30 seconds is required for the update.

The navigation message constituted by the remaining two sub-frames in the one-frame data is called almanac information that is transmitted commonly from all GPS satellites. A total of 25 frames of almanac information is needed to acquire all necessary information. Almanac information includes an approximate position and availability of each of the GPS satellites.

Almanac information is updated at intervals of several days under control of ground-based control stations. The GPS receiving apparatus can use almanac information for its operations by retaining it in the memory. The stored almanac information is considered to have a useful life of several months. Generally, the GPS receiving apparatus acquires new almanac information from a GPS satellite at intervals of a few months and substitutes the newly obtained information for what is retained in the memory. The almanac information kept in the memory allows the GPS receiving apparatus to compute channels to which to allocate satellites upon power-up.

When the GPS receiving apparatus is to obtain the above-described data upon receipt of GPS satellite signals, it is necessary for the apparatus to prepare in advance and utilize the same PN series code as the C/A code employed by each GPS satellite whose signal is to be received (the PN series code is called the PN code hereunder). In operation, the GPS receiving apparatus performs phase synchronization with the C/A code to acquire the signal from a given GPS satellite and subject what is acquired to spread spectrum decoding. After successful phase synchronization with the C/A code and following spread spectrum decoding, the GPS receiving apparatus can detect bits and a navigation message including time information from the GPS satellite signal.

A GPS satellite signal is acquired by making a search for phase synchronization with the C/A code. In the phase synchronization search, the GPS receiving apparatus detects a correlation between its own PN code and that of the signal received from the GPS satellite in question. If the detected correlation value is judged to be greater than a predetermined value, the two PN codes are considered to be in synchronism. If phase synchronization is not judged obtained, a suitable synchronizing technique is used to control the phase of the PN code on the side of the GPS receiving apparatus so as to achieve synchronism with the PN code of the received signal.

As discussed above, each GPS satellite signal is a signal furnished by modulating a carrier through BPSK with a signal involving spread code data. For this reason, the GPS receiving apparatus attempting to receive the signal from a given GPS satellite needs to gain synchronism not only with the spread code but also with the carrier and data. However, it is impossible to achieve synchronization independently with the spread code and with the carrier.

Generally, the GPS receiving apparatus converts the carrier frequency of a received satellite signal into an intermediate frequency of several MHz or less in order to use the intermediate frequency signal in the synchronous detection process above. The carrier of the intermediate frequency signal contains two kinds of error: a frequency error due to a Doppler shift proportionate to the moving speed of the GPS satellite in question, and a frequency error attributable to local oscillator deviations inside the GPS receiving apparatus.

These frequency errors render the carrier frequency of the intermediate frequency signal unpredictable. Hence the need for a frequency search. A synchronization point (synchronization phase) in one spread code period is contingent on the positional relation between the GPS receiving apparatus and the GPS satellite of interest and is thus unpredictable. This requires putting some suitable synchronizing technique in place, as mentioned above.

Conventional GPS receiving apparatuses detect synchronization with the carrier and spread code using sliding correlation involving a frequency search. At the same time, the receiving apparatuses to date use DLL (delay locked loop) and Costas loop arrangements for synchronous acquisition and synchronous hold. These capabilities will be explained further below.

A clock signal for driving a PN code generator in the GPS receiving apparatus is generally obtained by dividing the output of a reference frequency oscillator incorporated in the apparatus. The reference frequency oscillator is typically constituted by a highly accurate crystal oscillator. Out of the output from the reference frequency oscillator, a locally oscillated signal is generated for use in converting the received signal from a given GPS satellite into an intermediate frequency signal.

FIG. 42 is an explanatory view of the above-mentioned frequency search. If the clock signal for driving the PN code generator in the GPS receiving apparatus has a frequency f1, a phase locked search for the PN code is carried out. That is, while the PN code phase is being shifted one chip at a time, a correlation is detected between the received GPS signal in each chip phase and the PN code. This permits detection of peak correlation values, whereby the phase enabling PN code synchronization (spread code phase) is detected.

If no synchronous phase is detected for each of 1,023 chips where the clock signal has the frequency f1, that means carrier frequency synchronization is not obtained. In such a case, the dividing ratio of the reference frequency oscillator is illustratively varied so as to switch the driving clock signal to a different frequency f2. A phase search is then carried out similarly for each of 1,023 chips. The frequency of the driving clock signal is switched in stepped fashion as indicated in FIG. 42 for repeated searches. This is how the frequency search is implemented.

If the frequency of a synchronous driving clock signal is detected during the frequency search, the detected clock frequency is used for a final synchronous acquisition of the PN code. A carrier frequency is detected from the clock frequency. This allows the GPS receiving apparatus to acquire a given satellite signal despite deviations of the oscillation frequency from the internal crystal frequency oscillator.

There is a drawback to the above conventional method for performing synchronous acquisition and synchronous hold simultaneously regarding the carrier and spread code using sliding correlation with a frequency search and DLL (delay locked loop) and Costas loop arrangements. That is, the technique of sliding correlation with a frequency search is theoretically unfit for high-speed synchronization as discussed above. Thus it takes time to achieve spread code and carrier synchronization. The prolonged process of carrier and spread code synchronization results in a slower response of the GPS receiving apparatus inconveniencing the user in practice.

In order to overcome the drawback above, actual GPS receiving apparatuses to date are required to adopt a multi-channel approach in implementing parallel searches for synchronization points. Allocating a large number of channels based on the conventional method can make the GPS receiving apparatus more complex structurally and more costly. The multi-channel scheme with parallel searches for synchronization points dissipates more power. A power-hungry feature can be a serious disadvantage especially in portable GPS receivers.

With the conventional method in place, synchronous acquisition and synchronous hold of the spread code and carrier are implemented integrally with sliding correlation involving a frequency search and with DLL (delay locked loop) and Costas loop arrangements. It follows that if the signal from a given GPS satellite is lost, synchronous acquisition and synchronous hold must be again carried out integrally, which can be a time-consuming process.

Furthermore, because the conventional method involves carrying out synchronous acquisition and synchronous hold of the spread code and carrier in integral relation with sliding correlation entailing a frequency search and with DLL (delay locked loop) and Costas loop arrangements, any attempt to raise the sensitivity of the GPS receiving apparatus would in theory prolong the processing time appreciably for synchronous acquisition and synchronous hold. Bypassing this bottleneck has turned out to be more difficult than expected.

It is therefore an object of the present invention to provide a GPS receiving apparatus and a GPS satellite signal receiving method for raising the speed of synchronous acquisition and synchronous hold of GPS satellite signals while boosting the sensitivity of the apparatus with ease.

SUMMARY OF THE INVENTION

According to the first aspect of the present invention, there is provided a global positioning system receiving apparatus including:

a synchronous acquisition unit which detects a correlation between a spread code of a received signal from a global positioning system satellite and a spread code provided by the apparatus in order to detect a phase of the spread code of the received signal for synchronous acquisition of the spread code of the received signal, the synchronous acquisition unit further detecting a carrier frequency of the received signal when the spread code of the received signal is acquired synchronously; and a synchronous hold unit which has a plurality of channels and which allocates one of the channels to one of a plurality of global positioning system satellites when a spread code of the received signal from the global positioning system satellite in question is synchronously acquired and a carrier frequency of the received signal from the global positioning system satellite in question is detected, the synchronous hold unit further establishing initial values based on the spread code phase of the received signal following detection by the synchronous acquisition unit as well as on the likewise-detected carrier frequency of the received signal, before starting synchronous hold of the spread code and the carrier frequency regarding the signal from the global positioning system satellite in question while decoding the signal from the global positioning system satellite.

According to the second aspect of the present invention, there is provided a global positioning system receiving apparatus including:

a preprocessing unit which, given a received signal with a carrier modulated by a signal having data spread-spectrum-encoded by a spread code, preprocesses the data that span M periods of the spread code in order to obtain a number of data spanning one period of the spread code, M being at least 2 to the n-th power, n being an integer;

fast Fourier transformation means for performing a fast Fourier transform of the received signal data spanning one period of the spread code following the preprocessing;

a first memory to which to write the result of the fast Fourier transform sent from the fast Fourier transformation means;

a second memory which stores the result of the fast Fourier transform of the spread code used in the received signal;

multiplying means for multiplying the result of the fast Fourier transform retrieved from the first memory, by the result of the fast Fourier transform of the spread code following retrieval from the second memory;

inverse fast Fourier transformation means for performing an inverse fast Fourier transform of the result of the multiplication from the multiplying means in order to output a correlation detected between the received signal and the spread code; and correlation point detecting means for detecting a correlation point between the received signal and the spread code by searching for a peak of correlation between the received signal and the spread code based on the output of correlation detection from the inverse fast Fourier transformation means.

According to the third aspect of the present invention, there is provided a global positioning system satellite signal receiving method including the steps of:

performing synchronous acquisition by detecting a correlation between a spread code of a received signal from a global positioning system satellite and a spread code provided by a receiving side in order to detect a phase of the spread code of the received signal for synchronous acquisition of the spread code of the received signal, the synchronous acquisition step further detecting a carrier frequency of the received signal when the spread code of the received signal is acquired synchronously; and performing synchronous hold by allocating one of a plurality of channels to any one of a plurality of global positioning system satellites when a spread code of the received signal from the global positioning system satellite in question is synchronously acquired and a carrier frequency of the received signal from the global positioning system satellite in question is detected, the synchronous hold step further establishing initial values based on the spread code phase of the received signal following detection in the synchronous acquisition step as well as on the likewise-detected carrier frequency of the received signal, before starting synchronous hold of the spread code and the carrier frequency regarding the signal from the global positioning system satellite in question while decoding the signal from the global positioning system satellite.

According to the fourth aspect of the present invention, there is provided a global positioning system satellite signal receiving method including the steps of:

given a received signal with a carrier modulated by a signal having data spread-spectrum-encoded by a spread code, preprocessing the data that span M periods of the spread code in order to obtain a number of data spanning one period of the spread code, M being at least 2 to the n-th power, n being an integer;

performing a fast Fourier transform of the received signal data spanning one period of the spread code following the preprocessing;

writing to a first memory the result of the fast Fourier transform sent from the fast Fourier transformation step;

writing to a second memory the result of the fast Fourier transform of the spread code used in the received signal;

multiplying the result of the fast Fourier transform retrieved from the first memory, by the result of the fast Fourier transform of the spread code following retrieval from the second memory;

performing an inverse fast Fourier transform of the result of the multiplication from the multiplying step in order to output a correlation detected between the received signal and the spread code; and detecting a correlation point between the received signal and the spread code by searching for a peak of correlation between the received signal and the spread code based on the output of correlation detection from the inverse fast Fourier transformation step.

Other objects, features and advantages of the present invention will become more apparent in the following specification and accompanying drawings.

BRIEF DESCRIPTION OF THE DRAWINGS

FIG. 9 is a flowchart of steps showing how the second example of the synchronous acquisition method operates;

FIG. 19 is another explanatory view of the fourth example of the synchronous acquisition method;

FIGS. 41A through 41E are schematic views illustrating a typical structure of a signal from a GPS satellite;

FIG. 43 is a view that lists expressions for use with the embodiment of this invention.

DETAILED DESCRIPTION OF THE PREFERRED EMBODIMENTS

Preferred embodiments of the GPS receiving apparatus and GPS satellite receiving method according to the invention will now be described with reference to the accompanying drawings.

[Overall Structure of a GPS Receiving Apparatus Embodying the Invention]

Figure 1:
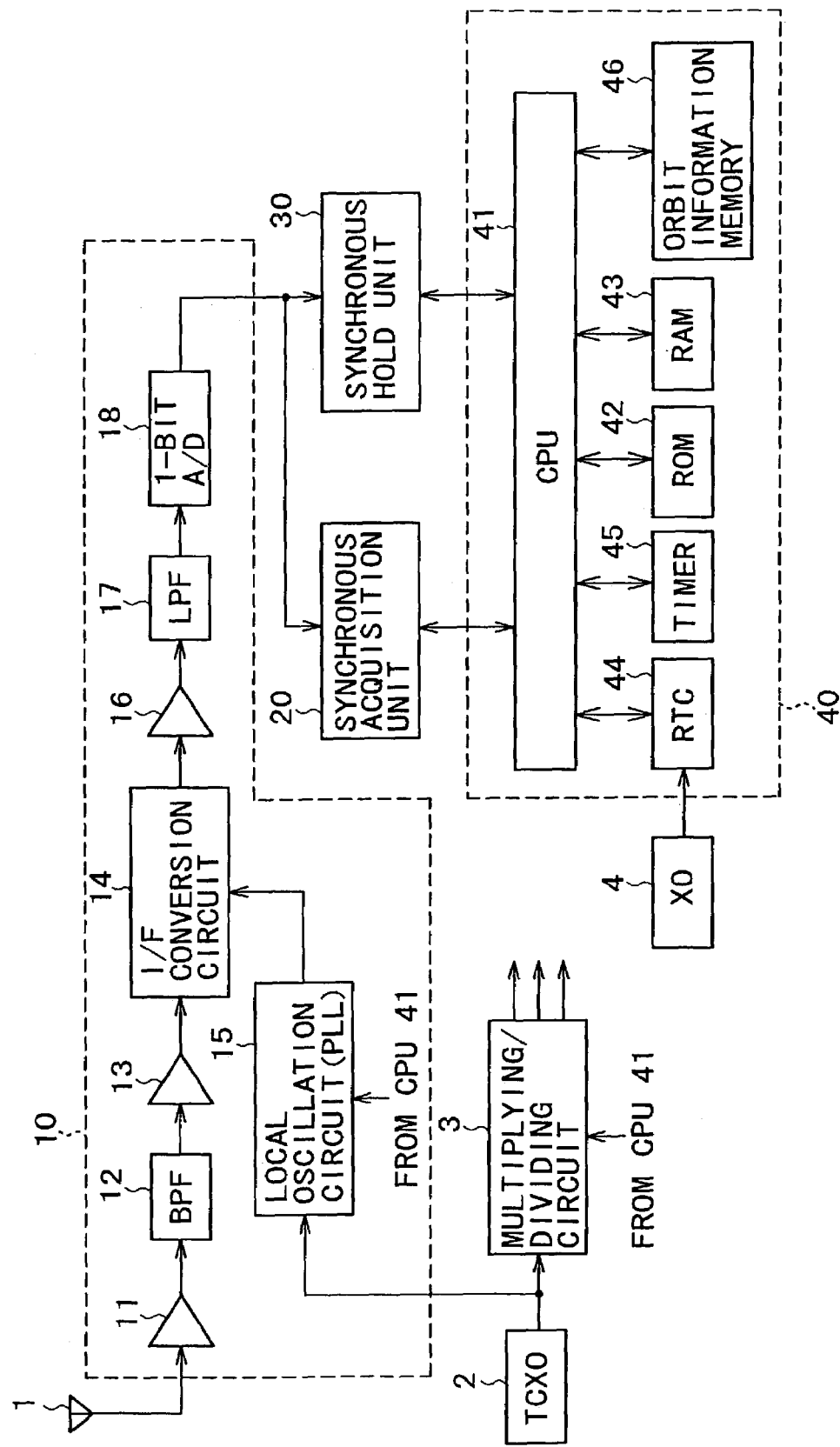
FIG. 1 is a block diagram outlining a typical structure of a GPS receiving apparatus embodying the invention.

FIG. 1 is a block diagram outlining a typical structure of a GPS receiving apparatus embodying the invention. The apparatus includes a frequency conversion unit 10, a synchronous acquisition unit 20, a synchronous hold unit 30, a control unit 40, a GPS antenna 1, a reference oscillation circuit 2 made of a temperature-compensated crystal oscillation circuit; a multiplying/dividing circuit 3, and a crystal oscillation circuit 4.

The control unit 40 has a CPU (central processing unit) 41 connected with a program ROM (read only memory) 42, a work area RAM (random access memory) 43, a real time clock (RTC) 44 for measuring real time, a timer 45, and an orbit information memory 46.

The timer 45 is used for two purposes: to generate various timing signals by which to time the operations of the diverse components, and to provide time reference. The orbit information memory 46 is a nonvolatile memory that accommodates orbit information composed of almanac information and ephemeris information extracted from GPS satellite signals. In the orbit information memory 46, the ephemeris information is updated illustratively at intervals of 2 hours and the almanac information at intervals of several days or several months.

The reference oscillation circuit 2 supplies a reference clock signal to the multiplying/dividing circuit 3 as well as to a local oscillation circuit 15 for frequency conversion in the frequency conversion unit 10, to be described later. The multiplying/dividing circuit 3 multiplies or divides the reference clock signal to generate clock signals that are fed to the synchronous acquisition unit 20, synchronous hold unit 30, and control unit 40. The multiplying/dividing circuit 3 has its multiplying and dividing ratios controlled by the CPU 41 in the control unit 40.

A clock signal from the crystal oscillation circuit 4 is used by the real time clock 44 in the control circuit 40. All components except the real time clock 44 of the control unit 40 utilize the clock signals supplied by the multiplying/dividing circuit 3.

[Structure of the Frequency Conversion Unit 10]

The GPS satellite signal, transmitted from each GPS satellite as described, is formed by a 1575.42-MHz carrier modulated in BPSK with a PN code (spread code) which has a signal transmission rate of 1.023 MHz and a code length of 1,023 chips and which has a code pattern specific to each GPS satellite with 50-bps data spectrum-spread therein (C/A code).

A 1575.42-MHz GPS satellite signal received by the antenna 1 is fed to the frequency conversion unit 10. In the frequency conversion unit 10, the GPS satellite signal from the antenna 1 is amplified by a low-noise amplifier circuit 11 before being sent to a band-pass filter 12 whereby unnecessary bandwidth components are removed. The signal from the band-pass filter 12 is fed to an intermediate frequency conversion circuit 14 through a high-frequency amplifier circuit 13.

The output of the reference oscillation circuit 2 is supplied to the local oscillation circuit 15 operating by the PLL (phase locked loop) synthesizer method. In turn, the local oscillation circuit 15 provides a local oscillation output whose frequency ratio is fixed with regard to the output frequency from the reference oscillation circuit 2. The local oscillation output is fed to the intermediate frequency conversion circuit 14 for low-pass conversion to an intermediate frequency that is easy to process as a signal, such as a 1.023 MHz intermediate frequency signal.

The intermediate frequency signal from the intermediate frequency conversion circuit 14 is amplified by an amplifier circuit 16 and filtered by a low-pass filter 17 before being converted to a 1-bit digital signal (called IF data hereunder) by an A/D converter 18. The IF data are supplied to the synchronous acquisition unit 20 and synchronous hold unit 30.

It should be noted that in this embodiment of the invention, the IF data are sent to the synchronous acquisition unit 20 and synchronous hold unit 30 which are functionally isolated from each other. This setup contrasts manifestly with a conventional synchronous acquisition/hold integrated circuit formed illustratively by sliding correlation and Costas loop plus DLL arrangements.

In this embodiment, the synchronous acquisition unit 20 performs synchronous acquisition of GPS satellite signals. That is, given a GPS satellite signal, the synchronous acquisition unit 20 detects a spread code phase and a frequency of an intermediate frequency signal (called IF carrier frequency hereunder) from that signal. The synchronous hold unit 30 holds synchronously the spread code and IF carrier of each of the GPS satellite signals acquired by the synchronous acquisition unit 20.

[Structures of the Synchronous Acquisition Unit 20 and Synchronous Hold Unit 30]

As will be discussed later, the synchronous acquisition unit 20 of this embodiment places IF data spanning a predetermined period of time and coming from the frequency conversion unit 10 into the memory. With the IF data in the memory, the synchronous acquisition unit 20 computes correlations between the spread code of a given GPS satellite signal and the spread code held by the GPS receiving apparatus corresponding to the spread code of the GPS satellite in question, thereby acquiring a spread code phase synchronously.

Synchronous acquisition of the spread code phase, besides being performed by the sliding correlation technique described above, may be carried out alternatively through the use of a matched filter arrangement. This approach is noted for high-speed synchronous acquisition of spread spectrum signals.

The matched filter may be digitally implemented using a transversal filter arrangement. In recent years, improvements in hardware capabilities exemplified by the advent of DSP (digital signal processors) have combined with a digital matched filter based on fast Fourier transform (called FFT hereunder) to realize a technique of executing spread code synchronization at high speed. The digital matched filter itself, however, does not have the ability to hold spread code synchronization.

Figure 4:
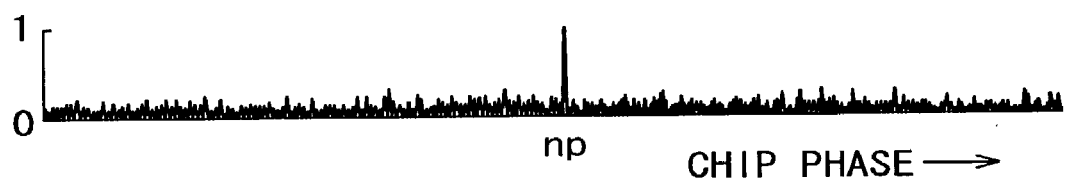
FIG. 4 is a graphic representation of what is gained by a digital matched filter taking correlations of a spread code.

The FFT-based technique above is derived from well-known traditional methods for high-speed correlation computation. If a correlation exists between the spread code on the side of the receiving apparatus and the spread code in the received signal, then a correlation peak is detected as shown in FIG. 4 (to be discussed later) by use of the technique. The peak position represents a first phase of the spread code. Detecting the correlation peak makes it possible to acquire synchronization with the spread code, i.e., to detect the spread code phase in the received signal.

Where the FFT-based technique is in use, the carrier (intermediate frequency) of the received signal is detected together with the spread code phase by computing FFT on a frequency spectrum. The spread code phase is converted to a pseudo distance. If at least four GPS satellites are detected, then the position of the GPS receiving apparatus is computed accordingly. The carrier frequency, when detected, points to a Doppler shift amount which is then used to compute the speed of the GPS receiving apparatus.

As described, this embodiment of the invention performs correlation computations on the spread code using a digital matched filter arrangement based on fast Fourier transform (FFT). With the result of the correlation computation obtained, the embodiment carries out synchronous acquisition at high speed.

The GPS satellite signal received by the antenna 1 may contain signals from a plurality of GPS satellites. The synchronous acquisition unit 20 retains information about the spread codes used by all GPS satellites in orbit. Using the retained information about the spread codes, the synchronous acquisition unit 20 computes correlations with the spread codes of a plurality of GPS satellite signals that are currently acquired by the GPS receiving apparatus. The correlation computations permit synchronous acquisition of the multiple GPS satellite signals.

Depending on which information about the spread codes of the GPS satellites is used for synchronous acquisition, the synchronous acquisition unit 20 determines from which GPS satellites given signals are acquired synchronously. The synchronously acquired GPS satellites are identified illustratively by GPS satellite numbers.

The synchronous acquisition unit 20 transfers four kinds of information to the synchronous hold unit 30: information about the satellite numbers identifying the synchronously acquired GPS satellites; information about the phases of the spread codes detected in synchronous acquisition; IF carrier frequency information; and, as needed, signal strength information constituted by correlation detection signals indicating degrees of correlation.

There are two ways to hand over the detected satellite numbers, spread code phases, IF carrier frequency information, and signal strength information from the synchronous acquisition unit 20 to the synchronous hold unit 30: directly, or by way of the control unit 40.

In the case of direct information transfer, a DSP 23 (see FIG. 2) in the synchronous acquisition unit 20 generates the information to be handed over to the synchronous hold unit 30. Alternatively, a control part formed by a DSP is furnished in the synchronous hold unit 30 so that the control part, given the information from the synchronous acquisition unit 20, generates information that is needed by the synchronous hold unit 30.

In the case of information transfer via the control unit 40, the CPU 41 of the control unit 40 is in charge and controls both the synchronous acquisition unit 20 and the synchronous hold unit 30. This arrangement facilitates spread code phase compensation, to be discussed later, and establishment of diverse synchronization procedures with respect to the status of the synchronous acquisition unit 20 and synchronous hold unit 30.

In the embodiments to be described below, detected satellite numbers, spread code phases, IF carrier frequency information, and signal strength information are assumed to be transferred from the synchronous acquisition unit 20 to the synchronous hold unit 30 by way of the control unit 40.

[Structure of the Synchronous Acquisition Unit 20]

Figure 2:
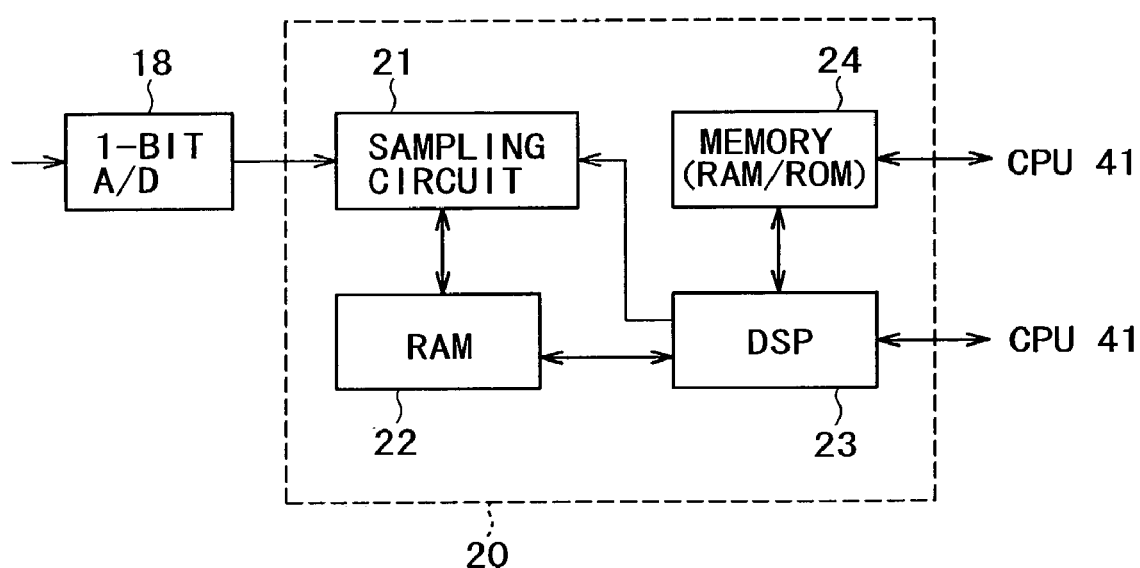
FIG. 2 is a block diagram showing a typical structure of a synchronous acquisition unit as part of the embodiment in FIG. 1.

FIG. 2 is a block diagram showing a typical structure of the synchronous acquisition unit 20. In this structure, the synchronous acquisition unit 20 includes a sampling circuit 21, a data buffer RAM (random access memory) 22, the DSP (digital signal processor) 23, and a memory unit 24 made up of a program ROM (read only memory) and a work area RAM for use by the DSP 23. The DSP 23 and the DSP memory unit 24 are connected to the CPU 41 of the control unit 40.

The sampling circuit 21 samples 1.023-MHz IF data from the frequency conversion unit 10 at a frequency at least twice as high, and writes sampled data to the RAM 22 that has a capacity large enough to accommodate IF data spanning a predetermined period of time. The DSP 23 performs synchronous acquisition in increments of IF data corresponding to the predetermined time period and accommodated by the RAM 22.

In this example, with IF data placed in the RAM 22, the DSP 23 effects high-speed synchronous acquisition of spread codes using a digital matched filter based on fast Fourier transform (FFT). Through the synchronous acquisition, the DSP 23 detects the satellite numbers of synchronously acquired GPS satellites, spread code phases of the synchronously acquired GPS satellite signals, and IF carrier frequencies in the signals.

The sampling frequency of the sampling circuit 21 determines the accuracy of spread code phase detection. According to the sampling theorem, the sampling frequency needs to be at least twice the maximum frequency contained in the IF signal. Preferably, the sampling frequency should be an integral multiple of the IF carrier frequency.

The accuracy of IF carrier frequency detection is determined by the length of time which is defined in advance by the capacity of the RAM 22 and which serves as the increment of processing by the DSP 23. The length of time as the processing increment for the DSP 23 should preferably an integral multiple of one spread code period, or if possible, a multiple of the period by 2 to the n-th power, "n" being an integer, as will be described later.

Suppose that the sampling frequency of the sampling circuit 21 is α times the chip rate of the spread code and that the length of time of IF data to be placed into the RAM 22 is β (β milliseconds) times one period of the spread code. In that case, the DSP 23 performing FFT on the frequency spectrum can detect the spread code phase with a 1/α chip precision and the IF carrier frequency with a 1/β kHz (±½β kHz) precision.

Below is a detailed description of several examples of synchronous acquisition carried out by the DSP 23 using an FFT-based digital matched filter.

[First Example of Synchronous Acquisition by the Digital Matched Filter]

In this example, the sampling frequency of the sampling circuit 21 is 4.096 MHz, approximately four times the chip rate of the spread code. Into the RAM 22 are placed 4,096 sampled data spanning one period (1 millisecond) of the spread code. With the one-millisecond-long data written to the RAM 22, the DSP 23 computes through FFT the correlations between the spread codes of GPS satellite signals and those of the GPS receiving apparatus for synchronous acquisition. Since one spread code period corresponds to 1,023 chips, the spread code phase can be detected with a ¼-chip precision. The accuracy of IF carrier frequency detection is 1 kHz because FFT processing in increments of 1 millisecond is implemented.

Figure 3:
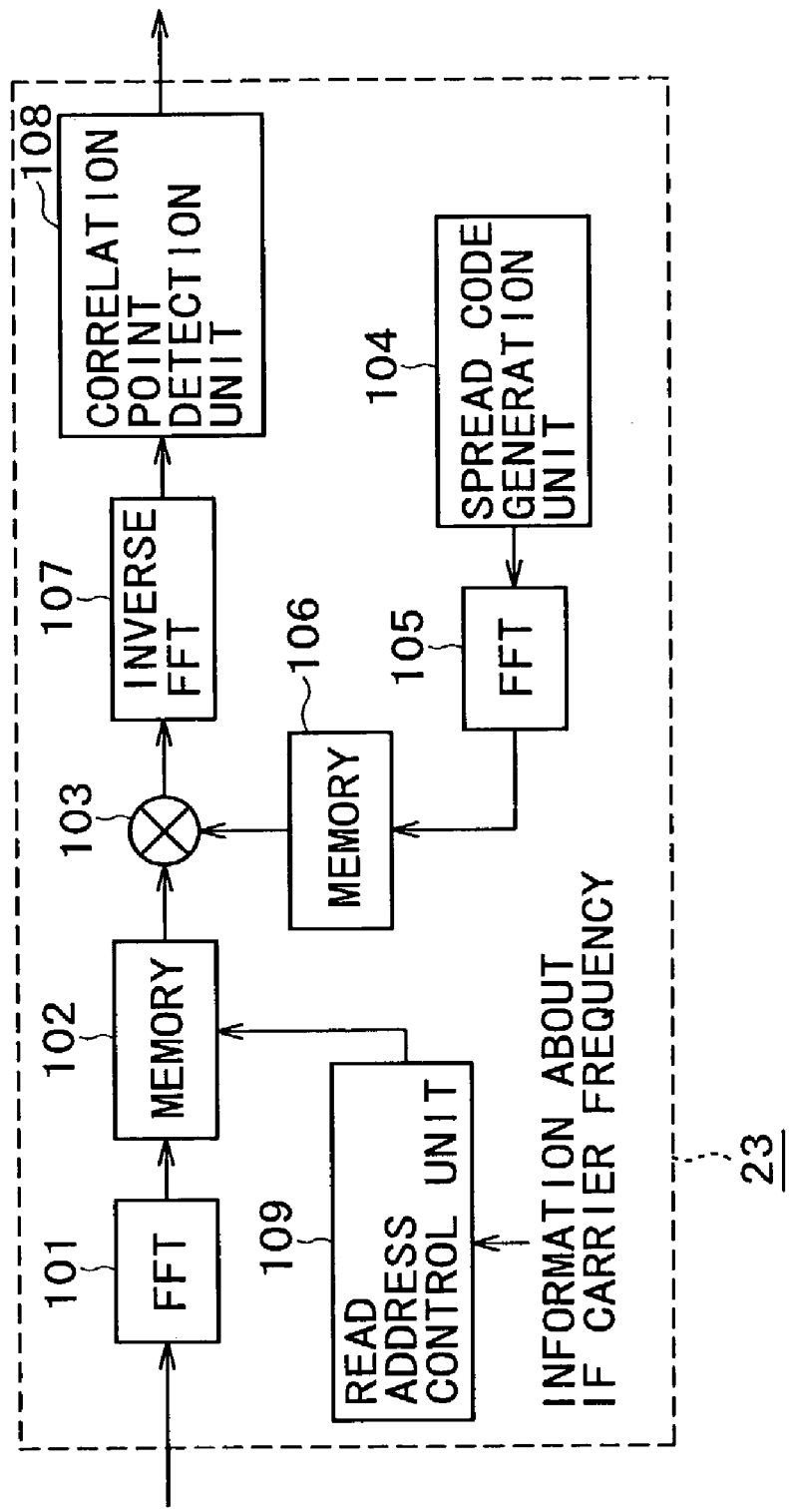
FIG. 3 is a block diagram depicting a typical internal structure of a DSP as part of the synchronous acquisition unit in FIG. 2.

In the first example, as shown in FIG. 3, the DSP 23 reads the one-millisecond-long IF data from the RAM 22 for FFT processing by an FFT processing unit 101. The result of the processing is written to a memory 102. From the memory 102, the result of FFT on the received signal is supplied to a multiplication unit 103.

Meanwhile, a spread code generation unit 104 generates a spread code considered to be of the same type as that used in the received signal from a given GPS satellite. In practice, the spread code generation unit 104 switches from one prepared spread code to another for spread code output with regard to a plurality of GPS satellites being acquired.

The one-period-long (1,023 chips long) spread code from the spread code generation unit 104 is fed to an FFT processing unit 105 for FFT processing. The result of the processing is sent to a memory 106. From the memory 106, the result of the FFT processing is retrieved consecutively as usual in ascending order of frequencies before being sent to the multiplication unit 103.

The multiplication unit 103 multiples the result of FFT on the received signal from the memory 102 by the result of FFT on the spread code from the memory 106 before computing the degree of correlation between the received signal and the spread code within the frequency spectrum. Specifically, multiplication by the multiplication unit 103 involves multiplying a complex conjugate of either the result of discrete Fourier transform on the received signal or the result of discrete Fourier transform on the spread code, by the other result. The result of the multiplication is fed to an inverse FFT processing unit 107 so that the frequency spectrum signal is restored to a time-domain signal.

The result of inverse FFT from the inverse FFT processing unit 107 constitutes a correlation detection signal in the time domain for the received signal and spread code. The correlation detection signal is supplied to a correlation point detection unit 108.

The correlation detection signal represents a correlation value of each chip phase in one period of the spread code. In a phase where the spread code in the received signal in excess of a predetermined signal strength is in synchronism with the spread code from the spread code generation unit 104 (i.e., in one-period-long phase of the spread code), as shown in FIG. 4, there occurs a correlation waveform in which the correlation value of one phase corresponding to one of 1,023 chips indicates a peak value exceeding a predetermined threshold value. The chip phase at the peak value is the phase of the correlation point; it denotes the first phase of one period of the spread code in the GPS satellite signal corresponding to the spread code on the side of the GPS receiving apparatus.

If the received signal has a strength less than the predetermined level, there will not develop any correlation waveform such as the one in FIG. 4 with a peak value, even if the spread code in the received signal synchronizes with the spread code from the spread code generation unit 104.

The correlation point detection unit 108 checks for synchronization between the received signal and the spread code by judging whether a peak value exceeding a predetermined value exists in the correlation detection signal fed to the correlation point detection unit 108.

If synchronism is judged to exist, then the correlation point detection unit 108 detects the phase of the peak value in question as a correlation point, i.e., the phase of the spread code in the GPS satellite signal. At this point, the DSP 23 recognizes the GPS satellite number by verifying which GPS satellite the spread code from the spread code generation unit 104 corresponds to.

The correlation detection signal shown in FIG. 4 is in a time domain. A peak of correlation is detected only if the carrier component is correctly removed from the received intermediate frequency signal in a process that will be described later.

The frequency of the removed carrier component constitutes an IF carrier frequency which contains a Doppler shift amount and which corresponds to the correlation point where a peak value occurs in excess of the predetermined value. Thus the IF carrier frequency including the Doppler shift amount is detected by the DSP 23 as the result of correlation point detection.

In this example, once a given GPS satellite has been synchronously acquired as described, the spread code generated by the spread code generation unit 104 is switched to a spread code of another GPS satellite signal and the above-described processes are repeated. Even when synchronous acquisition of the GPS satellite has failed, the DSP 23 also switches the spread code of the spread code generation unit 104 to a spread code of another GPS satellite signal and repeats the subsequent processes.

The synchronous acquisition processing above is terminated if all GPS satellites to search for have been synchronously acquired, or if the CPU 41 of the control unit 40 has informed that the spread codes of at least four GPS satellites have been synchronized.

The DSP 23 supplies the control unit 40 with information denoting the satellite numbers of the synchronously acquired GPS satellites, and with information constituted by the spread code phases of the synchronously acquired GPS satellite signals and by the IF carrier frequencies involved. In this example, the DSP 23 also feeds the control unit 40 with a peak value of the correlation point in each of the synchronously acquired GPS satellite signals.

Although the foregoing description has not dealt with processing of the carrier in received signals, a received signal $r(n)$ in practice contains a carrier as shown by expression (3) in FIG. 43. In expression (3), "A" stands for an amplitude, "d(n)" for data, "fo" for the carrier angular frequency of the intermediate frequency signal, and "n(n)" for noise.

Suppose that "fs" denotes the sampling frequency of the sampling unit 21 and "N" represents the number of samples taken per period of the spread code (hence $0 \leq n < N$). In that case, a discrete frequency "k" ($0 \leq k < N$) after discrete Fourier transform and a real frequency "f" have the following relations:

$f = f \cdot fs/N$, if $0 \leq k \leq N/2$ $f = (k-N) \cdot fs/N (f<0)$, if $N/2 < k < N$ Because of the nature of discrete Fourier transform, $R(k)$ and $C(k)$ turn out to be cyclic when $k<0$ and $k \geq N$.

To obtain data $d(n)$ from the received signal $r(n)$ requires synchronizing the spread code $c(n)$ with the carrier $\cos 2\pi n f_0$ so as to remove the carrier component. In other words, if the carrier component is contained only in $R(k)$ as shown by expression (2) in FIG. 43 (to be discussed later), then a correlation waveform such as is shown in FIG. 4 will not be obtained.

With this embodiment of the invention, the simple setup of carrying out FFT only on the frequency spectrum provides synchronization between the spread code $c(n)$ and the carrier $\cos 2\pi n f_0$, whereby the carrier component is removed.

The result of FFT performed by the FFT processing unit 101 on the received signal from a given GPS satellite is retrieved from the memory 102 usually in ascending order of frequencies in the frequency component of the received signal. The retrieved result is supplied to the multiplication unit 103. With this embodiment, the address to read from within the memory 102 is shifted successively under control of a read address control unit 109, whereby the result of FFT on the received signal is retrieved consecutively.

The read address control unit 109 is fed with information about a received signal carrier frequency that is detected by accurately estimating the Doppler shift amount of the GPS satellite originating the received signal and by precisely calibrating the oscillation frequency and time information inside the GPS receiving apparatus. The carrier frequency information is either generated within the GPS receiving apparatus or acquired from the outside.

Based on the carrier frequency information generated inside the GPS receiving apparatus or acquired externally, the read address control unit 109 shifts the read address by the amount of the carrier frequency successively to retrieve the result of FFT on the received signal from the memory 102. The retrieved result is sent to the multiplication unit 103.

As described, the result of FFT on the received signal $r(n)$ is read from the memory 102 after being shifted by the amount of the carrier frequency from the received signal. This makes it possible to obtain the result of FFT equivalent to the result of FFT on the received signal from which the carrier component is removed, as will be discussed later. Despreading the result of multiplication of the result of FFT minus the carrier component using the result of FFT over one period of the spread code provides reliably a correlation detection output with a peak at the correlation point, as shown in FIG. 4.

Instead of controlling the address from which to read the result of FFT within the memory 102, it is possible to control that address in the memory 106 from which to retrieve the result of FFT on the spread code in order to add the carrier component of the received signal $r(n)$ to the result of FFT on the spread code. The carrier component may then be removed effectively through multiplication by the multiplication unit 103, as will be discussed later.

Described below in detail is how the carrier component is removed through synchronization between the carrier of the received signal and the spread code, with the read address suitably controlled in the memory 102 or 106. The description will be made in conjunction with an explanation of how a digital matched filter is operated by the DSP 23.

With this embodiment, the DSP 23 implements the processing of a digital matched filter. The principle of digital matched filter processing, as indicated by expression (1) in FIG. 43, is based on the theorem that convolutional Fourier transform in the time domain corresponds to multiplication in the frequency spectrum.

In expression (1), "$r(n)$" stands for the received signal in the time domain, "$R(k)$" for discrete Fourier transform performed on the signal, "$c(n)$" for the spread code from the spread code generation unit, "$C(k)$" for discrete Fourier transform performed on the spread code, "n" for a discrete time, "k" for a discrete frequency, and "F[]" for Fourier transform.

If a correlation function of the two signals r(n) and c(n) is defined anew as f(n), then the discrete Fourier transform F(k) of f(n) has relations as represented by expression (2) in FIG. 43. Thus if "r(n)" denotes the signal from the frequency conversion unit 10 and "c(n)" represents the spread code from the spread code generation unit 104, then the correlation function f(n) for r(n) and c(n) can be computed, using expression (2) above, in the procedure shown below without recourse to usual definition expressions:

Compute discrete Fourier transform R(k) on the received signal r(n).

Compute a complex conjugate of discrete Fourier transform C(k) on the spread code c(n).

Compute F(k) in expression (2) using the complex conjugate of R(k) and C(k).

Compute the correlation function f(n) through inverse discrete Fourier transform on F(k).

As described, if the spread code included in the received signal r(n) matches the spread code c(n) from the spread code generation unit 104, then the correlation function f(n) computed in the above procedure provides a time waveform in which a peak occurs at the correlation point as illustrated in FIG. 4. When high-speed algorisms of FFT and inverse FFT are applied to discrete Fourier transform and inverse Fourier transform in the manner described above, correlations are computed at a significantly higher speed than if they are computed on the basis of conventional definitions.

Below is an explanation of synchronism between the carrier included in the received signal r(n) and the spread code.

As discussed above, the received signal r(n) contains a carrier as indicated by expression (3) in FIG. 43. To obtain data d(n) from the received signal r(n) requires synchronizing the spread code c(n) with the carrier cos $2\pi n f_0$ for carrier removal. If the carrier is contained in R(k) alone in expression (2) of FIG. 43, then the correlation waveform such as one in FIG. 4 is not obtained.

Figure 5:
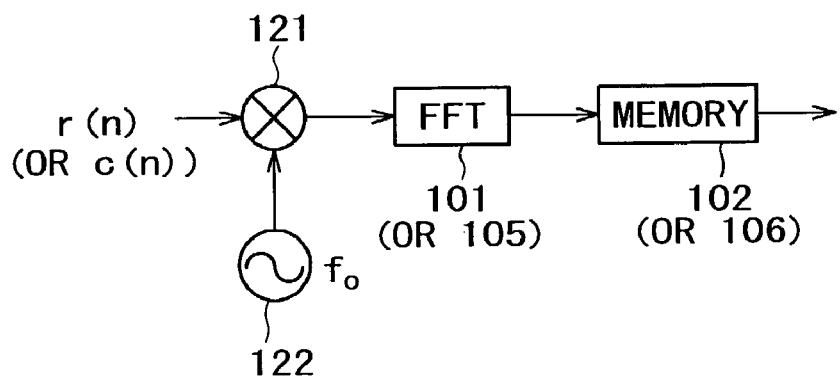
FIG. 5 is an explanatory view of a common method for synchronizing a carrier with a spread code in a received signal.

If the Doppler shift amount is precisely estimated and if the oscillation frequency and time information within the GPS receiving apparatus are accurate, then the carrier frequency $f_0$ of the received signal r(n) becomes known. In such a case, as depicted in FIG. 5, a multiplication unit 121 is furnished upstream of the FFT processing unit 101 so that the multiplication unit 121 may multiply the received signal r(n) by the carrier of the frequency $f_0$ from a signal generation unit 122 for frequency conversion. This removes the carrier component from the received r(n) before effecting FFT.

In the above setup, the result of FFT on the received signal r(n) minus the carrier component is obtained from the memory 102. The multiplication unit 103 multiplies this result of FFT by the result of FFT on the spread code c(n). This enables the inverse FFT processing unit 107 reliably to output a time waveform in which a peak occurs at the correlation point as illustrated in FIG. 4.

As indicated in parentheses in FIG. 5, the same effect is obtained if the multiplication unit 121 is furnished upstream of the FFT processing unit 105 for the spread code c(n) so as to let the multiplication unit 121 multiply the spread code c(n) by the carrier of the frequency $f_0$ from the signal generation unit 122 for frequency conversion. This arrangement is designed to add the carrier component to the spread code instead of removing the carrier component from the received signal r(n).

In the preceding arrangement, the carrier component contained in the result of FFT on the received signal from the memory 102 is synchronized with the added carrier component included in the result of FFT on the spread code from the memory 106. This makes it possible to obtain from the inverse FFT processing unit 107 the correlation detection output in which a peak occurs at the correlation point as shown in FIG. 4.

The above method of multiplying the time-domain signal such as one in FIG. 5 by a carrier frequency signal has its share of disadvantages. That is, the need for a multiplication unit to perform carrier removal complicates the structure of the apparatus. Furthermore, the speed of processing is made lower the greater the role played by multiplication.

According to the characteristics of FFT, the above-described multiplication of frequencies is expressed by expression (4) in FIG. 43. In expression (4), "F[]" stands for discrete Fourier transform, "$\phi_0$" for a phase difference with regard to the carrier, and "$k_0$" for "k" corresponding to "$f_0$" so that $f_0 = k_0 \cdot fs/N$. Based on expression (4), performing FFT on the received signal r(n) following frequency conversion as shown in FIG. 5 provides R(k), which is derived from FFT on r(n) and shifted by the amount of the carrier frequency $k_0$.

Figure 6:
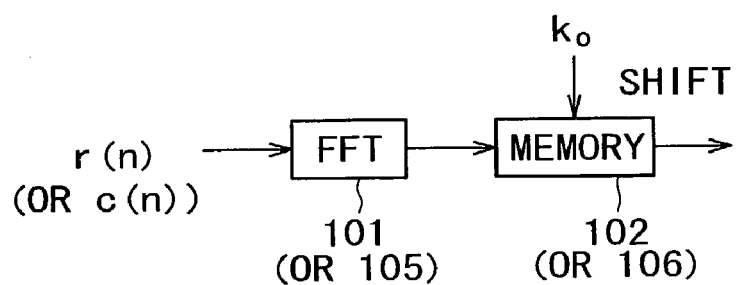
FIG. 6 is an explanatory view of a first example of a synchronous acquisition method for use with the embodiment of the invention.

As described, the structure shown in FIG. 5 can be replaced by the structure in FIG. 6. In this case, the setup of multiplying the received signal r(n) or spread code c(n) by the carrier frequency is abandoned; adopted instead is an arrangement of shifting by the amount of the carrier frequency that address in the memory 102 or 106 from which to read the result of FFT on the received signal or spread code.

In the arrangement of FIG. 6, shifting the received signal r(n) is a down-conversion where $k_0 > 0$; shifting the spread code c(n) is an up-conversion where $k_0 < 0$.

As explained above, suitably utilizing the characteristics of FFT shown in FIG. 4 eliminates the need for the signal generation unit 122 in FIG. 5. As a result, the setup in FIG. 6 need only shift the phase of the address from which to read the result of FFT within the memory. The structure simplified as described contributes to boosting the speed of processing.

The phase difference $\phi_0$ in expression (4) above is unknown and is thus ignored in FIG. 6. Meanwhile, suppose that a correlation function f'(n) ($0 \leq n < N$) derived from inverse FFT of F'(k) using expression (5) in FIG. 43 produces a complex number of which the real part is represented by $f_R'(n)$ and the imaginary part by $f_I'(n)$. In that case, the amplitude |f'(n)| of a correlation peak is obtained by use of expression (6) and the phase $\phi$ by expression (7) as shown in FIG. 43. This allows the multiplication of $\exp(j\phi_0)$ on the right-hand side in expression (4) to be omitted. The phase $\phi$ is obtained by adding $\phi_0$ in expression (7) to two values differing by $\pi$ depending on the sign of data d(n) in expression (3).

Figure 7:
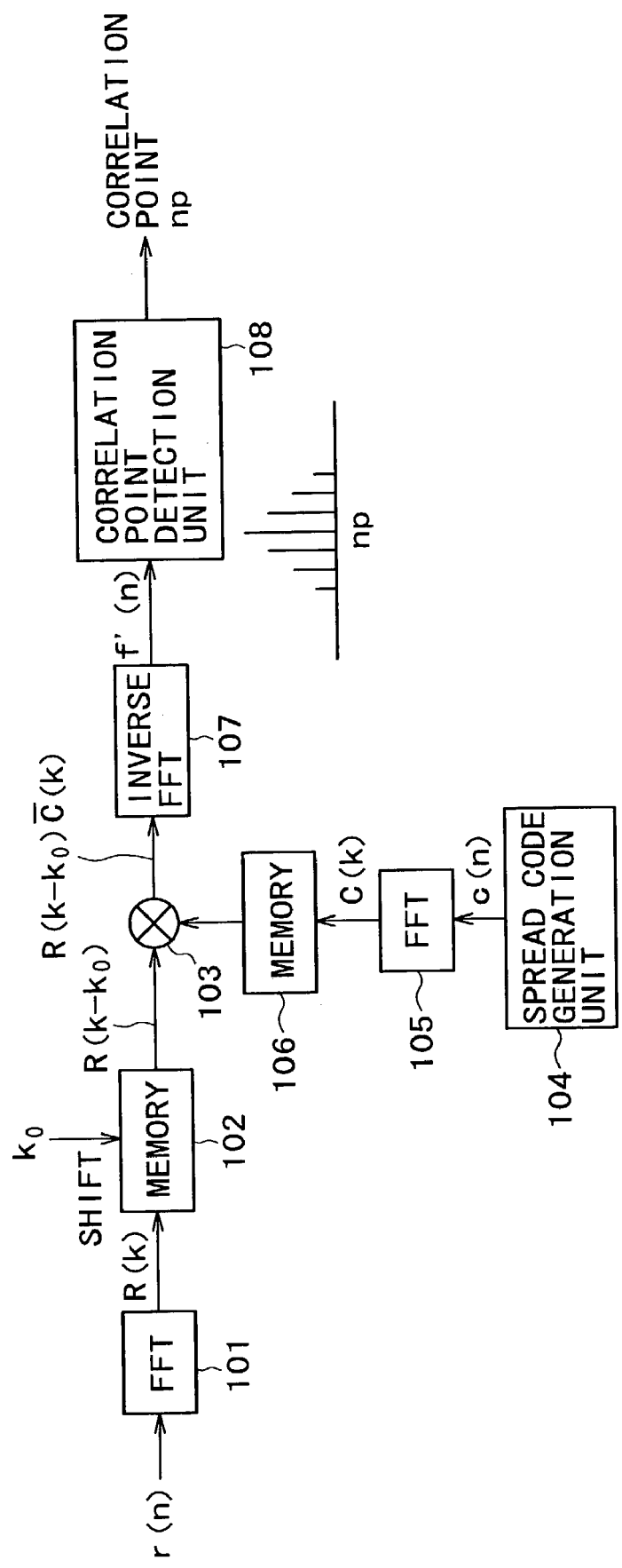
FIG. 7 is a block diagram showing a partial structure of the embodiment taking the operation of the first example of the synchronous acquisition method into account.

FIG. 7 is a block diagram depicting a partial structure of the embodiment in FIG. 3 reflecting the operation of the first example of synchronous acquisition performed by the DSP 23. The blocks in FIG. 7 are shown outputting the above-described signals r(n) and c(n) as well as computation results R(k), C(k) and f'(n).

As described and according to the first example of synchronous acquisition, where the GPS receiving apparatus is structured to constitute a digital matched filter using FFT, the result of FFT on the received signal is multiplied by the spread code after the memory address is shifted by the amount of the carrier frequency as shown in FIG. 7. This structure provides a correlation point "np" in a waveform indicated in FIG. 7. Knowing the correlation point "np" about four GPS satellites, i.e., four spread codes c(n), makes it possible to compute the position of the GPS receiving apparatus.

That is, in the first example where digital matched filter processing is implemented using FFT, either the result of FFT on the received signal or the result of FFT on the spread code is simply shifted during multiplication of the two results within the frequency spectrum, with no multiplication performed in the time domain to achieve synchronism between the received signal carrier and the spread code. This simplified arrangement removes effectively the carrier component from the received signal.

Although the example of FIG. 7 was shown involving the shifting of that address in the memory from which to read the result R(k) of FFT on the received signal, this is not limitative of the invention. Alternatively, it is also possible to shift in the opposite direction the memory address from which to read the result C(k) of FFT on the spread code (i.e., up-conversion by a multiplication unit).

The first example above was shown having the spread code generation unit 104 and FFT processing unit 105 set up separately. Alternatively, the results of FFT on the spread codes corresponding to the different GPS satellites may be stored in advance. Retrieving these results from the memory eliminates the need for FFT computations on the spread code c(n) upon receipt of satellite signals.

[Second Example of Synchronous Acquisition by the Digital Matched Filter]

Whereas the carrier frequency of the received signal from each GPS satellite is assumed to be known in the first example of synchronous acquisition, a second example of synchronous acquisition deals with cases where the carrier frequency is unknown. As in the first example, the sampling frequency of the sampling circuit 21 is 4.096 MHz and the RAM 22 has a capacity accommodating 1-millisecond-long data from the sampling circuit 21 in the second example.

Figure 8:
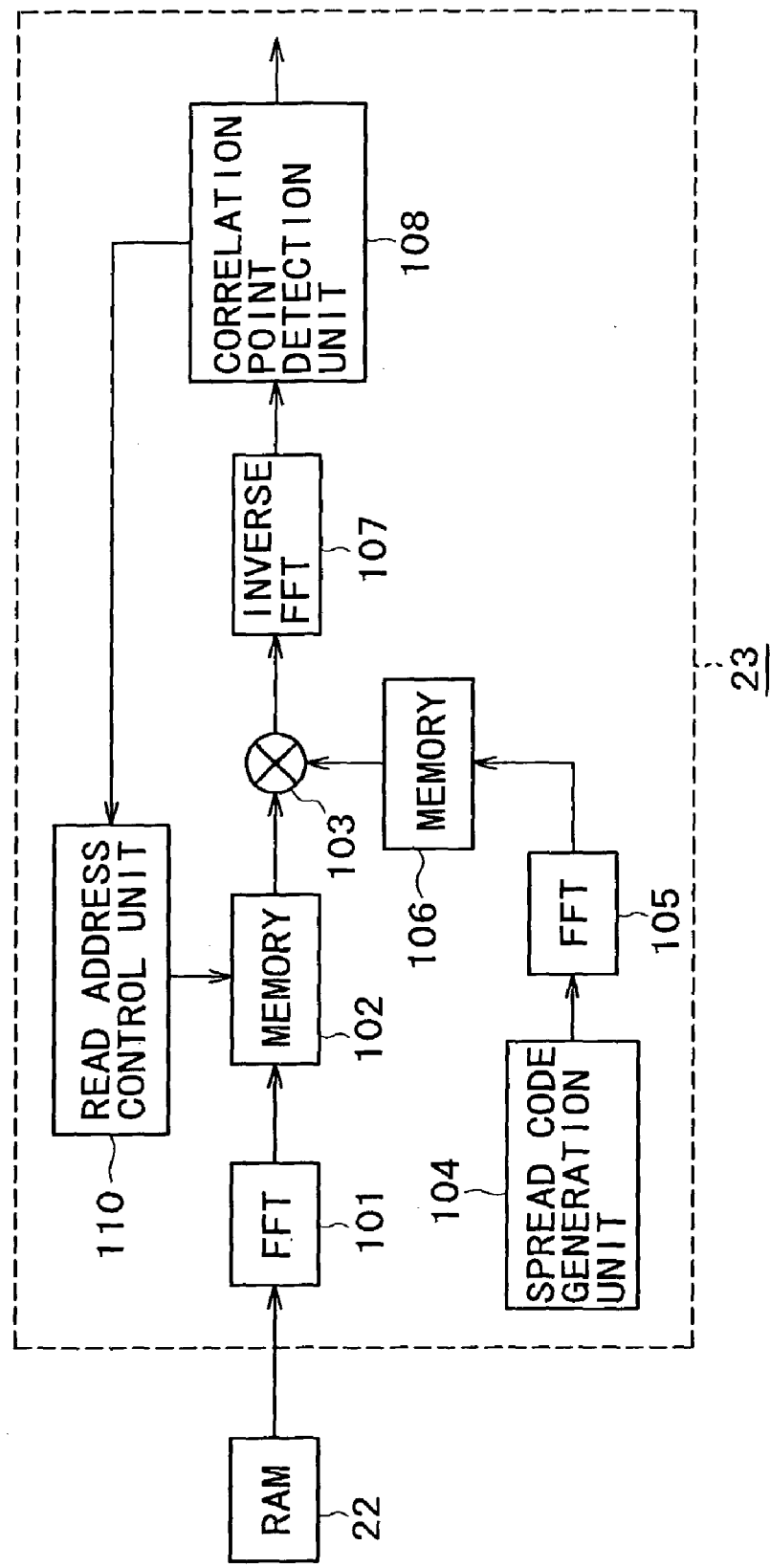
FIG. 8 is a block diagram explaining a second example of the synchronous acquisition method.

FIG. 8 is a block diagram showing a typical structure of the DSP 23 implementing the second example of synchronous acquisition. Of the reference numerals in FIG. 8, those already used in FIG. 3 showing the structure of the DSP 23 designate like or corresponding parts.

In the second example of synchronous acquisition, as shown in FIG. 8, a correlation detection output of the correlation point detection unit 108 is sent to a read address control unit 110. Given the detection output from the correlation point detection unit 108, the read address control unit 110 changes the shifting amount of that address in the memory 102 from which to read the result of FFT on the received signal r(n), the amount being controlled with respect to the address predicted on the basis of past data so that the correlation point detection unit 108 may obtain a peak as shown in FIG. 4. Once such a peak is gained by the correlation point detection unit 108, the read address control unit 110 stops read address shift control, holding the amount of the shift in effect at that point.

Figure 10:
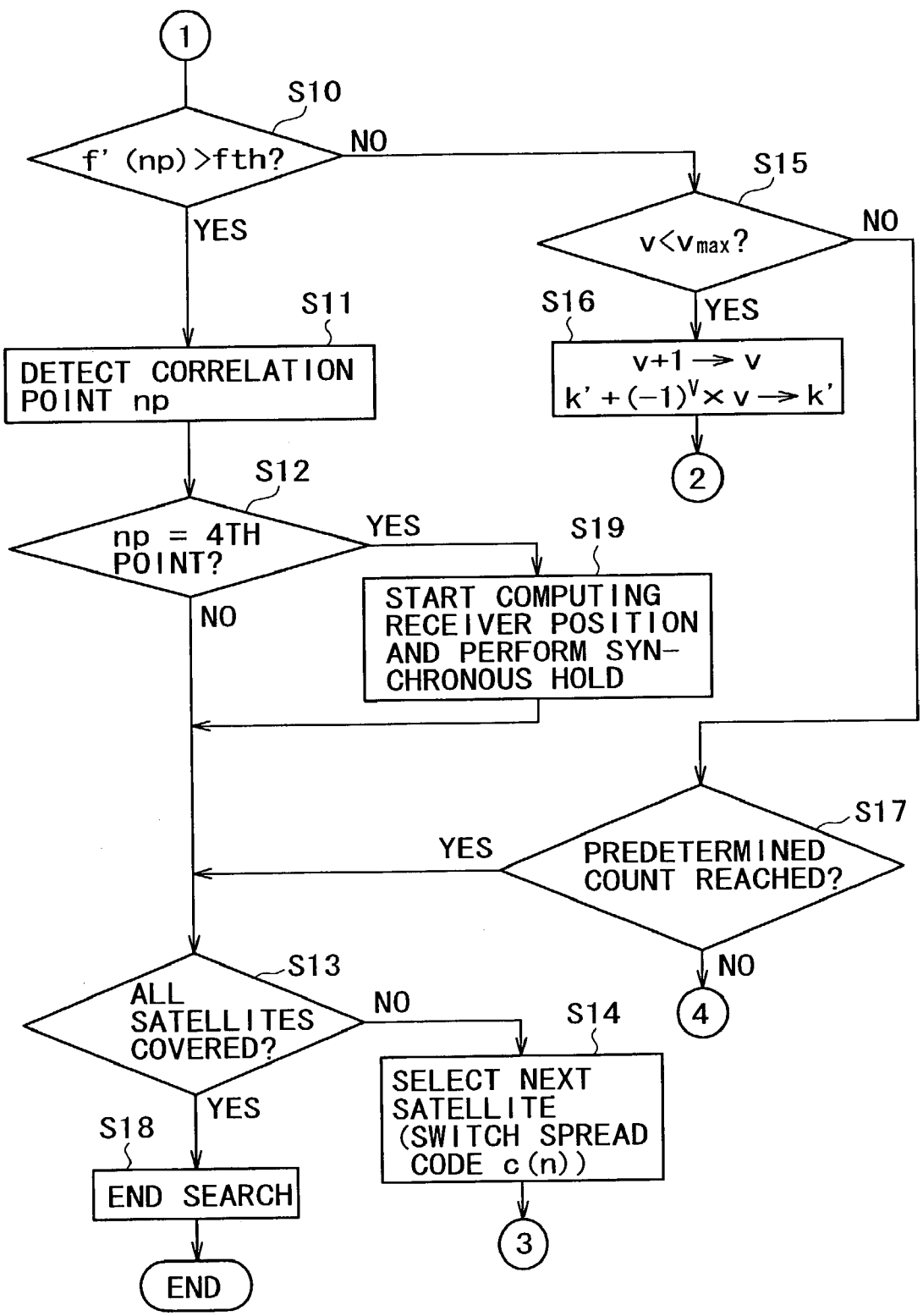
FIG. 10 is another flowchart of steps showing how the second example of the synchronous acquisition method operates.

A typical flow of processing by the synchronous acquisition unit 20 in the second example will now be described with reference to the flowcharts of FIGS. 9 and 10. The steps in these flowcharts represent primarily software-based processing by the DSP 23.

In step S1, IF data from the frequency conversion unit 10 are sampled by the sampling circuit 21 setting what is sampled as a signal r(n) to the RAM 22. In step S2, the FFT processing unit 101 performs FFT on the signal r(n) and writes the result R(k) of the operation to the memory 102. In step S3, the result C(k) of FFT on the spread code corresponding to the GPS satellite whose signal has been received is set to the memory 106.

In step S4, past data are referenced to determine an initial shift amount $k_0'$ by which to read the result R(k) of FFT on the received signal r(n) from the memory 102. In step S5, the initial value $k_0'$ thus determined is established as a shift amount k' by which to read the result of FFT from the memory 102, and a shift control change count "v" is set to the initial value (=zero).

In step S6, the result R(k) of FFT on the received signal r(n) is read from the address in the memory 102 following an address shift by k'. In step S7, the retrieved result R(k–k') of FFT is multiplied by a complex conjugate of the result C(k) of FFT on the spread code, whereby a correlation function F'(k) is obtained.

In step S8, a time-domain function f'(n) is obtained by performing inverse FFT on the correlation function F'(k). In step S9, a peak value f'(np) is obtained from the function f'(n). In step S10 of FIG. 10, a check is made to see if the peak value f'(np) is greater than a predetermined threshold value fth.

If in step S10 the peak value f'(np) is judged to be smaller than the predetermined threshold value fth, that means no correlation point is detected. In that case, step S15 is reached in which a check is made to see if the shift control change count "v" is smaller than a predetermined maximum value $v_{max}$. The maximum value $v_{max}$ corresponds to 1 kHz when converted to frequencies.

If in step S15 the shift control change count "v" is judged to be smaller than the maximum value $v_{max}$, then step S16 is reached. In step S16, the shift control change count "v" is incremented by 1 (v=v+1), and a new shift amount k' is set as $k'=k'+(-1)^v \times v$. Step S16 is followed by step S6, and the subsequent steps are repeated.

If in step S15 the shift control change count "V" is judged to be greater than the predetermined maximum value $v_{max}$, then step S17 is reached. In step S17, a check is made to see if a predetermined count set for the current data in the RAM 22 is exceeded. If the predetermined count is not judged to be exceeded, then control is returned to step S1, new data are set to the RAM 22, and the subsequent steps are repeated.

If in step S17 the predetermined count is judged exceeded, then step S13 is reached. In step S13, a check is made to see if the spread code synchronous search has ended, covering all target satellites. If in step S13 the search is judged to have ended regarding all satellites, then step S18 is reached and the search is terminated.

If in step S13 any satellite is found for which the spread code synchronous search has yet to be carried out, then step S14 is reached. In step S14, the next satellite is selected for which the spread code synchronous search is to be performed. Step S14 is followed by step S3, and the subsequent steps are repeated.

If in step S10 the peak value f'(np) is judged to be greater than the predetermined threshold value fth, then step S11 is reached. In step S11, a discrete time (spread code phase) "np" at which the value f'(np) peaks is detected as the correlation point.

In step S12, a check is made to see if the detected correlation point "np" is a fourth point. If the correlation point is judged to be the fourth point, step S20 is reached. In step S19, the process of computing the position of the GPS receiving apparatus is started, and the synchronous hold unit 30 performs synchronous hold processing. Step S19 is followed by step S13. The process of step S19 may alternatively be carried out at a fifth or a subsequent correlation point.

Based on the read address shift amount k' in effect when the correlation point "np" was detected in step S11, it is possible to estimate a Doppler shift amount regarding the GPS satellite being received as well as an error in the oscillation frequency of the GPS receiving apparatus. In other words, the carrier frequency of the received signal can be detected.

If in step S12 the detected correlation point "np" is judged to be other than a fourth point, then step S13 is reached. In step S13, a check is made to see if the spread code synchronous search has ended, covering all target satellites. If in step S13 the search is judged to have ended about all satellites, then step S18 is reached in which the search is terminated.

If in step S13 any satellite is found for which the spread code synchronous search has yet to be carried out, then step S14 is reached in which the next satellite is selected for which the search is to be performed. Step S14 is followed by step S3, and the subsequent steps are repeated.

Figure 11:
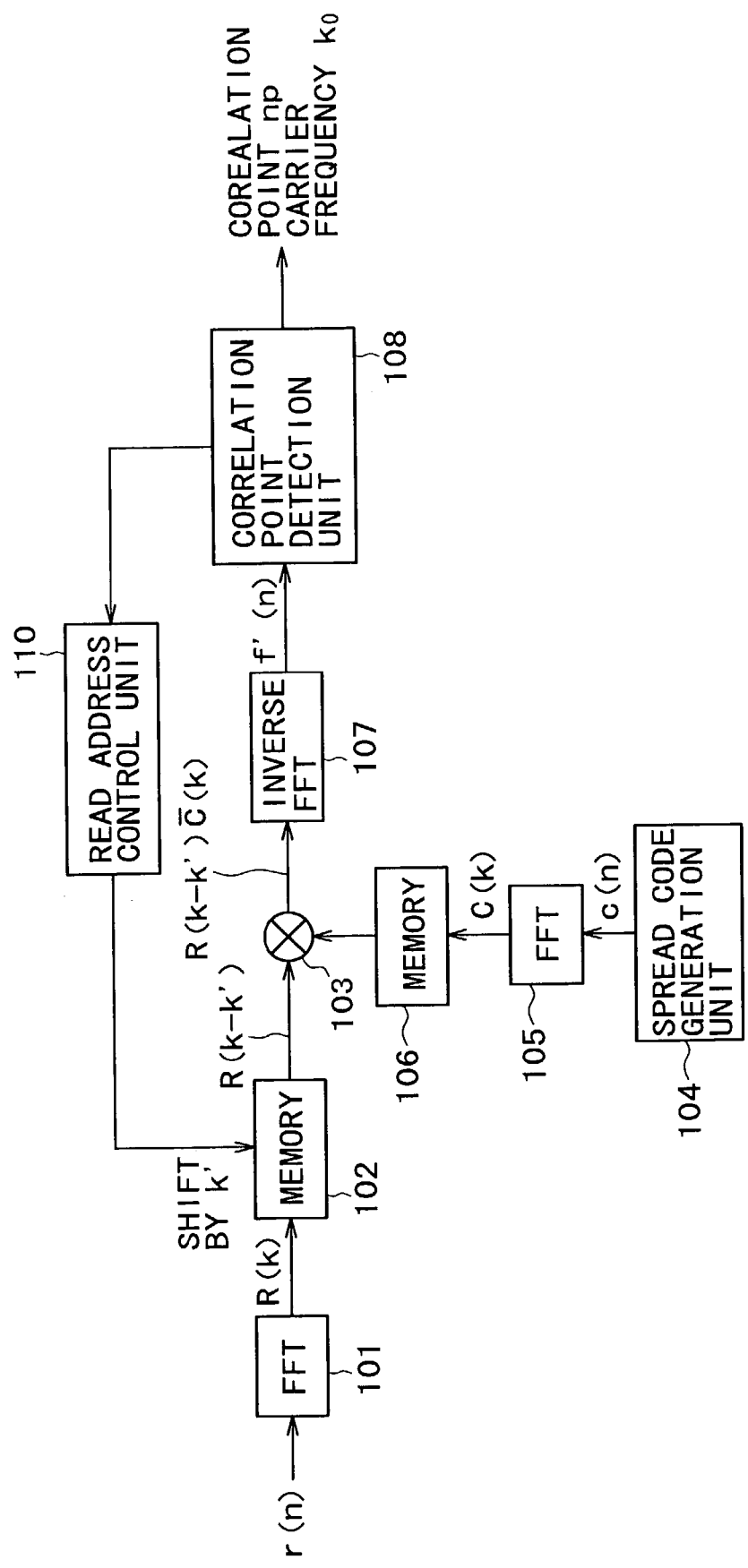
FIG. 11 is a block diagram illustrating a partial structure of the embodiment taking the operation of the second example of the synchronous acquisition method into account.

FIG. 11 is a block diagram reflecting the processing of the second example of synchronous acquisition as implemented by the DSP 23 whose internal structure is shown in FIG. 8. The blocks in FIG. 11 are shown outputting the above-described signals and computation results.

As described and according to the second example of synchronous acquisition, even if the carrier frequency of the received signal from a GPS satellite is unknown, the processing of FFT over the frequency spectrum is actively performed so as to detect synchronization between the received signal carrier and the spread code, whereby the carrier component is removed. This makes it possible for the simplified structure to detect at high speed the correlation point between the received signal from a GPS satellite and the spread code through digital matched filter processing using FFT. The IF carrier frequency is detected on the basis of the amount by which to shift the address to read data from within the memory 102.

In the second example, the results of FFT on the spread codes corresponding to the different GPS satellites may also be stored in advance. Retrieving these results from the memory eliminates the need for FFT computations on the spread code c(n) upon receipt of satellite signals.

[Third Example of Synchronous Acquisition by the Digital Matched Filter]

As described above, where a correlation point is to be detected between the received signal and the spread code by the digital matched filter, it is common practice to set the incremental data length for correlation point detection equal to the length of data spanning one period of the spread code.

However, the received signal from each GPS satellite has each bit of its data spanning 20 periods of the spread code, each of the 20 periods representing a code of the same pattern. This characteristic is taken advantage of by a third example of synchronous acquisition. That is, the incremental data length in which to detect the correlation point between the received signal and the spread code through the digital matched filter is set equal to a multiple of the spread code period. The sampling frequency of the sampling circuit 21 may be the same as in the preceding examples.

In the third example, computing FFT on the received signal in increments of a multiple of the spread code period increases the accuracy of IF carrier frequency detection and enhances the sensitivity of signal reception. As opposed to the method of adding up the same time-domain signal cumulatively, the third example facilitates synchronous acquisition of the spread code and a search for the IF carrier frequency. The third example of synchronous acquisition will now be described in more detail.

There exist conventional methods whereby a correlation point is detected regarding 1-period-long data added up cumulatively over M periods of the spread code (M is an integer of at least 2) in the time domain. Such methods are disclosed illustratively in U.S. Pat. No. 4,998,111 and "An Introduction to Snap Track™ Server-Aided GPS Technology, ION GPS-98 Proceedings."

Figure 12:
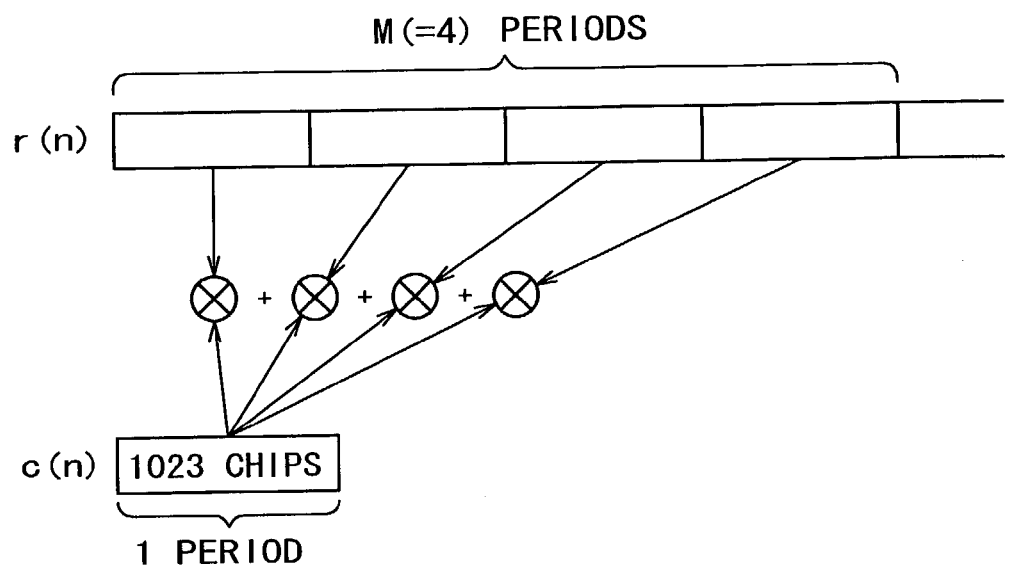
FIG. 12 is an explanatory view of a third example of the synchronous acquisition method.

As shown in FIG. 12, one such method typically involves adding up cumulatively the result of multiplication of the received signal r(n) by the spread code over M periods. This method is designed to enhance C/N by taking advantage of the periodicity of the received signal from the GPS satellite and the statistical nature of noises. If synchronism is achieved beforehand between the received signal carrier and the spread code, then an M-fold C/N improvement is ensured. That in turn provides an M-fold enhancement of reception sensitivity (i.e., sensitivity of correlation point reception) and M-fold amelioration of the precision in carrier frequency detection.

If synchronism is not attained between the received signal carrier and the spread code, that means cumulative composition of M carriers having different phases. Such cumulative additions end up canceling the GPS signals out, making it impossible to detect correlation peaks.

Hence the need for making a search for any unknown carrier frequency of the received signal. This has necessitated carrying out the inefficient cumulative additions about each of the frequencies to be searched for.

In the first and the second examples above, by contrast, the simplified arrangement of shifting the memory address from which to read the result of FFT over the frequency spectrum provides synchronization between the received signal carrier and the spread code. The arrangement maximizes the effect of cumulative additions.

In the third example of synchronous acquisition, as in the second example, a search is made for a carrier frequency that is unknown in the received signal from a given GPS satellite. In this case, FFT is performed on the received signal r(n) at intervals of M periods of the spread code. Also at intervals of the M spread code periods, a search is made for a carrier frequency of the received signal under suitable control of the amount by which to shift the memory address from which to read the result of FFT on the received signal.

If it is assumed that M is equal to or less than 20, then the data d(n) in the above-mentioned expression (3) in FIG. 43 remain fixed to 1 or −1 during the M spread code periods. The data d(n) may thus be ignored. In that case, expression (3) is turned into:

$$r(n)=A \cdot c(n) \cos 2\pi n f_0 + n(n)$$

After the expression above is subjected to discrete Fourier transform, since the number of data is M×N (N=the number of data over one period of the spread code), a discrete frequency "k," a real frequency "f" and a sampling frequency "fs" have the following relations:

$$f=kfs/MN, \text{ if } 0 \leq k \leq MN/2$$

$$f=(k-MN)fs/MN(f<0), \text{ if } MN/2<k<MN$$

That means resolution is increased by a factor of M.

If it is assumed that the spread code c(n), which is a periodic signal, has a period length of T (T=1 millisecond in C/A code of GPS), then there exist no frequency components having accuracy levels less than f=1/T. Therefore, within the result R(k) ($0 \leq k < MN$) of FFT performed on the received signal r(n) following discrete Fourier transform, the spread code c(n) has its frequency components occurring at intervals of M elements, i.e., concentrated at N elements among MN data elements. The amplitude of the spread code c(n) is M times the same frequency component per period length. For purpose of simplification and illustration, FIG. 13 shows a spectrum example in effect when M=4.

Figure 13:
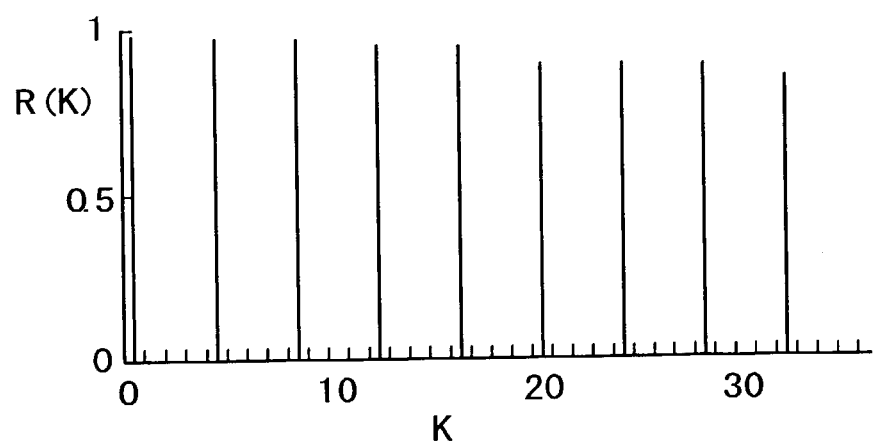
FIG. 13 is another explanatory view of the third example of the synchronous acquisition method.

In the example of FIG. 13, the signal spectrum occurs at intervals of M=4 elements; there is no signal component in between. At other than the N elements, the frequency component of the spread code c(n) is zero. Meanwhile, the noise n(n) is in many cases a nonperiodic signal and thus has its energy spread throughout all MN frequency components. Hence the M-fold C/N improvement in the sum total of the N frequency components of the spread code c(n) within the result R(k) of FFT on the received signal r(n), as with cumulative additions in the time domain.

If the carrier component cos $2\pi n f_0$ shown in expression (3) above were absent from the received signal r(n), the spread code c(n) in the FFT result R(k) would have its frequency components concentrated at k=i×M ($0 \leq i < N$). With the carrier component present in the third example, the memory address from which to read the FFT result R(k) is cyclically shifted by the amount of the carrier frequency $k_0$ where k=(i×M)−$k_0$ per period of the spread code.

Figure 14:
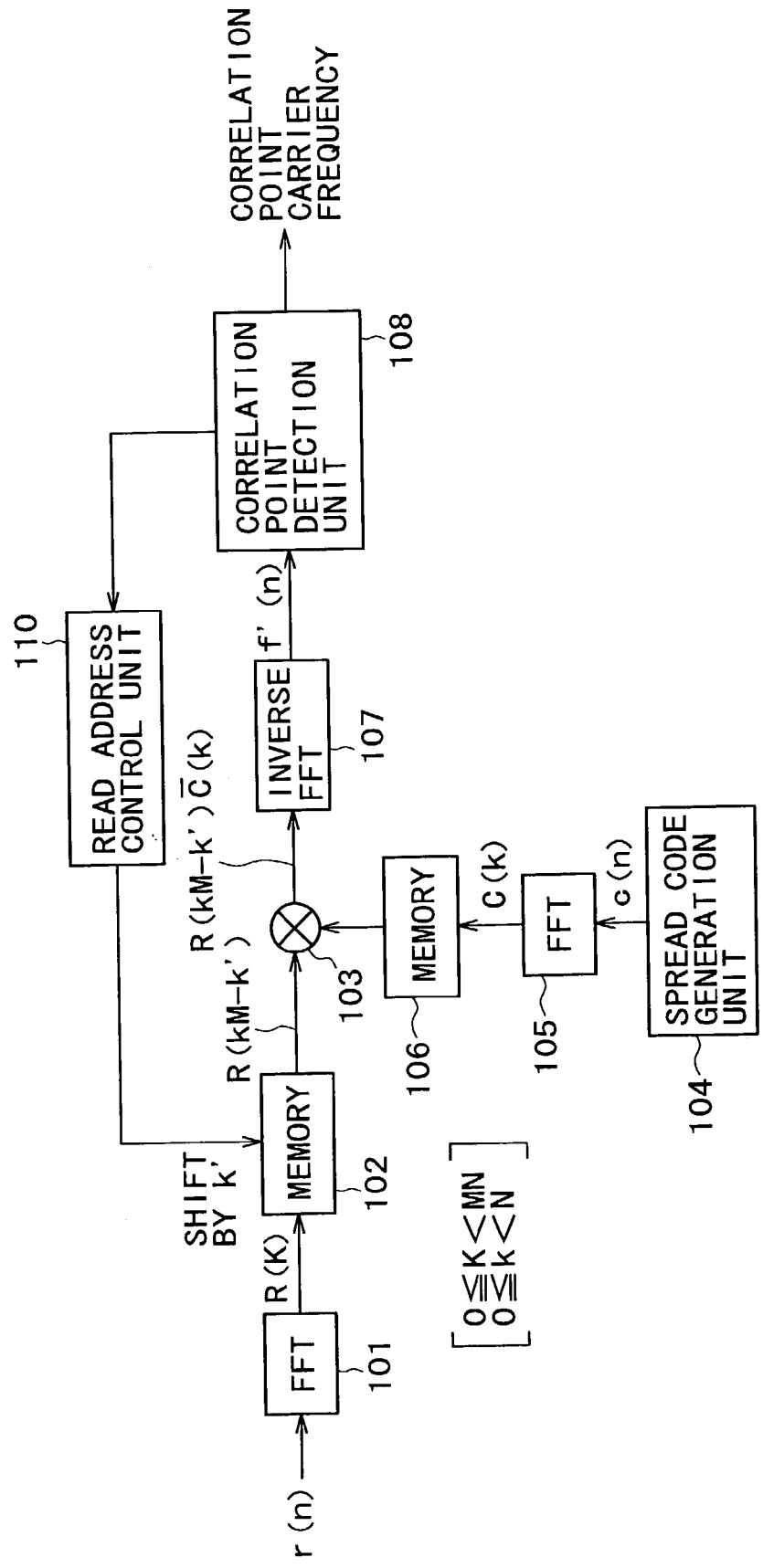
FIG. 14 is a block diagram depicting a partial structure of the embodiment taking the operation of the third example of the synchronous acquisition method into account.
Figure 15:
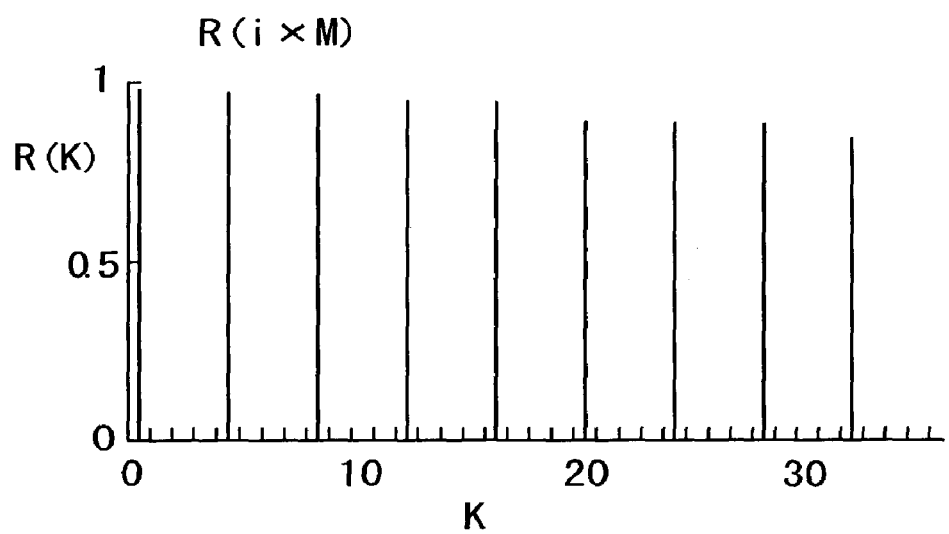
FIG. 15 is an explanatory view of a fourth example of the synchronous acquisition method.
Figure 16:
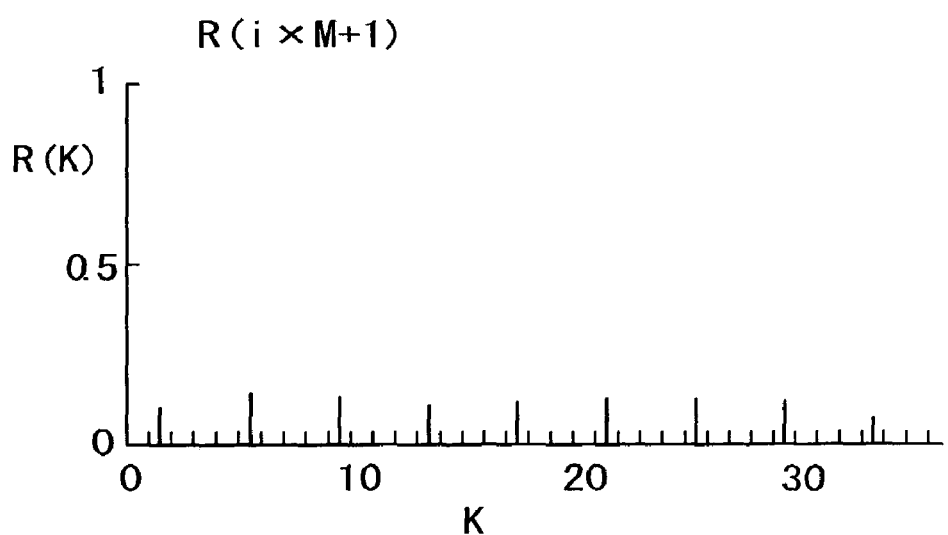
FIG. 16 is another explanatory view of the fourth example of the synchronous acquisition method.
Figure 17:
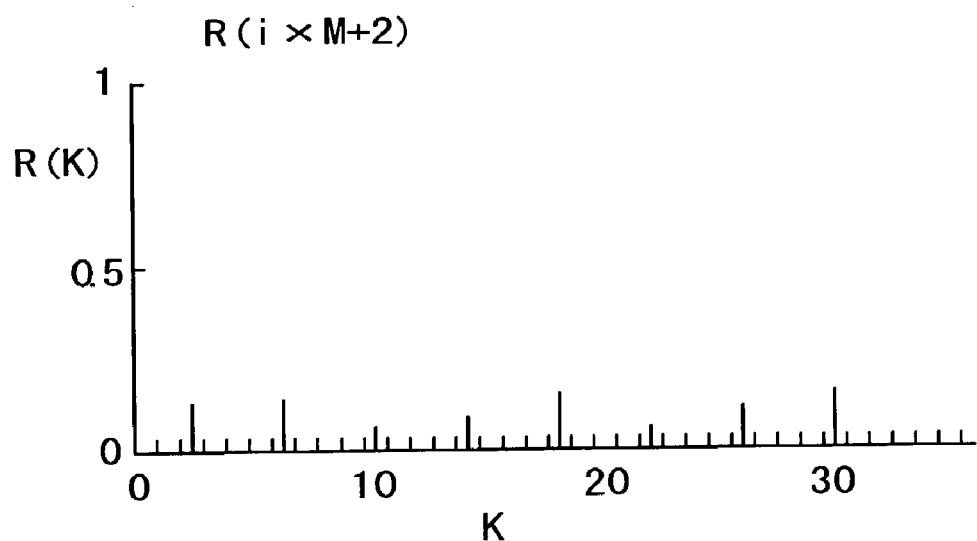
FIG. 17 is another explanatory view of the fourth example of the synchronous acquisition method.
Figure 18:
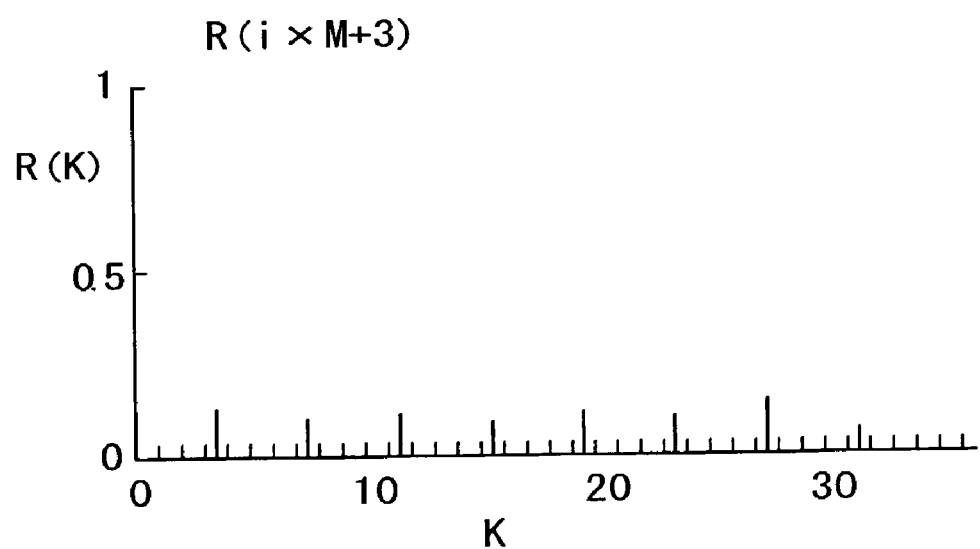
FIG. 18 is another explanatory view of the fourth example of the synchronous acquisition method.

The DSP 23 in the above-described third example has the same structure as in the second example depicted in FIG. 8, except that the RAM 22 has a capacity equivalent to M periods of the spread code (e.g., 16 periods or 16 milliseconds). The DSP 23 carries out an acquisition process in increments of data spanning the M periods of the spread code. FIG. 14 is a block diagram showing an internal structure of the DSP 23 reflecting that acquisition process.

Specifically, the FFT processing unit 101 derives the result R(K) from FFT computations in increments of the M periods of the spread code. The result is written to the memory 102. For the setup of FIG. 14, it is assumed that $0 \leq k < N$ and $0 \leq K < MN$.

The FFT result is read from that address in the memory 102 which is shifted in suitably controlled fashion. The retrieved result is sent to the multiplication unit 103. In the multiplication unit 103, the result is multiplied by a complex conjugate of the result C(k) of FFT on the spread code c(n) coming from the memory 106.

In the third example, the correlation function F(k) obtained by the multiplication unit 103 is defined by expression (8) in FIG. 43. In expression (8), "k" stands for a value applied to the complex conjugate of the result C(k) of FFT on the spread code, and $f_0 = k_0 \cdot fs/MN$ applies to $k_0$.

In FIG. 14, the correlation function f'(n) obtained by the inverse FFT processing unit 107 has M peaks within the range of $0 \leq n < MN$ because the FFT result R(K) includes a spread code of M periods. However, since one correlation point need only be detected per period of the spread code, the inverse FFT processing unit 107 may have its computations limited to the range of $0 \leq n < N$ as in the first and the second examples above; there is no need for making the computations in the range of $0 \leq N < MN$.

As described and according to the third example, the sensitivity of correlation point detection and by extension the sensitivity of signal reception can be enhanced when FFT on the received signal r(n) is performed over M periods of the spread code. The greater the value M, the higher the sensitivity of reception. The sensitivity of reception is thus controlled as desired by regulating the value M.

In the third example, the results of FFT on the spread codes corresponding to the different GPS satellites may also be stored in advance. Retrieving these results from the memory eliminates the need for FFT computations on the spread code c(n) upon receipt of satellite signals.

[Fourth Example of Synchronous Acquisition by the Digital Matched Filter]

In the third example explained above, a search for an unknown carrier frequency is made possible and reception sensitivity is improved by performing FFT on the received signal r(n) containing a spread code over M periods (M>1). One bottleneck of this scheme is that raising the number of sampled data from N per spread code period to MN involves prolonging the time required for FFT computations and expanding the memory 102 in capacity as well. A fourth example of synchronous acquisition is designed to bypass this snag.

As shown in FIG. 13, if FFT is performed at intervals of M spread code periods (M>1), the result R(K) of FFT has frequency components occurring only at intervals of M elements. The frequency components between the M elements are thus not necessary.

Suppose now that the FFT result R(K) ($0 \leq K < MN$) is split into M data sets consisting of R(i×M), R(i×M+1), R(i×M+2), ..., R(i×M+M−1) ($0 \leq i < N$). FIGS. 15 through 18 show example of spectrum splitting for each of the M sets where M is assumed to be 4 for purpose of simplification and illustration. While the carrier frequency is unknown, one of the M data sets has a GPS signal energy level high enough to permit correlation detection. Of the examples in FIGS. 15 through 18, the one in FIG. 15 (the set R(i×M)) contains frequency components of the received signal r(n); the remaining three sets are shown containing only noise.

In practice, the actual carrier frequency $k_0$ is not an exact equivalent of k' but an approximation thereof. That is, if $k_0$ falls somewhere between $k_0'$ and $k_0'+1$, i.e., if $k_0' \leq K < k_0'+1$, then correlation points are detected at both $k'=k_0'$ and $k'=k_0'+1$. In that case, the correlation is the greater the closer the point to $k_0$.

If the FFT result R(K) is divided into M data sets as described above and if M is 2 to the n-th power, "n" being an integer, then each of the M sets can be computed independently in accordance with the characteristics of the FFT computation procedure.

Figure 20:
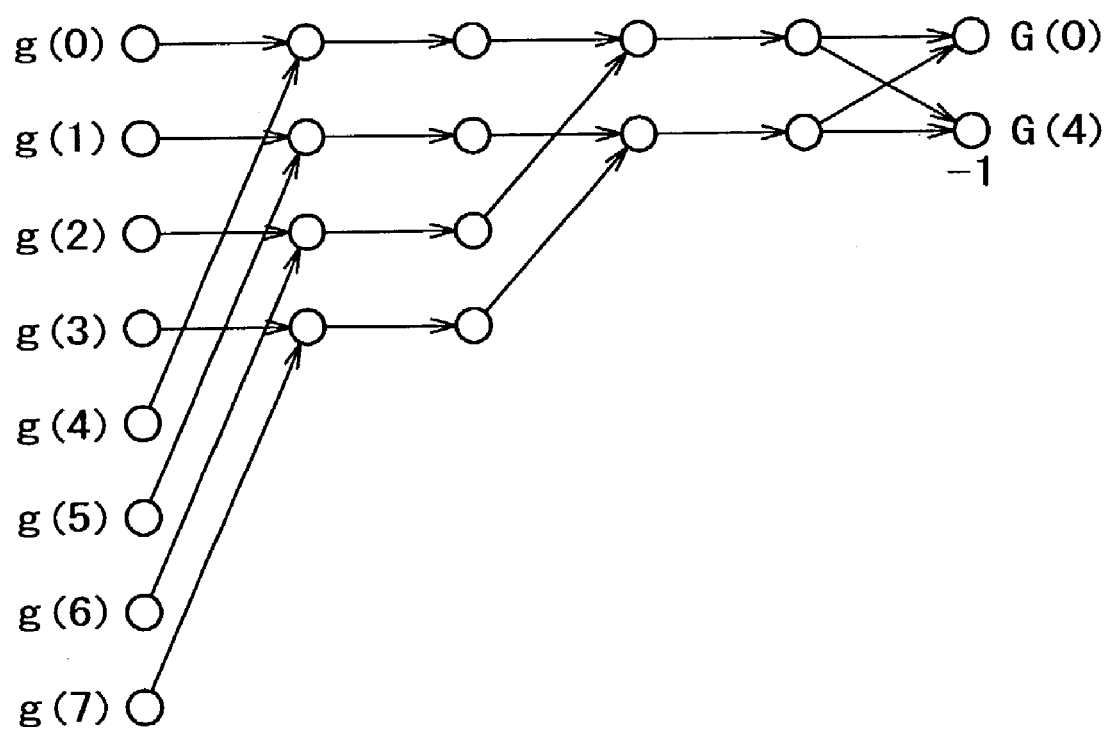
FIG. 20 is another explanatory view of the fourth example of the synchronous acquisition method.

FIG. 19 is a signal flow diagram showing how FFT computations are performed on eight data elements g(0) through g(7). Suppose that the result G(F) of FFT in FIG. 19 is divided into four sets of data sampled at intervals of four data elements, i.e., (G(0), G(4)), (G(1), G(5)), (G(2), G(6)) and (G(3), G(7)). If the set (G(0), G(4)) is considered, it can be appreciated that computations are limited only to the portion shown in FIG. 20. This computational structure is common to the remaining sets (G(1), G(5)), (G(2), G(6)) and (G(3), G(7)).

The four data sets are then checked one by one. More specifically, the data set (G(0), G(4)) is first brought into a memory and computed. Following the computation, the memory is cleared of its content, i.e., of the data set (G(0), G(4)), before the next data set is loaded and computed. These steps are performed successively on each of the remaining data sets (G(1), G(5)), (G(2), G(6)) and (G(3), G(7)). According to this scheme, the memory need only have a capacity one-fourth that which is needed if the data G(0) through G(7) as a whole were subjected to FFT computations. The number of times computations are performed on M data sets is the same as that in effect when FFT computations are carried out collectively on all data.

The procedure of the above examples applies to R(i×M), R(i×M+1), R(i×M+2), ..., R(i×M+M−1) where M is 2 to the n-th power, "n" being an integer. The capacity of the memory for accommodating the result of FFT is 1/M of MN (i.e., N). If a correlation point is detected halfway through the correlation detection steps covering the data sets R(i×M), R(i×M+1), R(i×M+2), ..., R(i×M+M−1), then there is no need to check any remaining data sets. It follows that the processing time can be shorter than if the received signal as a whole is subjected to FFT processing at intervals of M spread code periods.

Figure 21:
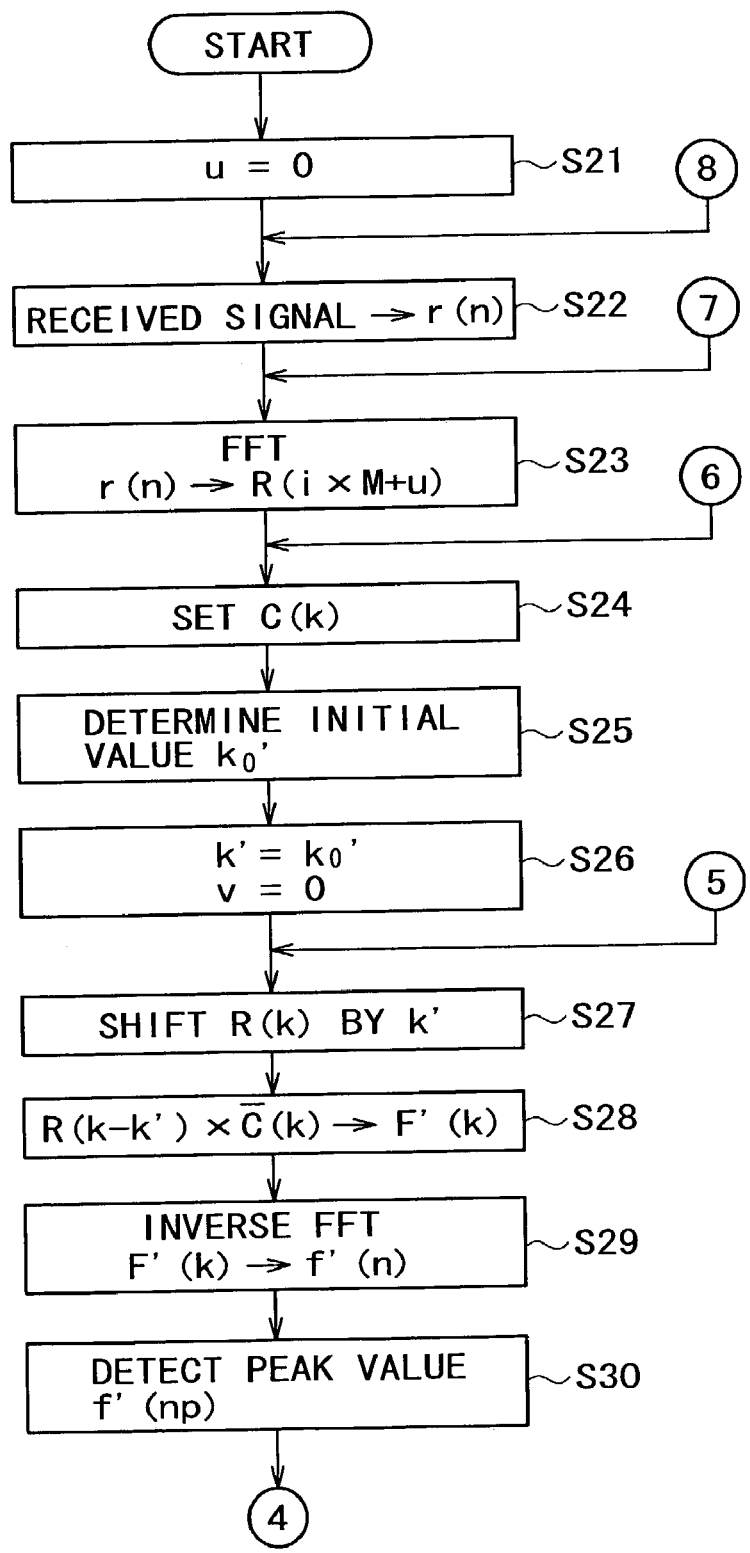
FIG. 21 is a flowchart of steps showing how the fourth example of the synchronous acquisition method operates.
Figure 22:
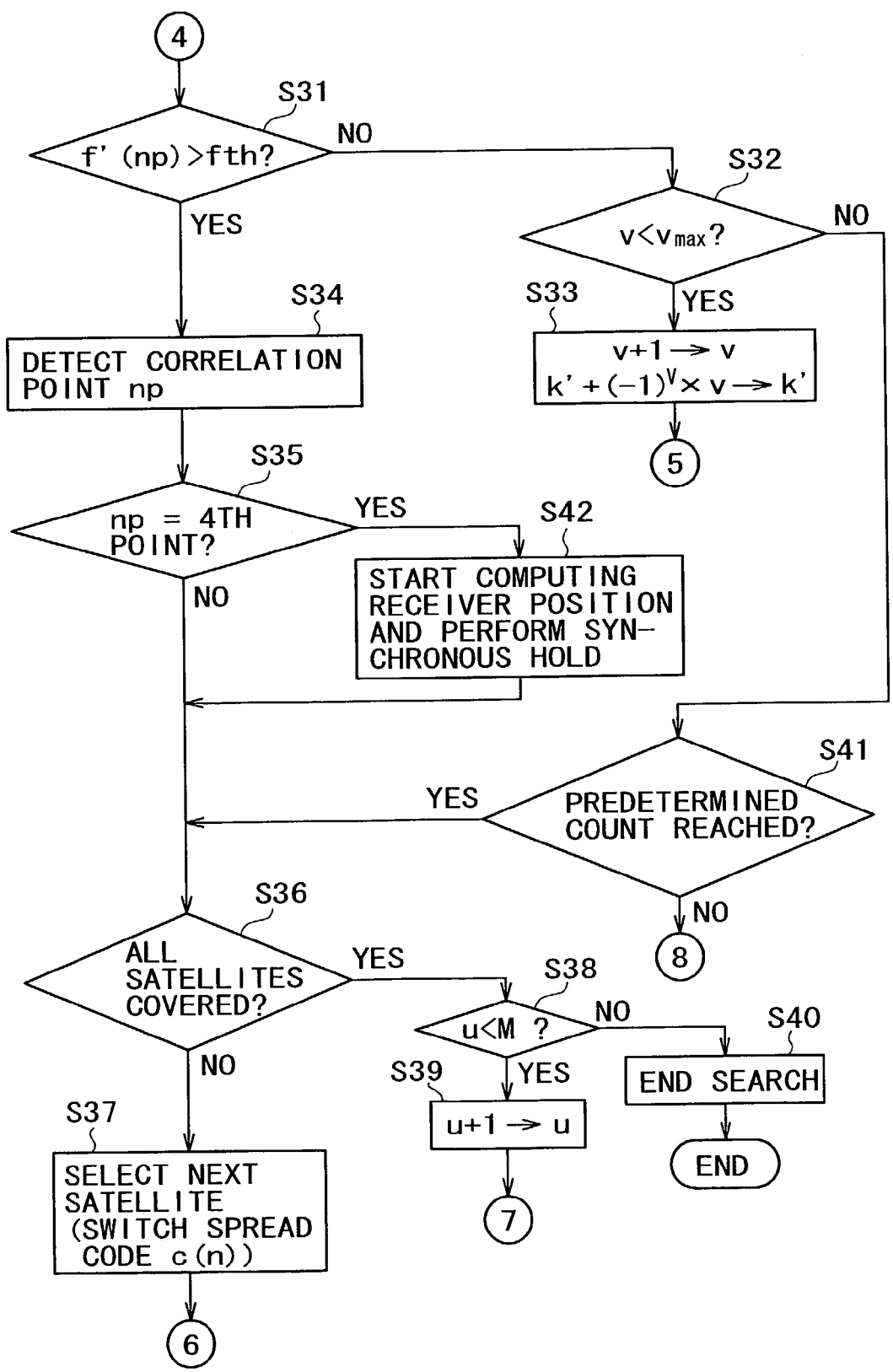
FIG. 22 is another flowchart of steps showing how the fourth example of the synchronous acquisition method operates.

The flow of processing by the synchronous acquisition unit 20 in the fourth example above will now be described with reference to the flowcharts of FIGS. 21 and 22. In this process flow, a carrier frequency search is performed on each FFT data set and about all target satellites for correlation detection, so that the FFT count will be minimized. The steps in FIGS. 21 and 22 represent primarily software-based processing by the DSP 23.

In step S21, a variable "u" ($0 \leq u < M$) in the number of split data sets from R(k) ($0 \leq K < NM$ and $K = i \times M + u$) is initialized. In step S22, IF data from the frequency conversion unit 10 are sampled by the sampling circuit 21 setting to the RAM 22 what is sampled as a signal r(n) ($0 \leq n \leq MN$) spanning M spread code periods (e.g., 16 periods or 16 milliseconds). In step S23, the FFT processing unit 101 performs FFT on the signal r(n) and writes the result R(K) of the operation to the memory 102. In step S24, the result C(k) of FFT on the spread code corresponding to the GPS satellite whose signal has been received is set to the memory 106.

In step S25, past data are illustratively referenced to determine an initial shift amount $k_0'$ by which to read the result R(K) of FFT on the received signal r(n) from the memory 102. In step S26, the initial value $k_0'$ thus determined is established as a shift amount k' by which to read the result of FFT from the memory 102, and a shift control change count "v" is set to the initial value (=zero).

In step S27, the result R(K) of FFT on the received signal r(n) is read from the address in the memory 102 following an address shift by k'. In step S28, the retrieved result R(K−k') of FFT is multiplied by a complex conjugate of the result C(k) of FFT on the spread code, whereby a correlation function F'(k) is obtained.

In step S29, a time-domain function f'(n) is obtained by performing inverse FFT on the correlation function F'(k). In step S30, a peak value f'(np) is obtained from the function f'(n). In step S31 of FIG. 22, a check is made to see if the peak value f'(np) is greater than a predetermined threshold value fth.

If in step S31 the peak value f'(np) is judged to be smaller than the predetermined threshold value fth, that means no correlation point is detected. In that case, step S32 is reached in which a check is made to see if the shift control change count "v" is smaller than a predetermined maximum value $v_{max}$. The maximum value $v_{max}$ corresponds to 1 kHz when converted to frequencies.

If in step S32 the shift control change count "v" is judged to be smaller than the maximum value $v_{max}$, then step S33 is reached. In step S33, the shift control change count "v" is incremented by 1 (v=v+1), and a new shift amount k' is set as $k'=k'+(-1)^v \times v$. Step S33 is followed by step S27, and the subsequent steps are repeated.

If in step S32 the shift control change count "v" is judged to be greater than the predetermined maximum value $v_{max}$, then step S41 is reached. In step S41, a check is made to see if a predetermined count set for the current data in the RAM 22 is exceeded. If the predetermined count is not judged to be exceeded, then control is returned to step S22, new data are set to the RAM 22, and the subsequent steps are repeated.

If in step S41 the predetermined count is judged exceeded, then step S36 is reached. In step S36, a check is made to see if the spread code synchronous search has ended, covering all target satellites. If in step S36 the search is judged to have ended regarding all satellites, then step S38 is reached and a check is made to see if the variable "u" is smaller than its maximum value M. If the variable "u" is judged to be smaller than the value M, then step S39 is reached and the variable "u" is incremented by 1. Step S39 is followed by step S23, and the subsequent steps are repeated.

If in step S38 the variable "u" is judged to be equal to or greater than the maximum value M, then step S40 is reached. In step S40, the search operation is terminated.

If in step S36 there is found any satellite on which the spread code synchronous search has not ended, then step S37 is reached. In step S37, the yet-to-be selected satellite is selected for the search, and the spread code setting is switched to the spread code c(n) used by the selected satellite. Step S37 is followed by step S24, and the subsequent steps are carried out.

If in step S31 the peak value f'(np) is judged to be greater than the predetermined threshold value fth, then step S34 is reached. In step S34, a discrete time (spread code phase) "np" at which the value f'(np) peaks is detected as the correlation point.

In step S35, a check is made to see if the detected correlation point "np" is a fourth point. If the correlation point is judged to be the fourth point, step S42 is reached. In step S42, the process of computing the position of the GPS receiving apparatus is started, and the synchronous hold unit 30 performs synchronous hold processing. Step S42 is followed by step S36. The process of step S42 may alternatively be carried out at a fifth or a subsequent correlation point.

Based on the read address shift amount k' in effect when the correlation point "np" was detected in step S34, and based on the variable "u" in the split data set count of R(k), it is possible to estimate a Doppler shift amount regarding the GPS satellite being received as well as an error in the oscillation frequency of the GPS receiving apparatus.

If in step S35 the detected correlation point "np" is judged to be other than a fourth point, then step S36 is reached and the subsequent steps are carried out.

If the carrier frequency is known beforehand as in the above-described first example of synchronous acquisition, then only those relevant of the data sets R(i×M), R(i×M+1), R(i×M+2), . . . , R(i×M+M−1) may be subjected to computations. In that case, it is possible to utilize similarly the method of performing FFT on the received signal in increments of data spanning a plurality of spread code periods.

[Fifth Example of Synchronous Acquisition by the Digital Matched Filter]

In the third and the fourth examples of synchronous acquisition described above, the data spanning M spread code periods are set to the RAM 22. The M-period-long data are retrieved by the DSP 23 for the above-described FFT computations in a synchronous acquisition process. In such cases, huge quantities of data are processed by the DSP 23, which can entail large amounts of computations to be carried out at reduced processing speeds.

A fifth example of synchronous acquisition, as discussed in connection with the third example, involves setting to the RAM 22 the IF data spanning M periods of the spread code (e.g., over 16 periods or 16 milliseconds) so that FFT computations are performed for synchronous acquisition in increments of M-period-long data. What characterizes the fifth example is that the speed of processing is boosted by carrying out preprocessing steps designed to reduce the number of data samples before the FFT processing unit 101 performs its FFT process. The sampling frequency of the sampling circuit 21 is illustratively 4.096 MHz.

Figure 23:
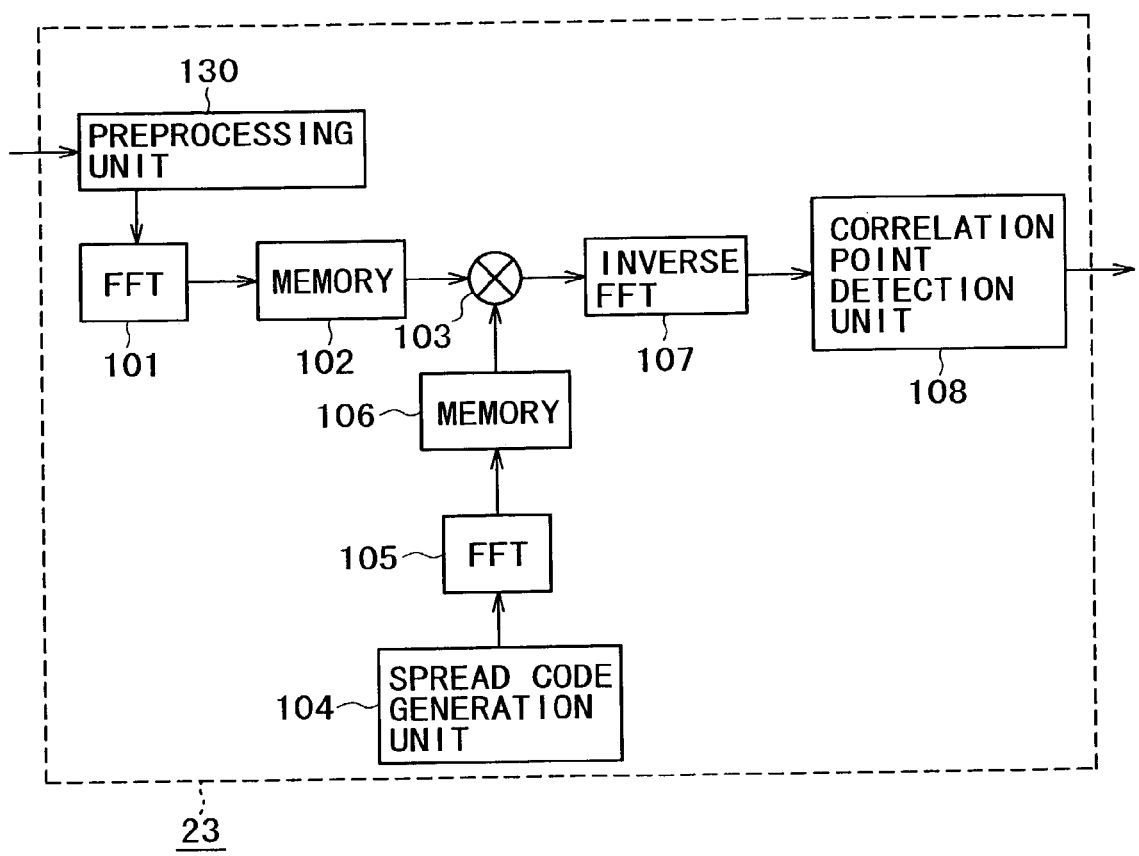
FIG. 23 is a block diagram explaining a fifth example of the synchronous acquisition method.

FIG. 23 is a block diagram showing a typical structure of the DSP 23 for use with the fifth example. In this setup, a preprocessing unit 130 is furnished upstream of the FFT processing unit 101. The rest of the components are the same as those in the preceding examples.

The preprocessing unit 130 has a RAM whose capacity is equivalent to data spanning one spread code period. That is, in the fifth example, the M-period-long data set to the RAM 22 are equal to one-period-long data of the same spread code being repeated M times. Because there exist only the data one spread code period long having the frequency component, as discussed above in conjunction with the third example of synchronous acquisition, the preprocessing unit 130 reduces the amount of data spanning M periods of the spread code into a quantity of data spanning a single period of the spread code.

The preprocessing in the fifth example involves executing an algorithm that computes subsets (S[0], S[1], . . . , S[N−1], where N represents the number of sampled data over one period of the spread code) of M-period-long data d(n) (0≦n<L, where L denotes the number of all data spanning M periods of the spread code) subject to discrete Fourier transform. The subset S[k] (0≦k<L, where "k" stands for a discrete frequency in effect following discrete Fourier transform) is defined as follows:

$$S[k]=D[k \times M+r]$$

where, D stands for data "d" having undergone discrete Fourier transform, M equals L/N, and "r" denotes a Doppler frequency constant (0≦r<M).

Figure 24:
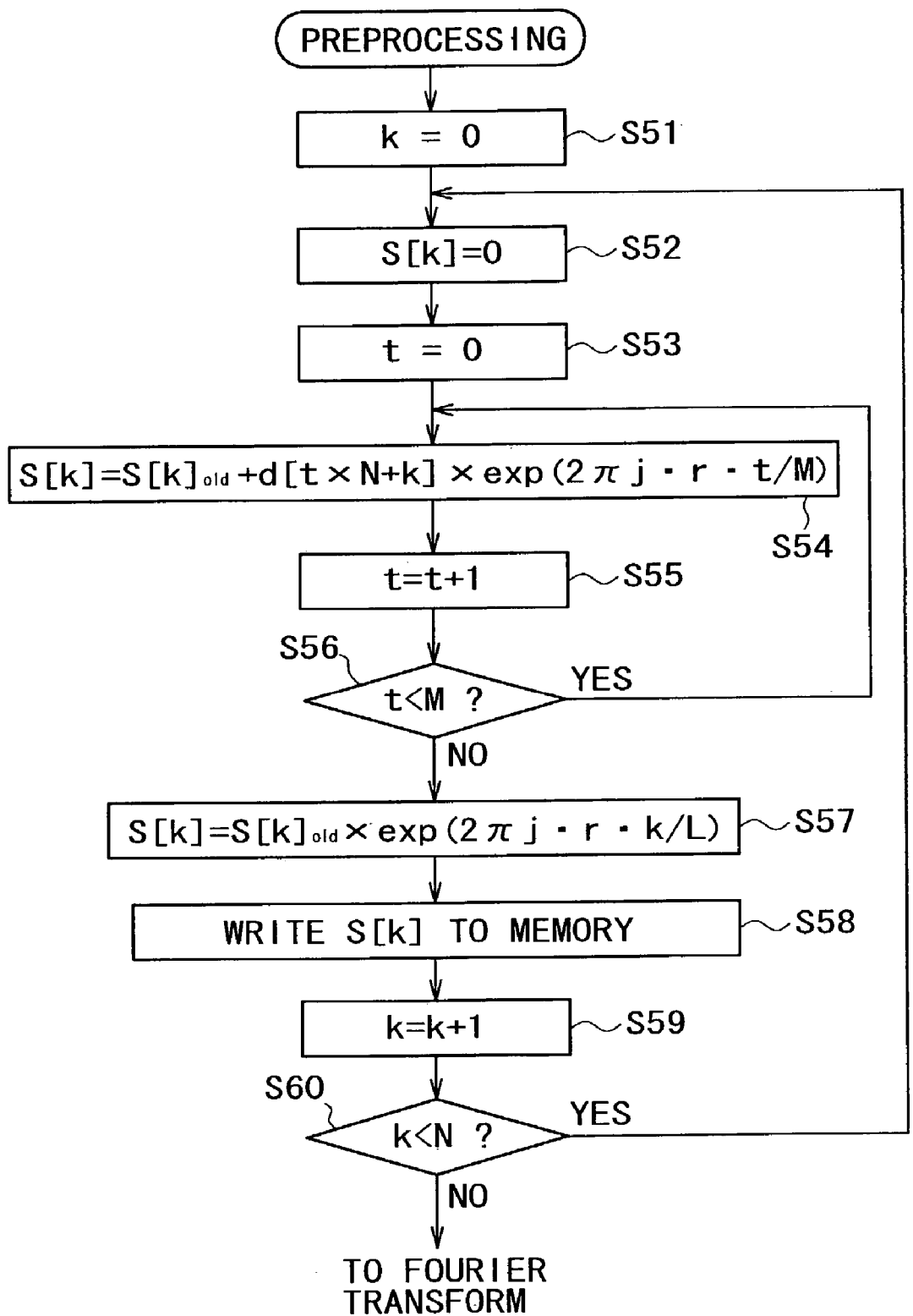
FIG. 24 is a flowchart of steps outlining how the fifth example of the synchronous acquisition method operates.

FIG. 24 is a flowchart of steps in which the preprocessing unit 130 typically carries out its algorithm.

In step S51, the variable "k" is initialized (k=0). In step S52, the subset S[k] is initialized (S[k]=0). In step S53, a repeat variable "t" (0≦t<M) is initialized (t=0). In step S54, expression Q1 below is computed:

$$S[k]=S[k]_{old}+d[t \times N+k] \times \exp(2\pi j \cdot r \cdot t/M) \quad \text{expression Q1}$$

Specifically, expression Q1 is a computation that supplements the value $S[k]_{old}$ which was in effect a value of "1" earlier (of variable "t"), with the following term about the current variable "t":

$$d[t \times N+k] \times \exp(2\pi j \cdot r \cdot t/M)$$

Because the data d(n) are obtained by sampling 1-bit IF digital data from the A/D converter 18, the term d[t×N+k] equals +1 or −1. For this reason, the computation of expression Q1 is constituted by a single addition or subtraction.

In the term $\exp(2\pi j \cdot r \cdot t/M)$, "t" represents the only variable. Because the variable "t" takes values solely between 0 and M−1, the values of the term exp(2πj·r·t/M) may be stored beforehand in the form of an M-element table. Using that table eliminates the need for computing the term exp (2πj·r·t/M) every time the variable "t" is changed, whereby the speed of computation is boosted.

At the end of the computation of expression Q1 in step S54, step S55 is reached in which the variable "t" is incremented by 1. In step S56, a check is made to see if the variable "t" is smaller than M. If the variable "t" is judged to be smaller than M, step S54 is reached again and the computation of expression Q1 is repeated. If in step S56 the variable "t" is judged to be equal to or larger than M, then step S57 is reached and the following expression Q2 is computed:

$$S[k] = S[k]_{old} \times \exp(2\pi j \cdot r \cdot k/L) \quad \text{expression Q2}$$

Specifically, expression Q2 is a computation that multiplies the value $S[k]_{old}$ which was in effect a value of "1" earlier (of variable "k"), by the following term about the current variable "k":

$$\exp(2\pi j \cdot r \cdot k/M)$$

At the end of the computation of expression Q2 in step S57, step S58 is reached in which the obtained value S[k] is written to the memory of the preprocessing unit 130. In step S59, the variable "k" is incremented by 1. In step S60, a check is made to see if the variable "k" is smaller than N. If the variable "k" is judged to be smaller than N, step S52 is reached again and the subsequent steps are repeated. If the variable "k" is judged to be equal to or larger than N, then the preprocessing is terminated and a fast Fourier transform process is started.

The preprocessing above reduces what is targeted by FFT from L elements of all data spanning the M spread code periods to N elements over one period of the spread code. This significantly accelerates FFT computations.

[Sixth Example of Synchronous Acquisition by the Digital Matched Filter]

As with the fifth example above, a sixth example of synchronous acquisition involves increasing the speed of processing by carrying out preprocessing steps for reducing the number of data samples before the FFT processing unit 101 in the DSP 23 performs its FFT process.

The structure of the DSP 23 for the sixth example is basically the same as that shown in FIG. 23 for the fifth example above. The difference is that details of the preprocessing performed by the preprocessing unit 130 differ from those in the fifth example.

In the sixth example, M-period-long data set to the RAM 22 are also equal to one-period-long data of the same spread code being repeated M times. Because there exist only the data one spread code period long having the frequency component, as explained above in connection with the third example of synchronous acquisition, the preprocessing unit 130 reduces the amount of data spanning M periods of the spread code into a quantity of data spanning a single period of the spread code.

Figure 25:
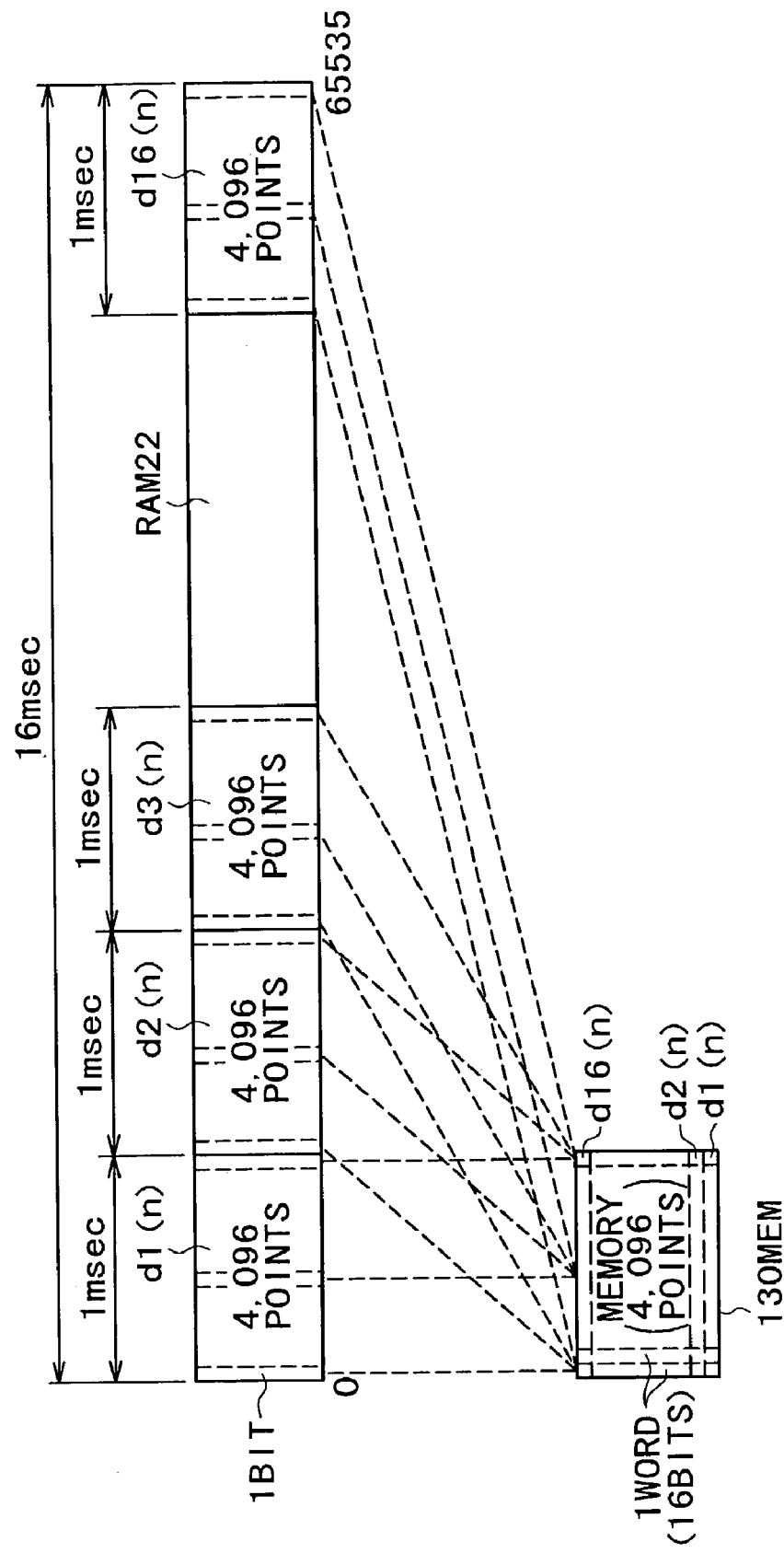
FIG. 25 is a schematic view explaining key operations of a sixth example of the synchronous acquisition method.

FIG. 25 shows illustratively how preprocessing is carried out in the sixth example. As shown in FIG. 25, the sampling frequency of the sampling circuit 21 is 4.096 MHz, and M=16, i.e., data are set to the RAM 22 at intervals of 16 milliseconds for FFT processing.

In the case of FIG. 25, IF data placed into the RAM 22 are made up of 16 data groups d1(n), d2(n), d3(n), . . . , d16(n) spanning one spread code period. In this case, each of the data groups is made up of 4,096 points so that the entire data spanning 16 milliseconds are composed of 65,536 points.

Given the nature of GPS satellite signals, the value at the same point from the beginning of each of the 16 data groups d1(n), d2(n), d3(n), . . . , d16(n) should have the same spread code component. Furthermore, each point should correspond to 1-bit data as mentioned above.

Given these assumptions, the preprocessing unit 130 for the sixth example is furnished with a memory 130MEM having a 4,096-word capacity, one word being constituted by 16 bits.

The data at the same point from the beginning of each of the 16 data groups d1(n), d2(n), d3(n), . . . , d16(n) spanning one spread code period are written to the same word address in the memory 130MEM so that a single word is formed at the address. Following this operation, 16-millisecond-long data are placed into the memory 130MEM as 4,096-word data.

FFT computations are carried out on such 16-bit word data. If the DSP 23 is capable of processing in increments of 16 bits, then the memory access count during FFT amounts to 4,096, one-sixteenth the count of 65,536 in cases where preprocessing is not performed. This translates into a significant improvement in the velocity of FFT processing.

The operations above are expressed in more general terms as follows: for FFT processing in increments of data spanning M spread code periods where there are N spread code data elements per period, the preprocessing unit 130 writes data in effect at the same point corresponding to the same spread code component, to the same word address in the memory 130MEM.

More specifically, if NM data are numbered starting at "0," then the data at the 0th, N-th, 2N-th, . . . , (M−1)N-th points are written to a word address "0" in the memory 130MEM; the data at the 1st, (1+N)-th, (1+2N)-th, . . . , (1+(M−1)N)-th points are written to a word address "1" in the memory; and the data at the (N−1)-th, ((N−1)+N)-th, ((N−1)+2N)-th, . . . , ((N−1)+(M−1)N)-th points are written to a word address "N−1" in the memory.

FFT computations are carried out on such M-bit word data. If the DSP 23 is capable of processing in increments of "w" bits, then the memory access count during FFT amounts to N×M/w, one w-th the count of NM in cases where preprocessing is not performed. This represents an appreciable improvement in the speed of FFT processing.

The first through the sixth samples of synchronous acquisition discussed above can significantly shorten processing time through FFT-based digital matched filter processing using a high-speed DSP, as opposed to conventional sliding correlators which take time theoretically in their processing. In particular, the third through the sixth examples execute synchronous acquisition at high levels of sensitivity because FFT processing is carried out in increments of M spread code periods.

Furthermore, the fourth through the sixth examples are arranged suitably to effect FFT processing at even higher speeds in increments of M spread code periods.

The above-described method of correlation computation using a digital matched filter for synchronous acquisition is not limited in application to GPS satellite signals alone; the method may also be applied to the synchronous acquisition of the spread code and carrier of any received signal in which the carrier is modulated by a signal with data spread-spectrum-encoded therein. For the third, the fourth, the fifth and the sixth examples, it should be noted, the signal to be handled should be one such as a GPS satellite signal wherein a plurality of spread code periods should constitute the data bit, i.e., wherein the same signal should occur in each of the multiple spread code periods.

When the synchronous acquisition unit 20 operating on the synchronous acquisition method above acquires synchronously signals from at least four GPS satellites, the GPS receiving apparatus can compute its position and speed based on the spread code phases and IF carrier frequencies of the received signals. In other words, the receiving apparatus position can be computed without recourse to the synchronous hold unit 30.

However, for the GPS receiving apparatus to compute its position and speed with sufficient precision requires accurately detecting spread code phases and IF carrier frequencies. That in turn requires raising the sampling frequency of the sampling circuit 21 and prolonging the time length of the IF data to be placed into the RAM 22.

If the synchronous acquisition unit 20 is structured to incorporate a digital matched filter, that filter itself must be devoid of synchronous hold functions.

If no navigation messages are obtained from outside the GPS receiving apparatus, then the synchronous acquisition unit 20 needs to decode navigation messages of at least four GPS satellites at intervals of 20 ms. That means the DSP 23 needs constantly to detect synchronism and to decode navigation messages at considerably high speeds.

Thus if the synchronous acquisition unit 20 alone were used to compute the position and speed of the GPS receiving apparatus with sufficient precision, the bulky hardware involved would cost more and dissipate more power. This can be a serious disadvantage in practically manufacturing GPS receiving apparatuses.

With such aspects taken into account, this embodiment of the invention has the synchronous acquisition unit 20 dedicated to low-precision synchronous acquisition and the synchronous hold unit 30 that holds signals from multiple GPS satellites synchronously and decodes navigation messages therefrom. Through the control unit 40, the synchronous acquisition unit 20 transfers to the synchronous hold unit 30 signal strength information composed of the satellite numbers of detected GPS satellites, spread code phases, IF carrier frequencies, and correlation detection signals. In turn, the synchronous hold unit 30 starts operating on the received data taken as initial values, as will be described later.

[Structure of the Synchronous Hold Unit 30]

In order to hold synchronously multiple GPS satellite signals in parallel, the synchronous hold unit 30 has a plurality of channels allowing each GPS satellite signal to be assigned one channel.

Figure 26:
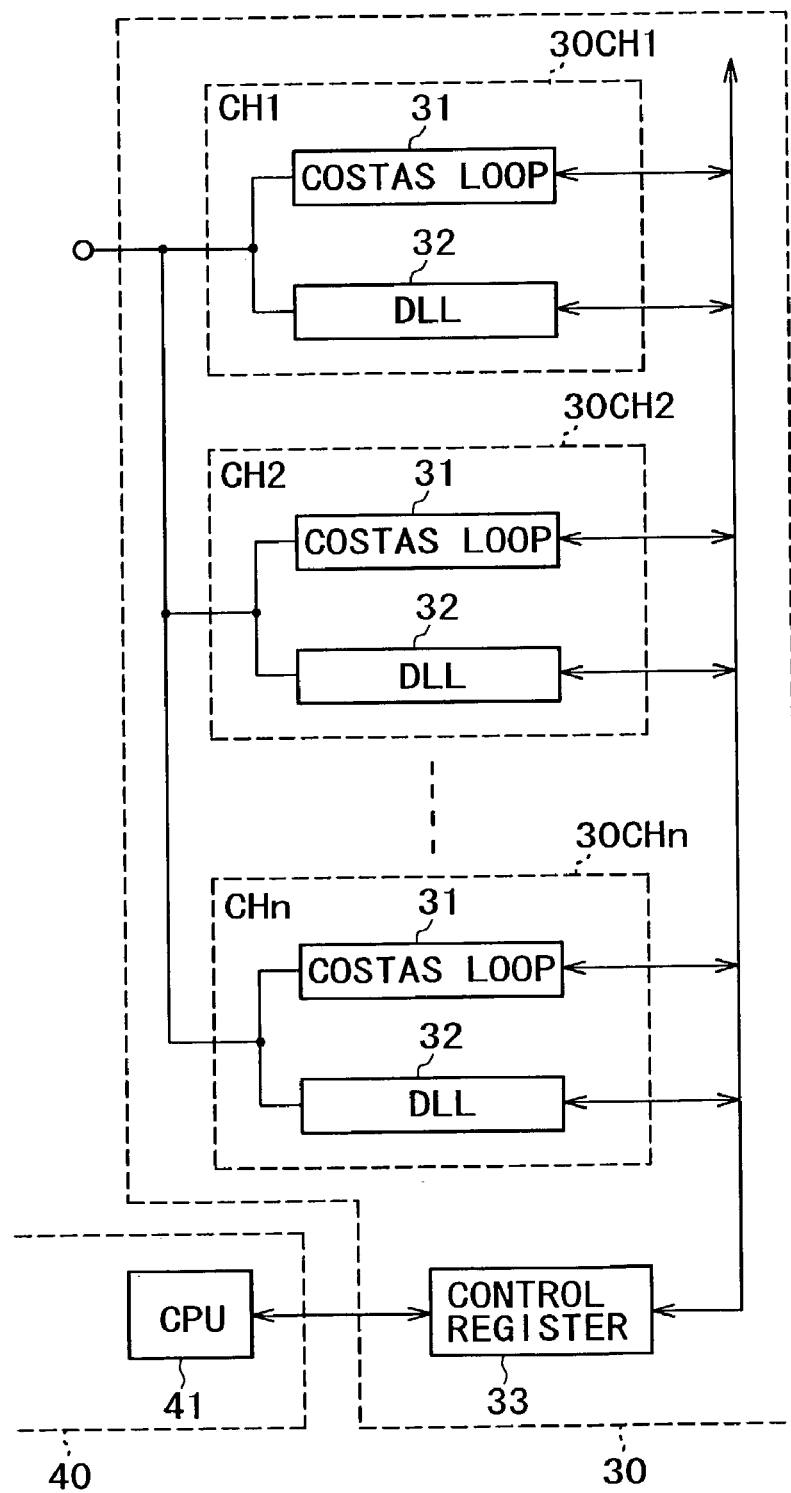
FIG. 26 is a block diagram illustrating a typical structure of a synchronous hold unit as part of the embodiment in FIG. 1.

FIG. 26 is a block diagram illustrating a typical structure of the synchronous hold unit 30 as part of this embodiment. The synchronous hold unit 30 includes "n" channel synchronous hold elements 30CH1, 30CH2, ..., 30CHn; and a control register 33. Each of the channel synchronous hold elements 30HC1 through 30CHn includes a Costas loop 31 and a DLL (delay locked loop) 32.

The control register 33 is connected to the CPU 41 of the control unit 40. As will be discussed later, the control register 33 receives loop filter parameters of the Costas loop 31 and DLL 32 as well as data in which to define filter characteristics. The data thus received are set where designated on the channels under control of the CPU 41. The control register 33 further receives correlation value information and frequency information from the loop filters of the Costas loop 31 and DLL 32. The register 30 forwards such information to the CPU 41 when accessed by the latter.

[Structures of the Costas Loop 31 and DLL 32]

Figure 27:
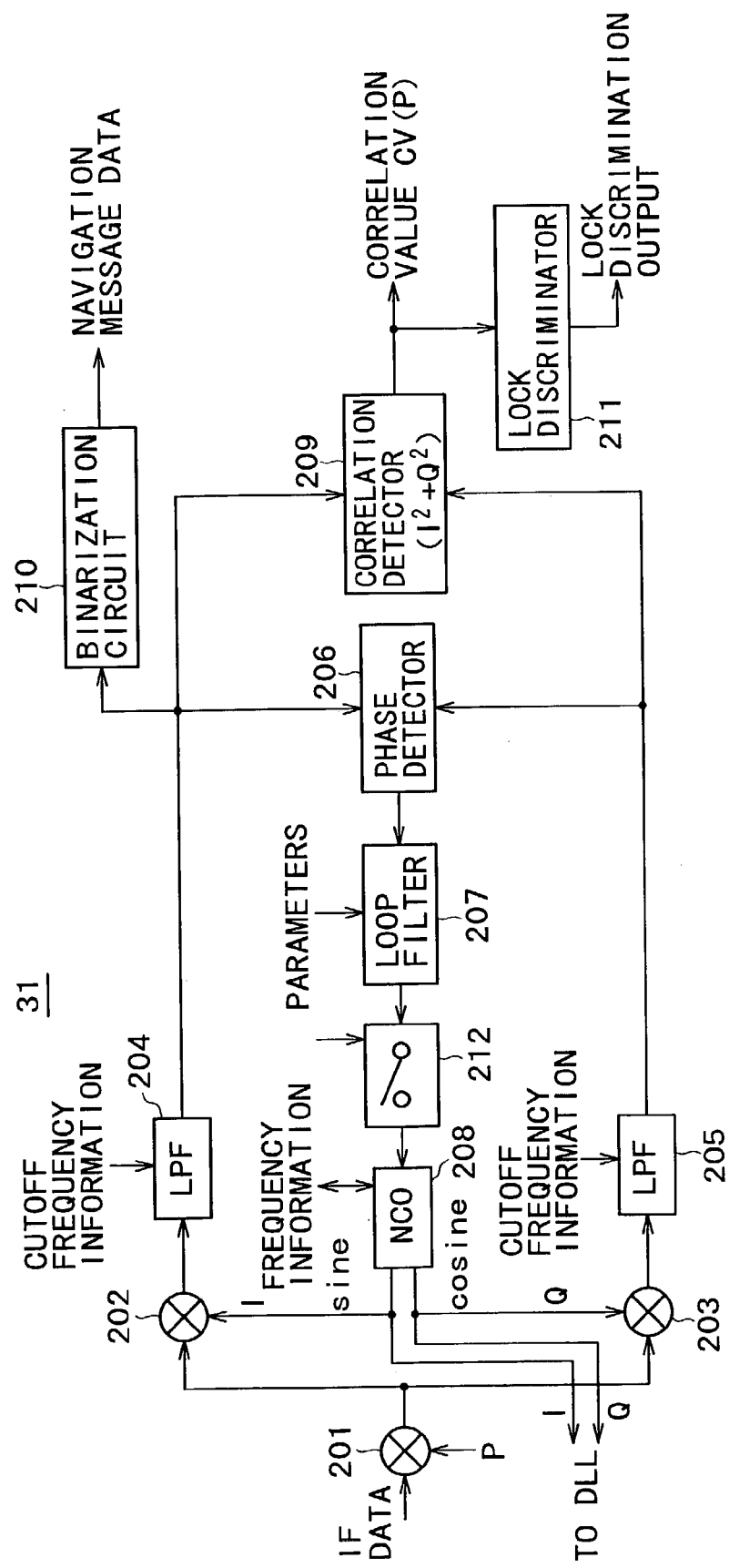
FIG. 27 is a block diagram of a typical Costas loop arrangement as part of the synchronous hold unit in FIG. 26.
Figure 28:
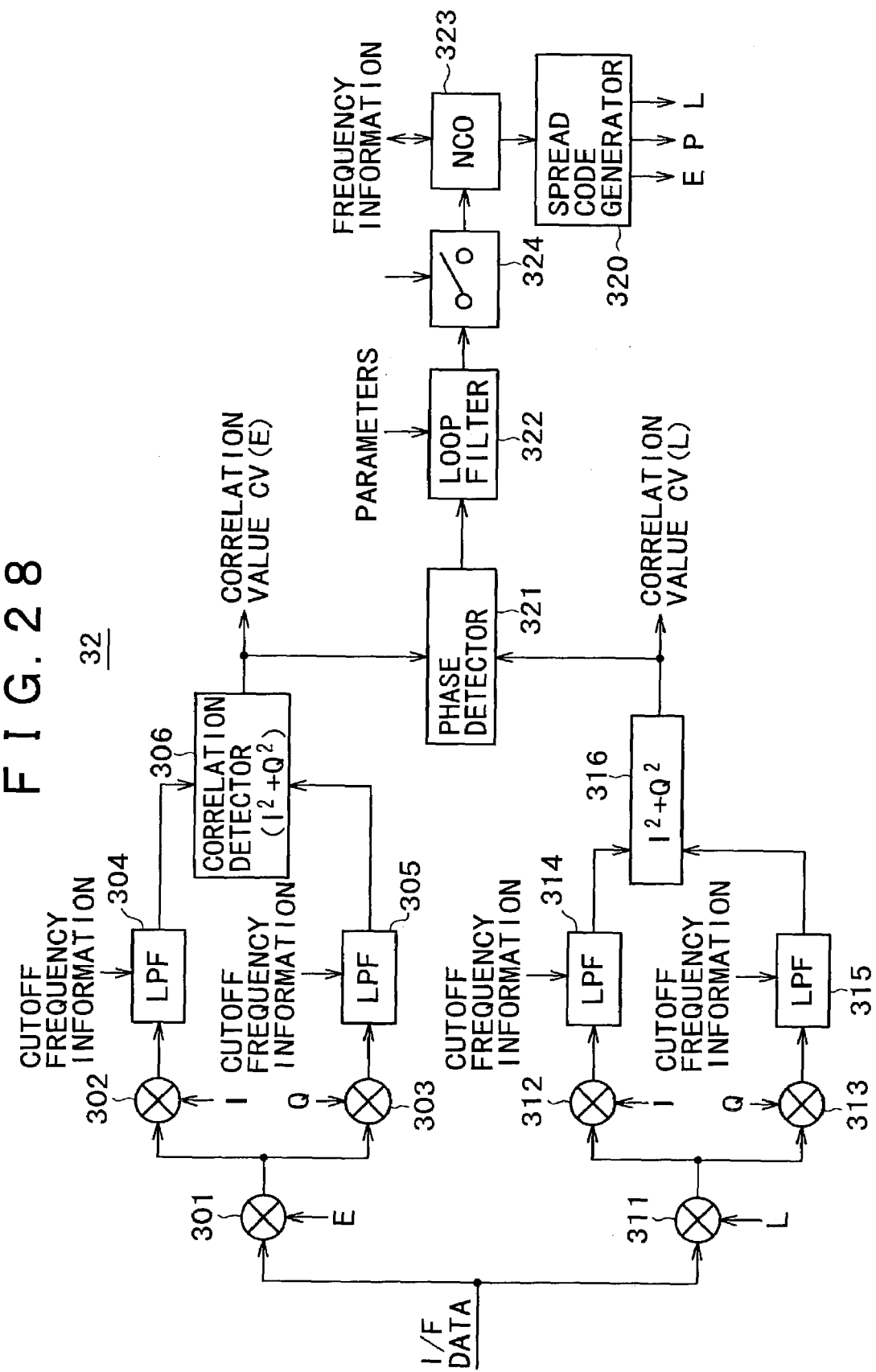
FIG. 28 is a block diagram of a typical DLL arrangement as part of the synchronous hold unit in FIG. 26.

FIG. 27 is a block diagram showing a typical structure of the Costas loop 31. FIG. 28 is a block diagram depicting a typical structure of the DLL 32.

The Costas loop 31 synchronously holds IF carrier frequencies and extracts navigation messages which constitute transmitted data. The DLL 32 synchronously holds phases of the spread codes in given GPS satellite signals. The Costas loop 31 and DLL 32 operate in concert to perform spread spectrum decoding of each GPS satellite signal. By so doing, the loops obtain a signal prior to spread spectrum encoding and decode the signal thus obtained to acquire a navigation message. The navigation message thus obtained is supplied to the CPU 41 in the control unit 40. The workings of the Costas loop 31 and DLL 32 are described below in more specific terms.

[How the Costas Loop 31 Works]

IF data from the frequency conversion unit 10 are sent to a multiplier 201. The multiplier 201 is also fed with the spread code from a spread code generator 320 in the DLL 32 of FIG. 28.

The spread code generator 320 in the DLL 32 generates spread codes of three phases: a prompt spread code P, an early spread code E, and a late spread code L. The DLL 32 computes correlations between the earlier spread code E and late spread code L on the one hand and IF data on the other hand and, in a manner to be discussed later, causes the spread code generator 320 to generate spread code phases making the correlation values equal to one another, whereby the prompt spread code P is synchronized in phase with the spread code of the GPS satellite signal.

The multiplier 201 designed for spread spectrum decoding in the Costas loop 31 is supplied with the prompt spread code P from the spread code generator 320. The spread-spectrum-decoded IF data from the multiplier 201 are sent to multipliers 202 and 203.

As shown in FIG. 27, the Costas loop 31 includes the multipliers 202 and 203, low-pass filters 204 and 205, a phase detector 206, a loop filter 207, an NCO (numerical controlled oscillator) 208, a correlation detector 209, a binarization circuit 210, a lock discriminator 211, and a switching circuit 212.

Cut-off frequency information for the low-pass filters 204 and 205, parameters for defining the filter characteristics of the loop filter 207, and frequency information for determining an oscillated center frequency of the NCO 208 are set through the control register 33 by the CPU 41 based on the result of synchronous acquisition by the synchronous acquisition unit 20, as will be discussed later.

The switching circuit 212 is switched on and off by a switching control signal from the CPU 41 in order to make or break the Costas loop 31. In an initial state before a synchronous hold operation is started, the switching circuit 212 is turned off to keep the loop broken. When the correlation output of the correlation detector 209 in the Costas loop 31 has reached a significant level following the start of the synchronous hold operation, the switching circuit 212 is turned on to make the loop.

The spread-spectrum-decoded signal from the multiplier 201 is forwarded to the multipliers 202 and 203. The multipliers 202 and 203 are fed respectively with a sine signal I and a cosine signal Q from the NCO 208. The sine and cosine signals are orthogonal to each other in phase and have approximate IF carrier frequencies based on the frequency information from the CPU 41 of the control unit 40.

The results of multiplication by the multipliers 202 and 203 are supplied to the phase detector 206 through the low-pass filters 204 and 205. In receiving cut-off frequency information from the CPU 41 of the control unit 40, the low-pass filters 204 and 205 remove out-of-band noises from the supplied signals.

Based on the signals from the low-pass filters 204 and 205, the phase detector 206 detects a phase error between the IF carrier and the frequency signal from the NCO 208. The detected phase error is sent to the NCO 208 through the loop filter 207. In turn, the NCO 208 is controlled so that its output frequency signal is synchronized in phase with the IF carrier component.

In accordance with parameters from the CPU 41 of the control unit 40, the loop filter 207 integrates phase error information from the phase detector 206 to generate an NCO control signal for control over the NCO 208. The NCO control signal from the loop filter 207 allows the NCO 208 to synchronize its output frequency signal with the IF carrier component in phase, as mentioned above.

The outputs of the low-pass filters 204 and 205 in the Costas loop 31 are sent to the correlation detector 209. The correlation detector 209 in turn squares each of the output signals from the low-pass filters 204 and 205, adds up the squared results, and outputs the sum. The output of the correlation detector 209 represents a correlation value CV(P) between the IF data and the prompt spread code P from the spread code generator 320. The correlation value CV(P) is transferred to the CPU 41 of the control unit 40 by way of the control register 33.

The output signal of the low-pass filter 204 is sent to the binarization circuit 210. The binarization circuit 210 in turn outputs navigation message data.

The correlation value CV(P) from the correlation detector 209 is also fed to the lock discriminator 211. The lock discriminator 211 compares the correlation value CV(P) with a predetermined threshold value. If the correlation value CV(P) is judged to be greater than the threshold value, the lock discriminator 211 outputs a decision indicating that synchronous hold is in a locked state. If the correlation value CV(P) is judged to be smaller than the threshold value, the lock discriminator 211 outputs a decision indicating that synchronous hold is in an unlocked state.

With this embodiment, the lock decision output is sent to the CPU 41 of the control unit 40. Given the decision, the CPU 41 recognizes the locked or unlocked state of the synchronous hold unit 30.

[How the DLL 32 Works]

In the DLL 32, as depicted in FIG. 28, the IF data from the frequency conversion unit 10 are sent to multipliers 301 and 311. The multipliers 301 and 311 are supplied with the early spread code E and late spread code L respectively from the spread code generator 320.

The multiplier 301 multiplies the IF data by the early spread code E for spread spectrum decoding, and feeds the spread-spectrum-decoded signal to multipliers 302 and 303. The multipliers 302 and 303 are fed respectively with the sine signal I and cosine signal Q from the NCO 208 in the Costas loop 31.

The multiplier 302 multiplies the spread-spectrum-decoded IF data by the signal I from the NCO 208, and sends the product to a correlation detector 306 through a low-pass filter 304. Likewise, the multiplier 303 multiplies the spread-spectrum-decoded IF data by the signal Q from the NCO 208, and supplies the product to the correlation detector 306 through a low-pass filter 305.

As with the low-pass filters 204 and 205 in the Costas loop 31, the low-pass filters 304 and 305 receive cut-off frequency information from the CPU 41 of the control unit 40 and remove out-of-band noises from the supplied signals.

The correlation detector 306 squares each of the output signals from the low-pass filters 304 and 305, adds up the squared results, and outputs the sum. The output of the correlation detector 306 represents a correlation value CV(E) between the IF data and the early spread code E from the spread code generator 320. The correlation value CV(E) is supplied to a phase detector 321 and set to the control register 33 for use by the CPU 41 of the control unit 40.

Similarly, the multiplier 311 multiplies the IF data by the late spread code L for spread spectrum decoding, and feeds the spread-spectrum-decoded signal to multipliers 312 and 313. The multipliers 312 and 313 are fed respectively with the sine signal I and cosine signal Q from the NCO 208 as discussed above.

The multiplier 312 multiplies the spread-spectrum-decoded IF data by the signal I from the NCO 208, and sends the product to a correlation detector 316 through a low-pass filter 314. Likewise, the multiplier 313 multiplies the spread-spectrum-decoded IF data by the signal Q from the NCO 208, and supplies the product to the correlation detector 316 through a low-pass filter 315. As with the low-pass filters 304 and 305 above, the low-pass filters 314 and 315 receive cut-off frequency information from the CPU 41 of the control unit 40 and remove out-of-band noises from the supplied signals.

The correlation detector 316 squares each of the output signals from the low-pass filters 314 and 315, adds up the squared results, and outputs the sum. The output of the correlation detector 316 represents a correlation value CV(L) between the IF data and the late spread code L from the spread code generator 320. The correlation value CV(L) is supplied to the phase detector 321 and set to the control register 33 for use by the CPU 41 of the control unit 40.

The phase detector 321 detects a difference between the correlation value CV(E) from the correlation detector 306 and the correlation value CV(L) from the correlation detector 316 to find a phase difference between the prompt spread code and the spread code of the GPS satellite signal. A signal reflecting the phase difference is sent from the phase detector 321 through the loop filter 322 to an NCO (numerical controlled oscillator) 323 as a numerical control signal for the latter.

The spread code generator 320 is fed with an output signal of the NCO 323. Suitably controlling the output frequency of the NCO 323 regulates the spread code phase generated by the spread code generator 320.

As will be described later, the CPU 41 in the control unit 40 supplies the NCO 323 with frequency information for controlling the latter's initial oscillation frequency in keeping with the result of synchronous acquisition by the synchronous acquisition unit 20.

The above-described loop control by the DLL 32 causes the NCO 323 to regulate the spread code generator 320 so that the latter generates phases of the spread codes P, E and L such as to make the correlation values CV(E) and CV(L) remain at the same level. This allows the prompt spread code P generated by the spread code generator 320 to synchronize in phase with the spread code derived from spread spectrum encoding of the IF data. As a result, the IF data are accurately spread-spectrum-decoded in accordance with the prompt spread code P. In the Costas loop 31, the binarization circuit 210 decodes and outputs navigation message data.

The decoded output of the navigation message data is fed to a data decoding circuit, not shown, for decoding into data that can be used by the control unit 40, before being sent to the latter. The control unit 40 uses the navigation message data for positioning computations, extracts orbit information (i.e., almanac information and ephemeris information) as needed from the data, and stores the extracted information into the orbit information memory 46.

As with the above-described loop filter 207 in the Costas loop 31, the loop filter 322 in the DLL 32 integrates phase error information from the phase detector 321 based on the parameters supplied from the CPU 41 of the control unit 40. The integration produces an NCO control signal used to control the NCO 323.

In the DLL 32, a switching circuit 324 for making and breaking the loop is also furnished interposingly between the loop filter 322 and the NCO 323. A switching control signal from the CPU 41 turns on or off the switching circuit 324.

In an initial state before a synchronous hold operation is started, the switching circuit 324 is turned off to keep the loop broken. When the correlation output of the correlation detector 209 in the Costas loop 31 has reached a significant level following the start of the synchronous hold operation, the switching circuit 324 is turned on to make the loop as will be discussed later.

[Transition from Synchronous Acquisition to Synchronous Hold]

With this embodiment, as described above, the synchronous acquisition unit 20 transfers the satellite numbers of detected GPS satellites, the spread code phases, IF carrier frequencies, and signal strength information as data to the CPU 41 in the control unit 40. The signal strength information is not mandatory for the transition to synchronous hold processing.

Based on the received data, the CPU 41 of the control unit 40 generates data destined for the synchronous hold unit 30 and transfers the generated data to the latter In turn, the synchronous hold unit 30 starts a synchronous hold operation with the received data taken as initial values.

The data handed over to the synchronous hold unit 30 from the CPU 41 of the control unit 40 are of four kinds: numerical information for determining the initial oscillation frequency (oscillated center frequency) of the NCO 323 controlling the spread code phases generated by the spread code generator 320 in the DLL 32; numerical information for determining the initial oscillation frequency (oscillated center frequency) of the NCO 208 in the Costas loop 31; parameters for determining the filter characteristics of the loop filters 207 and 322; and coefficient information for determining the cut-off frequencies of the low-pass filters 204, 205, 304, 305, 314 and 315 in order to define the ranges of their frequency bands.

The information sent at this point from the CPU 41 to the synchronous hold unit 30 is constituted by the satellite numbers of GPS satellites whose spread codes and IF carriers are about to be subjected to synchronous hold, by the phases and frequencies involved, and by initial value data for determining filter characteristics. The CPU 41 generates the initial value data such that synchronous hold will be started near the spread code phases and IF carrier frequencies derived from the synchronous acquisition by the synchronous acquisition unit 20.

Consequently, the synchronous hold unit 30 starts its synchronous hold operation near the spread code phases and IF carrier frequencies detected by the synchronous acquisition unit 20. In so doing, the synchronous hold unit 30 rapidly attains a locked state of synchronous hold.

Meanwhile, for the GPS receiving apparatus to compute its position and speed requires establishing and holding synchronism with at least four GPS satellites following the start of an synchronous acquisition process. There are several methods by which the CPU 41 controlling the synchronous acquisition unit 20 and synchronous hold unit 30 acquires and holds synchronism with signals from at least four GPS satellites (the steps involved are called synchronous acquisition and hold processing hereunder). Some examples of the synchronous acquisition and hold processing are described below.

[First Example of the Synchronous Acquisition and Hold Processing]

In a first example of the synchronous acquisition and hold processing, as soon as the synchronous acquisition unit 20 acquires a single GPS satellite signal synchronously, the synchronous acquisition unit 20 transfers to the CPU 41 an interrupt instruction for starting a synchronous hold operation, the satellite number of the synchronously acquired GPS satellite, the spread code phase involved, IF carrier frequency information, and signal strength information denoting a correlation detection level. After the transfer, the synchronous acquisition unit 20 starts synchronously acquiring another GPS satellite.

Every time an interrupt instruction is received from the synchronous acquisition unit 20, the CPU 41 assigns an independent channel to the synchronous hold unit 30, and establishes initial values allowing the synchronous hold unit 20 to start its synchronous hold operation.

Figure 29:
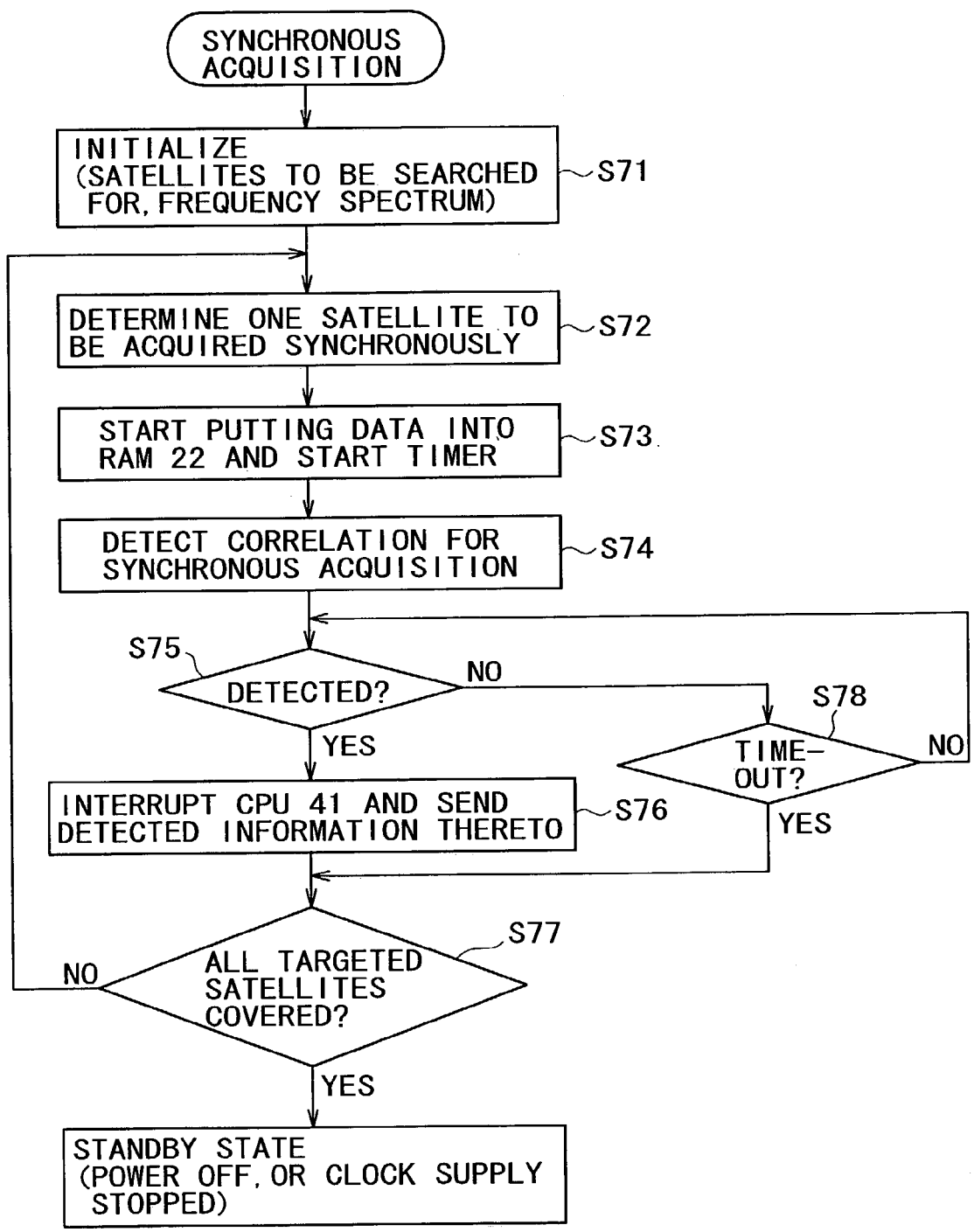
FIG. 29 is a flowchart of steps explaining a typical flow of synchronous acquisition processing.

FIG. 29 is a flowchart of steps performed by the synchronous acquisition unit 20 for synchronous acquisition as the first example of the synchronous acquisition and hold processing.

In step S71 of FIG. 29, the synchronous acquisition unit 20 performs initialization preparatory to synchronous acquisition. In this step, the GPS satellites to be searched for synchronous acquisition and the sequence of the search are initialized on the basis of effective orbit information stored in the orbit information memory 46 of the GPS receiving apparatus. Also based on the orbit information, a carrier frequency is computed with the Doppler shift taken into account so that the center and spectrum of the IF carrier frequency to be searched are established.

If an approximate oscillator error resulting from the operation before power-up is known to the GPS receiving apparatus, then the apparatus position may be assumed to be the position found upon power-up, i.e., the position in effect immediately before power was removed most recently. Based on that assumption, the center and spectrum of the IF carrier frequency to be searched are determined in keeping with the Doppler shift computed from the orbit information. This can shorten the time required up to synchronous hold.

After the initialization, step S72 is reached in which one GPS satellite to be acquired synchronously is set in keeping with the search sequence. This determines the target satellite number for synchronous acquisition and the spread code whose correlation is to be detected.

In step S73, the synchronous acquisition unit 20 starts setting to the RAM 22 the IF data sampled by the sampling circuit 21. At the same time that the IF data start getting set, a timer is started up. The timer 45 in the control unit 40 is used here. This timer 45 is also used to determine when to start a synchronous hold operation, as will be discussed later.

In step S74, the DSP 23 performs a correlation detection process on the spread code of the GPS satellite signal established in step S72, using one of the above-described examples of synchronous acquisition involving the digital matched filter arrangement.

In step S75, a check is made to see if a correlation is detected with regard to the spread code of the GPS satellite signal, i.e., to determine whether the GPS satellite signal is synchronously acquired. When the correction is judged to be detected, step S76 is reached. In step S76, the synchronous acquisition unit 20 issues an interrupt instruction to the CPU 41 and supplies it with the GPS satellite number, spread code phase, IF carrier frequency, and signal strength information derived from synchronous acquisition.

In step S77, a check is made to see if the synchronous acquisition search has ended on all GPS satellites to be searched. If there still remains any GPS satellite to be searched, step S72 is reached again, the next GPS satellite to be acquired synchronously is established, and the subsequent steps are repeated. If in step S77 the synchronous acquisition search is judged to have ended on all GPS satellites to be searched, then the synchronous acquisition operation is terminated, and the synchronous acquisition unit 20 is placed in standby mode.

If no correlation is judged to be detected in step S75, step S78 is reached. In step S78, a check is made to see if that state has lasted a predetermined time period. If the predetermined time period is not judged to have elapsed yet, step S75 is reached again and the correlation detection process is resumed.

If in step S78 the predetermined time period is judged to have elapsed, step S77 is reached. In step S77, a check is made to see if the synchronous acquisition search has ended on all GPS satellites to be searched. If there is any GPS satellite yet to be acquired synchronously, then step S72 is reached again, the next GPS satellite to be searched is established, and the subsequent steps are repeated.

If in step S77 the synchronous acquisition search has ended on all GPS satellites to be searched, then the synchronous acquisition operation is terminated, and the synchronous acquisition unit 20 is placed in standby mode.

In this embodiment, the CPU 41 is designed to turn on or off power to the synchronous acquisition unit 20 or to switch on or off the supply of an operation clock signal from the multiplying/dividing circuit 3 to the synchronous acquisition unit 20. In the standby mode of the synchronous acquisition unit 20, the CPU 41 inhibits the supply of power or of the operation clock signal to the unit 20, whereby unnecessary power dissipation is prevented.

Where the synchronous acquisition unit 20 is structured using the digital matched filter as described, it is preferred to have the DSP 23 operate at a high clock frequency for fast FFT computations. Although this entails increased power dissipation during the operation, it presents little problem since the role of the synchronous acquisition unit 20 ends as soon as the signals from all initially established GPS satellites have been synchronously acquired and the synchronous hold unit 30 holds at least four GPS satellites synchronously.

With this embodiment, as described above, the CPU 41 places the synchronous acquisition unit 20 in standby mode after the latter's operational role has ended. This minimizes wasteful power consumption by the synchronous acquisition unit 20.

In the above-described example, the CPU 41 was shown putting the synchronous acquisition unit 20 in standby mode after completion of the synchronous acquisition of all initially established GPS satellites. Alternatively, the CPU 41 may place the synchronous acquisition unit 20 in standby mode after verifying that the synchronous hold unit 30 have succeeded in synchronously holding at least four GPS satellites.

Needless to say, the CPU 41 can get the synchronous acquisition unit 20 to exit from its standby mode and become active whenever synchronous acquisition is required again.

Figure 30:
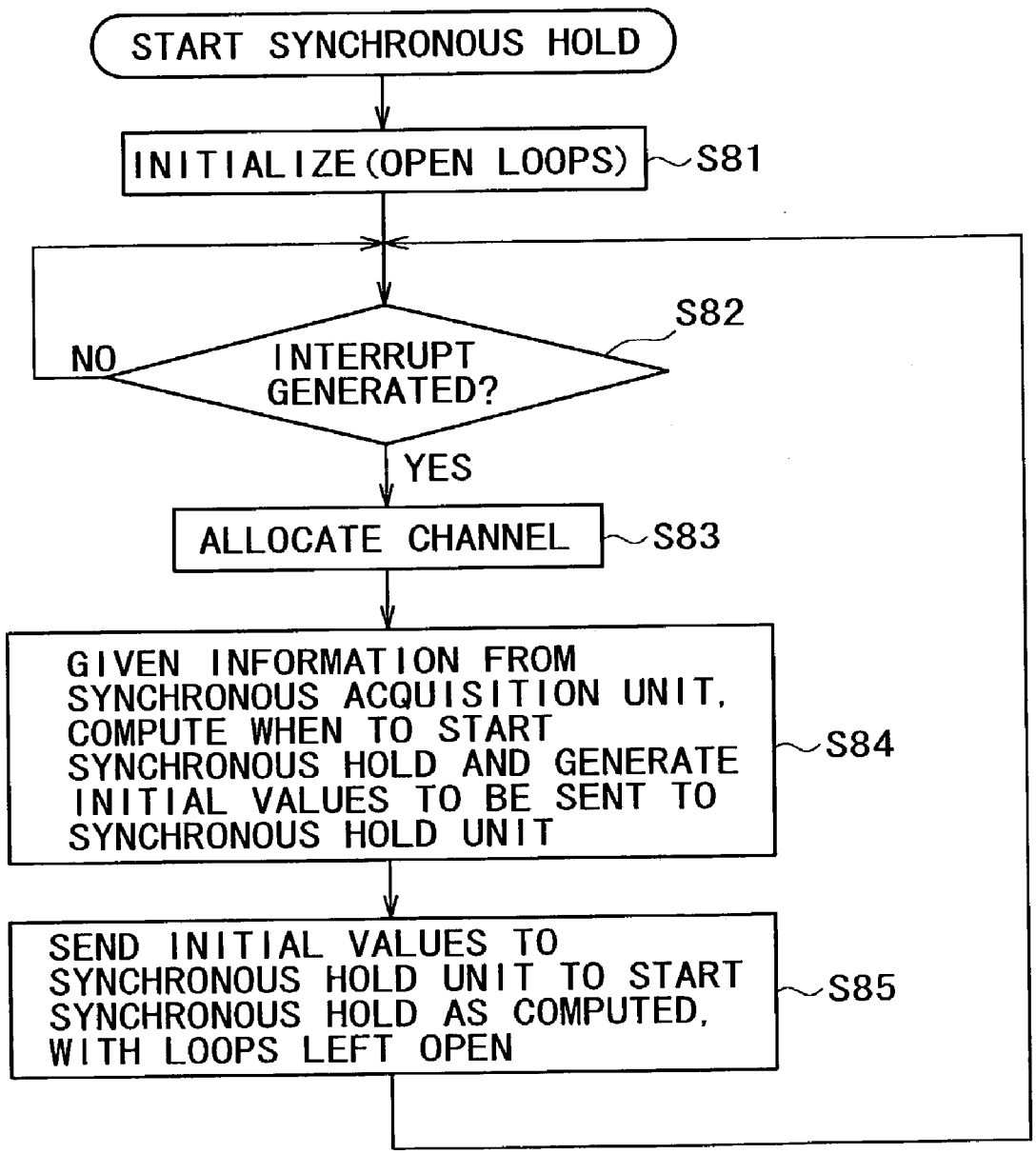
FIG. 30 is a flowchart of steps outlining how to start synchronous hold processing.
Figure 31:
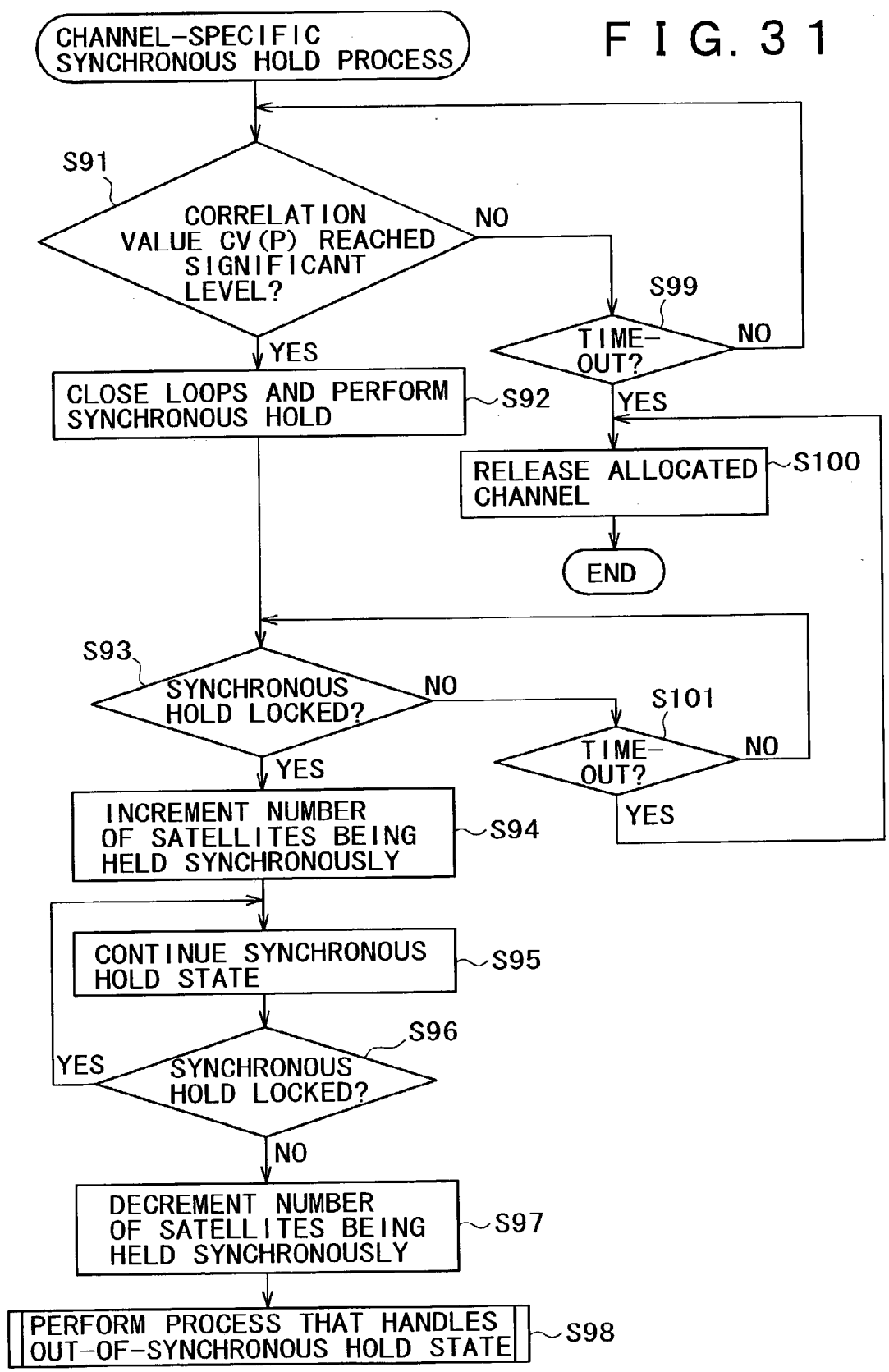
FIG. 31 is a flowchart of steps showing a typical flow of channel-specific synchronous hold processing.

Described below with reference to the flowcharts of FIGS. 30 and 31 is how the CPU 41 controls the synchronous hold unit 30 upon receipt of an interrupt instruction from the synchronous acquisition unit 20.

FIG. 30 is a flowchart of steps in which the CPU 41, on receiving from the synchronous acquisition unit 20 an interrupt instruction and the result of synchronous acquisition including the spread code phase, IF carrier frequency, GPS satellite number, and signal strength information, assigns a channel to the synchronous hold unit 30 and causes the latter to start synchronous hold processing. FIG. 31 is a flowchart of steps in which the synchronous hold unit 30, started by the CPU 41 for synchronous hold processing, controls synchronous hold on each channel assigned. First to be described below with reference to FIG. 30 is how the synchronous hold processing is started by the CPU 41.

In step S81 of FIG. 30, the CPU 41 initializes constants for the NCOs, low-pass filters and loop filter of the synchronous hold unit 30 when power is applied to the GPS receiving apparatus. The Costas loop 31 and DLL 32 are initially in a broken-loop state.

In step S82, the CPU 41 checks to see if an interrupt instruction is received from the synchronous acquisition unit 20. Upon detection of an interrupt instruction, step S83 is reached in which the CPU 41 receives from the synchronous acquisition unit 20 such information as the GPS satellite number, spread code phase, IF carrier frequency and signal strength, and assigns an independent channel to the GPS satellite number received.

In step S84, the CPU 41 computes when to start synchronous hold on the basis of the spread code phase received from the synchronous acquisition unit 20, and generates initial values for the relevant components within the channel assigned to the synchronous hold unit 30 on the basis of the IF carrier frequency received from the synchronous acquisition unit 20.

In step S85, the CPU 41 sends, through the control register 33, the generated initial values to the relevant components within the channel assigned to the synchronous hold unit 30 in step S83. Concurrently, the CPU 41 times the synchronous hold unit 30 to start a synchronous hold operation in synchronism with the phase of the prompt spread code P generated by the spread code generator 320 within the assigned channel. The Costas loop 31 and DLL 32 are left broken at this point.

In the steps above, one channel is assigned to the synchronously acquired GPS satellite signal for synchronous hold. Once synchronous hold is started, step S82 is reached again and the next interrupt instruction is awaited.

How the channel-specific synchronous hold processing proceeds after getting started as described above will now be explained with reference to the flowchart of FIG. 31.

In step S91 of FIG. 31, the CPU 41 checks to see if the correlation value CV(P) from the synchronous hold unit 30 has reached a significant level. If the correlation value CV(P) is judged to have reached the significant level, step S92 is reached. In step S92, the Costas loop 31 and DLL 32 are made in order to execute a synchronous hold operation.

In step S93, the CPU 41 checks to see if a lock decision output is received from the lock discriminator 211 of the Costas loop 31 in the synchronous hold unit 30. If a locked state of the synchronous hold unit 30 is recognized in step S93, then step S94 is reached. In step S94, the number of GPS satellites being held synchronously is incremented by one. Step S94 is followed by step S95 in which the synchronous hold state is maintained.

In step S96, the CPU 41 monitors the lock decision output from the lock discriminator 211 of the Costas loop 31 while the synchronous hold operation is in progress. If in step S96 a locked state of the synchronous hold unit 30 is recognized, step S95 is reached again and the synchronous hold state is continued. If an unlocked state of the synchronous hold unit 30 is recognized in step S96, step S97 is reached in which the number of GPS satellites being held synchronously is decremented by one, and a process for handling an out-of-synchronous hold state is carried out. This process will be discussed later in more detail.

Upon judging that the synchronous hold unit 30 has succeeded in synchronously holding at least four GPS satellite signals, the CPU 41 proceeds to compute the position and speed of the GPS receiving apparatus.

If in step S91 the correlation value CV(P) is not judged to have reached the significant level, then step S99 is reached and a check is made to see if the current state has lasted a predetermined period of time. If the predetermined time period is judged to have elapsed, then step S100 is reached. In step S100, the channel assigned to the synchronous hold unit 30 in step S83 of FIG. 30 is released, and the synchronous hold operation on the channel in question is stopped.

If in step S93 the locked state is not detected from the lock decision output, then step S101 is reached. In step S101, a check is made to see if that state has lasted a predetermined period of time. If the predetermined time period is judged to have elapsed in step S101, then step S100 is reached in which the channel assigned to the synchronous hold unit 30 in step S83 is released, and the synchronous hold operation on the channel in question is stopped.

Steps S99, S101 and S100 are provided for the following reasons: even if the correlation detected by the synchronous acquisition unit 20 has the significant level, what is detected can be a case of pseudo-synchronism induced accidentally by noise. Such accidental and unsustainable pseudo-synchronism will not be established as definitive synchronism by the synchronous hold unit 30. Thus arrangements are made so that if the synchronous hold unit 30 cannot establish synchronism within a predetermined search time, then the synchronous hold operation is halted, the assigned channel is released, and the next interrupt instruction is awaited.

In step S84 of FIG. 30, the CPU 41 must compute the time to get the synchronous hold unit 30 to start its synchronous hold processing so as to synchronize the phase of the spread code from the spread code generator 320 of the synchronous hold unit 30 with the phase of the spread code detected by the synchronous acquisition unit 20. For the computation, it should be taken into account that a certain period of time has elapsed before the synchronous acquisition unit 20 completes its synchronous acquisition of a single GPS satellite signal and that there can be the effects of a Doppler shift in the received signal and an error of the reference oscillation circuit 2 in the GPS receiving apparatus.

The reference oscillation error above results from the reference oscillation circuit 2 generating a sampling clock signal by which the IF carrier frequency is set to a memory in the frequency conversion unit 10.

In this embodiment, the synchronous acquisition unit 20 and synchronous hold unit 30 operate on the same clock signal generated by the same frequency oscillation circuit 2. That means the synchronous acquisition unit 20 and synchronous hold unit 30 will have the same frequency error. For that reason, as far as IF carrier synchronization is concerned, there is no problem with the synchronous hold unit 30 starting its operation using the IF carrier frequency detected by the synchronous acquisition unit 20 as an initial value.

There can be a number of methods by which to determine when to start synchronous hold in step S84. Some examples of such methods are discussed below.

[First Example of the Method for Determining when to Start Synchronous Hold]

When to start synchronous hold can be affected by the error of the reference oscillation circuit 2 in the GPS receiving apparatus. However, since the spread code is basically repeated in milliseconds, there is no problem with the synchronous hold unit 30 starting its synchronous hold operation with a deviation of a multiple of milliseconds.

The first example takes advantage of the fact that the synchronous acquisition unit 20 starts the timer 45 at the same time that the IF data are set to the RAM 22. When the synchronous acquisition unit 20 detects a spread code phase difference "h" with regard to the IF data held in the RAM 22, the CPU 41 uses the same timer 45 in getting the spread code generator 320 of the synchronous hold unit 30 to start generating a spread code with the detected phase difference "h" as a deviation by a multiple of milliseconds from the point of phase difference detection. This provides synchronization in phase with the spread code of the received signal.

Figure 32:
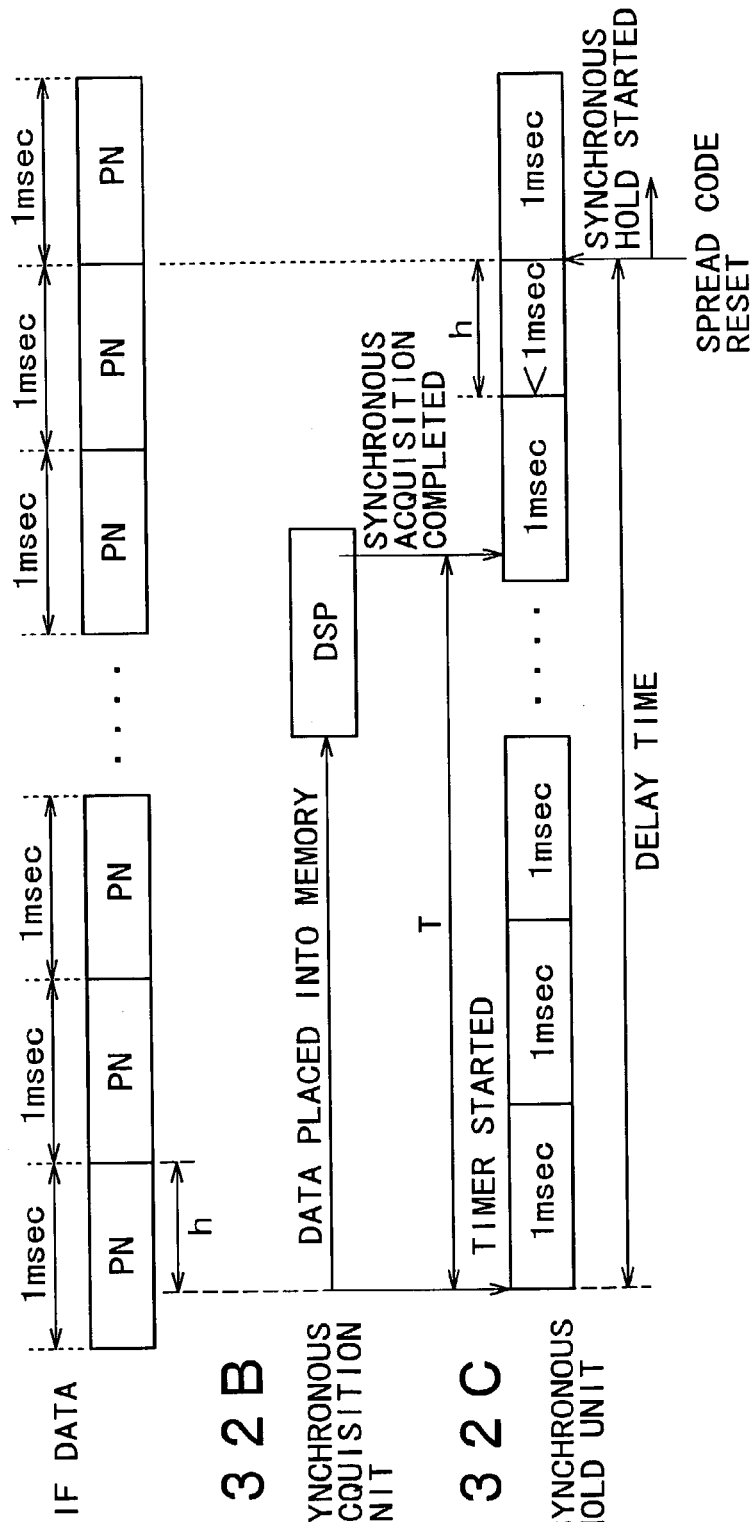
FIGS. 32A, 32B and 32C are schematic views explaining a first example of determining when to start synchronous hold in conjunction with the embodiment.

FIGS. 32A, 32B and 32C are furnished to explain the workings outlined above. FIG. 32A shows IF data, in which PN stands for the spread code involved. When the IF data are set to the RAM 22 with a phase difference of "h" with regard to the IF data spread code PN as shown in FIG. 32B, the DSP 23 detects the phase "h" as spread code phase information (i.e., phase with which to reset the spread code generator 320 in the DLL 32).

However, as illustrated in FIG. 32C, the point in time at which the synchronous acquisition unit 20 detects the phase difference "h" is several milliseconds past the time at which the timer 45 was started upon setting of the IF data to the RAM 22.

If the point in time at which the CPU 41 receives the spread code phase difference "h" from the synchronous acquisition unit 20 is halfway through a one-millisecond period measured by the timer 45, then the one-millisecond time period is allowed to elapse. The generated phase of the spread code generator 320 in the synchronous hold unit 30 is reset starting from a point in time reached by adding the spread code phase difference "h" to the end of the one-millisecond period completed.

The steps above allow the phase generated by the spread code generator 320 of the synchronous hold unit 30 to synchronize substantially with the phase of the spread code in the GPS satellite signal acquired by the synchronous acquisition unit 20. This shortens the time required to establish synchronism.

In the conventional Costas loop plus DLL arrangement, the phase of the spread code in the received signal remains unknown. This has necessitated a slight deviation of the IF carrier frequency and spread code period following generation by the DLL. As the phase is allowed to slide relative to the spread code of the IF data, a search is made for a phase having a correlation of significant signal strength over a maximum range of several kHz of carrier frequencies and possibly about all phases with the spread code length of 1,023 chips. It can take a considerable time before synchronism is established.

In the first example above, by contrast, the synchronous hold unit 30 employs the same basic structures of the Costas loop 31 and DLL 32 as before, but receives those initial values of the spread code phase and IF carrier frequency which deviate very little from true values. That means a phase having a significantly strong correlation is sure to exist near the initial values even if an error is taken into consideration.

In operation, the synchronous hold unit 30 first turns off the switching circuits 212 and 324 to isolate the NCOs 208 and 323 of the Costas loop 31 and DLL 32 from the control of the loop filters 207 and 322, i.e., to keep the loops broken. In the broken-loop state, the synchronous hold unit 30 searches for a significantly strong correlation while changing the settings of the NCOs 208 and 323 near their initial values. Once the correlation is detected, the synchronous hold unit 30 turns on the switching circuits 212 and 324 for switchover to the loop control by the loop filters 207 and 322 over the Costas loop 31 and DLL 32.

The steps above make it possible to establish in a very short time synchronism between the spread code phase in the DLL 32 with the IF carrier phase in the Costas Loop 31. The synchronism thus established can be maintained thereafter.

In that case, the initial value of the IF carrier frequency can be set with the precision, illustratively of dozens of Hz. It follows that the bandwidths for the low-pass filters and loop filters of the Costas loop 31 and DLL 32 can be narrowed from the beginning, so that synchronism can be established at a high S/N ratio.

If the synchronous hold unit 30 is run on a clock of, for example, 16.368 MHz (=1.023 MHz×16) to let the DLL 32 detect the spread code phase at a time resolution of $\frac{1}{16.368}$ MHz, then the pseudo-distance between a given GPS satellite and the GPS receiving apparatus can be computed with $\frac{1}{16}$-chip precision based on the spread code phase. If the NCO 208 in the Costas loop 31 is structured to be controllable in increments of Hz, then the IF carrier frequency resolution of 1 Hz is established. The DLL 32 and Costas loop 32 can hold synchronism with that precision.

[Second Example of the Method for Determining when to Start Synchronous Hold]

In the above-described first example, the spread code phase and IF carrier frequency following detection by the synchronous acquisition unit 20 are taken as the initial values of the spread code phase and IF carrier for use by the synchronous hold unit 30. The synchronous hold unit 30 then searches for a phase having a significant correlation near the initial values received.

One reason the synchronous hold unit 30 is required to make the search is that the reference oscillation circuit 2 incorporated in the GPS receiving apparatus has an error with respect to a nominal frequency.

If an FFT-based digital matched filter arrangement is used to constitute the synchronous acquisition unit 20 as described above, the result of detection by the synchronous acquisition unit 20 is transferred to the synchronous hold unit 30 upon elapse of a DSP processing time following the setting of IF data to the RAM 22.

For that reason, if the error between the nominal oscillation frequency "fosc" and the actual frequency of the reference oscillation-circuit is denoted by $\Delta$fosc and the synchronous acquisition processing time (in seconds) at the DSP 23 is represented by T, then there will be an error of T×$\Delta$fosc/fosc by the time the data reflecting the result of acquisition are handed over to the synchronous hold unit 30. For example, if the time T is 3 seconds and if $\Delta$fosc/fosc falls within a range of ±3 ppm, then an error of ±9 μs (about 9 chips) or less will occur. The error becomes greater the longer the synchronous acquisition processing time at the DSP 23.

As discussed above, another reason for the error is the effect of the Doppler shift on the carrier frequency caused by movements of GPS satellites and the GPS receiving apparatus.

If the carrier frequency of a GPS satellite signal is represented by "frf" (=1,575.42 MHz) and if the Doppler shift of the received signal is denoted by $\Delta$fd, then the spread code period of the received signal is an approximate multiple of (1−$\Delta$fd/frf) due to the Doppler shift involved. For example, if the Doppler shift ranges from 5 kHz to −5 kHz, then an error of about −9.5 μs through 9.5 μs (=−9.5 to 9.5 chips) occurs in 3 seconds.

The above example of computations is fairly close to what can actually happen in the field. When the error of the reference oscillation circuit 2 is added to the Doppler shift, the combined error can be about ±20 chips.

In the second example, the CPU 41 causes the synchronous hold unit 30 to make a search only through the range of about ±20 chips to detect a correlation during synchronous hold processing.

Illustratively, the CPU 41 causes the DLL 32 to start generating the spread code 20 chips earlier than the phase of the spread code detected by the synchronous acquisition unit 20. As the period of the spread code at this point, the frequency of the NCO 323 in the DLL 32 is set to be longer than (1+5/1, 575, 420) milliseconds.

These settings allow the synchronous hold unit 30 to start sliding, 20 chips earlier, the GPS satellite signal spread code included in the IF data. For an appropriate period of time, a search is then made for a correlation while the phase of the spread code from the spread code generator 320 is being slid relative to the spread code of the GPS satellite signal.

The conventional DLL plus Costas loop arrangement performs correlation detection over the range of 1,023 chips and within the scope of a Doppler shift error and of an inherent error of the reference oscillation circuit 2. In the inventive example, by contrast, the initial IF carrier frequency has the error of a mere 20 chips and the range over which to detect correlation is reduced by a factor of dozens. This radically shortens the time required for the synchronous hold unit 30 to establish synchronism.

[Third Example of the Method for Determining when to Start Synchronous Hold]

In the manner described above, the synchronous acquisition unit 20 rapidly detects the GPS signal spread code phase and IF carrier frequency included in the IF data. The result of the detection allows the synchronous hold unit 30 to make a rapid transition to synchronous hold processing.

If the sequence of processing is increased in order to detect feeble satellite signals in the IF data or if the synchronous acquisition unit 20 is run on a slow clock to save power, then the processing time of the synchronous acquisition unit 20 is prolonged and the scope in which the synchronous hold unit 30 carries out its search before establishing synchronism needs to be expanded. These are the disadvantages of the second example above.

A third example of the synchronous hold starting method is designed to overcome the disadvantages specific to the second example by taking advantage of this fact: that the reference oscillation circuit 2 acts as a common operation clock oscillating source for the frequency conversion unit 10, synchronous acquisition unit 20, and synchronous hold unit 30.

Figure 33:
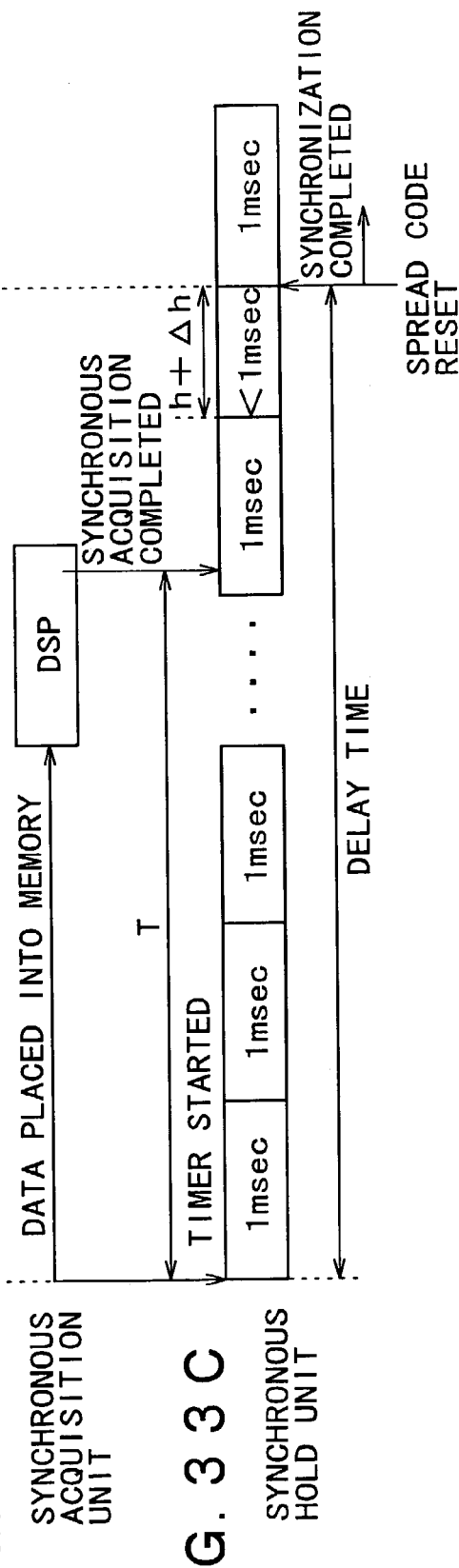
FIGS. 33A, 33B and 33C are schematic views explaining a third example of determining when to start synchronous hold in conjunction with the embodiment.

For the third example, suppose that the difference between the IF carrier frequency detected by the synchronous acquisition unit 20 on the one hand and the intermediate frequency Fif (e.g., 1.023 MHz) based on the nominal setting of the reference oscillation frequency on the other hand is represented by $\Delta$Fif; that the carrier frequency of the GPS signal is denoted by Frf (=1,575.42 MHz); and that the time required for the synchronous acquisition unit 20 to carry out synchronous acquisition processing following the setting of IF data to the RAM 22 is expressed by T. In such a case, as shown in FIGS. 33A through 33C, the phase difference "h" in effect in the first example in FIGS. 32A through 32C is corrected to:

$$h + \Delta h$$

where, the correction value $\Delta h$ is given as $$\Delta h = -T \times \Delta Fif/Frf$$

The correction value $\Delta h$ is computed by the CPU 41 based on two pieces of information: IF carrier frequency information from the synchronous acquisition unit 20, and the time T that has elapsed from the time the IF data were set to the RAM 22 as measured by the timer 45 until an interrupt instruction is received from the synchronous acquisition unit 20. Based on the result of the computation, the CPU 41 corrects the phase of the spread code from the spread code generator 320 in the DLL 32 of the synchronous hold unit 30, and causes the synchronous hold unit 30 to start its synchronous hold operation.

For example, if ΔFif=+3 kHz and T=10 sec., then the correction value Δh=−19 μs=about −19 chips.

The corrective measure above corrects at a fairly high degree of precision the spread code phase error attributable to the error of the reference oscillation circuit 2 and to the Doppler shift. Even if it has taken tens of seconds for synchronous acquisition processing, synchronism can be established following a search through a mere one-chip range or thereabout. This kind of correction is made possible for the following reasons:

In order to convert the carrier frequency Frf of a GPS satellite signal to the intermediate frequency Fif (these frequencies are known), the frequency conversion unit 10 causes the reference oscillation circuit 2 having a nominal oscillation frequency Fosc to generate a local oscillation frequency Flo=N×Fosc (where N is a constant; N>>1) so that Fif=Frf−Flo. An actually received GPS satellite signal has its intermediate frequency Fif supplemented with an error ΔFif caused by the Doppler shift and by the oscillation frequency error of the reference oscillation circuit 2.

If the Doppler shift is denoted by ΔFd and if the error of the reference oscillation circuit 2 relative to its nominal oscillation frequency is represented by ΔFosc, then the following holds:

$$Fif+\Delta Fif=Frf+\Delta Fd-Flo=Frf+\Delta Fd-N\times(Fosc+\Delta Fosc)$$

Thus the IF carrier frequency detected by the synchronous acquisition unit 20 is given as $$Fif+\Delta Fif$$

where, ΔFif=ΔFd−N×ΔFosc.

What is important here is that only ΔFif is detected by the synchronous acquisition unit 20; the Doppler shift ΔFd and error ΔFosc remain unknown in the initial stage of synchronous acquisition.

If one millisecond, i.e., one period of the spread code, is counted by the timer 45 based on the clock of the nominal oscillation frequency from the reference oscillation circuit 2, the error ΔFosc involved causes the actual time counted to be:

$$1\times Fosc/(Fosc+\Delta Fosc)\approx(1-\Delta Fosc/Fosc) \text{ (in milliseconds)}$$

Meanwhile, the Doppler shift ΔFd causes the length of one period of the spread code in the received signal from the GPS satellite to become:

$$1\times Frf/(Frf+\Delta Fd)\approx(1-\Delta Fd/Frf) \text{ (in milliseconds)}$$

The length of one period of the spread code in the received signal compares with the one millisecond counted on the nominal oscillation frequency of the reference oscillation circuit 2 as follows:

$$(1-\Delta Fd/Frf)/(1-\Delta Fosc/Fosc)\approx 1-\Delta Fd/Frf+\Delta Fosc/Fosc$$

The right-hand term in the above expression may be modified into the following:

$$1-\Delta Fif/Frf+(\Delta Fosc/Fosc)\times(Fif/(N\times Fosc))\approx 1-\Delta Fif/Frf$$

This is a fairly good approximation because it does not contain the Doppler shift ΔFd and error ΔFosc unknown to the synchronous acquisition unit 20.

The result above allows the synchronous acquisition unit 20 to perform synchronous acquisition processing the moment the IF data are set to the RAM 22. If it takes time T to transfer information "h" on the detected spread code phase to the synchronous hold unit 30, then there occurs a deviation of −T×ΔFif/Frf from the spread code phase detected by the synchronous acquisition unit 20 during the time T.

Consequently, as shown in FIG. 33C, the synchronous hold unit 30 can correct the spread code phase error produced during the synchronous acquisition processing time T through this measure: that the information "h" on the spread code phase coming from the synchronous hold unit 20 is aligned with the time at which the spread code generator 320 of the DLL 32 starts generating the spread code. This allows the synchronous hold unit 30 to detect correlation within the one-chip range or thereabout so as to establish synchronism in a very short time.

In the third example described above, the IF carrier information detected by the synchronous acquisition unit 20 is the only necessary information; there is no need for such information as the Doppler shift amount ΔFd or the error ΔFosc of the reference oscillation circuit 2.

The correction value is not dependent on the IF carrier frequency. Even if the local oscillation frequency is set so that Fif=Flo−Frf for frequency conversion to the intermediate frequency Fif by the frequency conversion unit 10, the correction value Δh is furnished by simply changing the sign of the difference ΔFif so that Δh=T×ΔFif/Frf.

[Use of Signal Strength Information from the Synchronous Acquisition Unit 20 During Synchronous Hold Processing]

As discussed above, the synchronous acquisition unit 20 sends to the CPU 41 not only the spread code phase and IF carrier frequency of the GPS signal but also signal strength information representing the signal strength in the form of a magnitude of the correlation between the spread code of the GPS satellite signal and the spread code of the GPS receiving satellite. Using the signal strength information allows the synchronous hold unit 30 to control its sensitivity and tracking performance. Furthermore, combined use of the signal strength and the correlation value from the synchronous hold unit 30 makes it possible to determine a false correlation of the spread code. This latter feature will now be described.

When the synchronous hold unit 30 is about to establish synchronism, a false correlation may be detected near the spread code phase transferred from the synchronous acquisition unit 20. In particular, the signal from a single GPS satellite with an appreciably high signal strength can include a partial correlation in an out-of-phase location. Partial correlations can also develop between the signals from different GPS satellites. In such cases, the synchronous hold unit 30 could reach synchronism with the false correlation.

However, if the synchronous acquisition unit 20 correctly detects a maximum correlation and transfers to the synchronous hold unit 30 the signal strength information in addition to the spread code phase and IF carrier frequency involved, the probability of erroneous synchronization with false correlations is lowered through the following measure: if the correlation detected by the synchronous hold unit 30 has a level of such a difference that it is impossible to regard the correlation as equivalent to the signal strength from the synchronous acquisition unit 20, then a false correlation is recognized, and search is shifted to another phase.

When the bandwidths are narrowed, the low-pass filters and loop filters in the Costas loops 31 and the DLL 32 of the synchronous hold unit 30 attain better S/N ratios and by extension higher levels of sensitivity but are subject to lower speeds of response. That means the level of tracking performance will worsen in the face of abrupt changes in the position of the GPS receiving apparatus when synchronism is established and then sustained thereafter.

It follows that tracking performance should be emphasized when the signal strength of the received signal is high and that sensitivity should be stressed when the signal strength is low. The bandwidths of the filters may be set in the initial stage of synchronous hold processing in keeping with the signal strength information coming from the synchronous acquisition unit 20.

Figure 34:
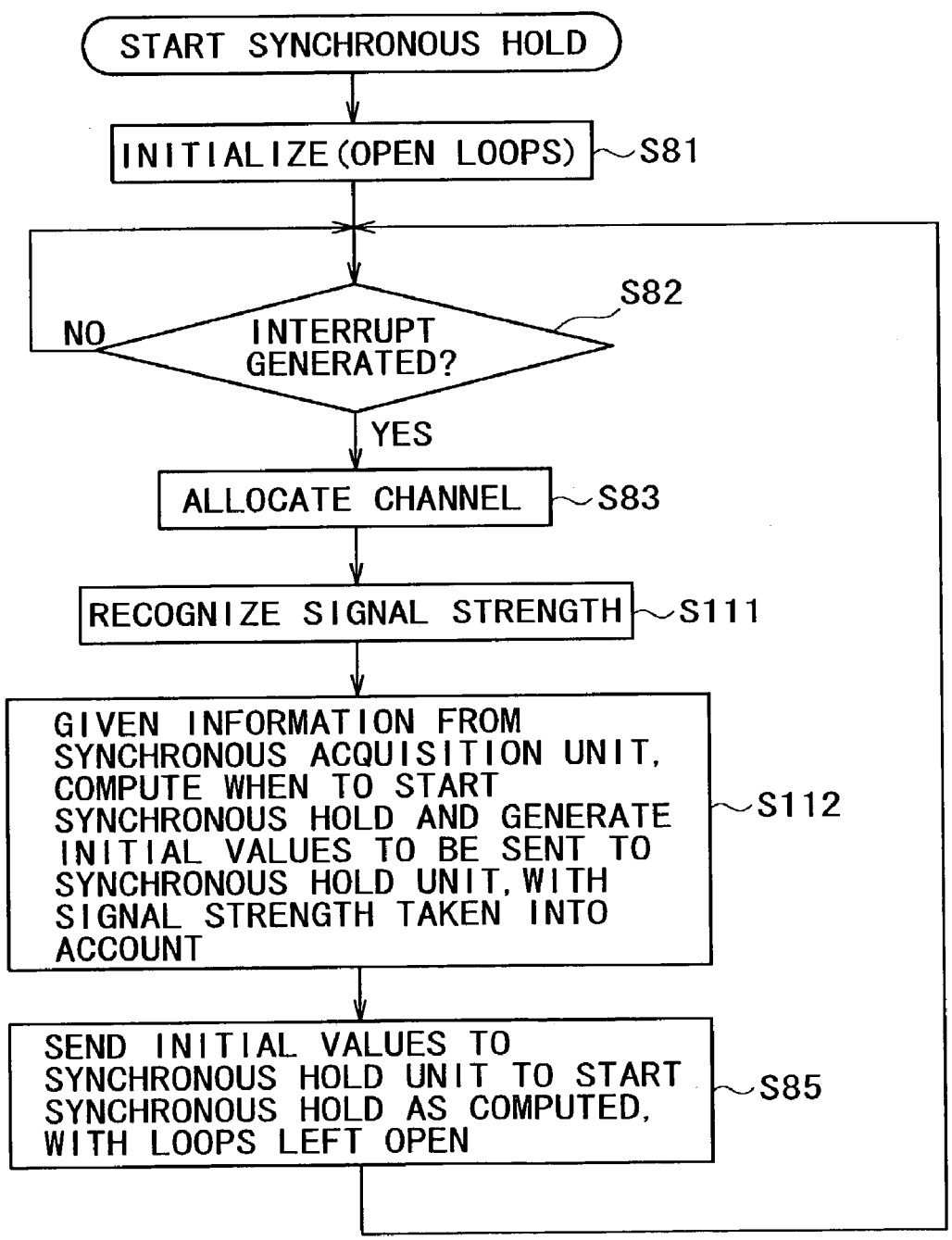
FIG. 34 is a flowchart of steps showing an example of starting synchronous hold by use of the embodiment.
Figure 35:
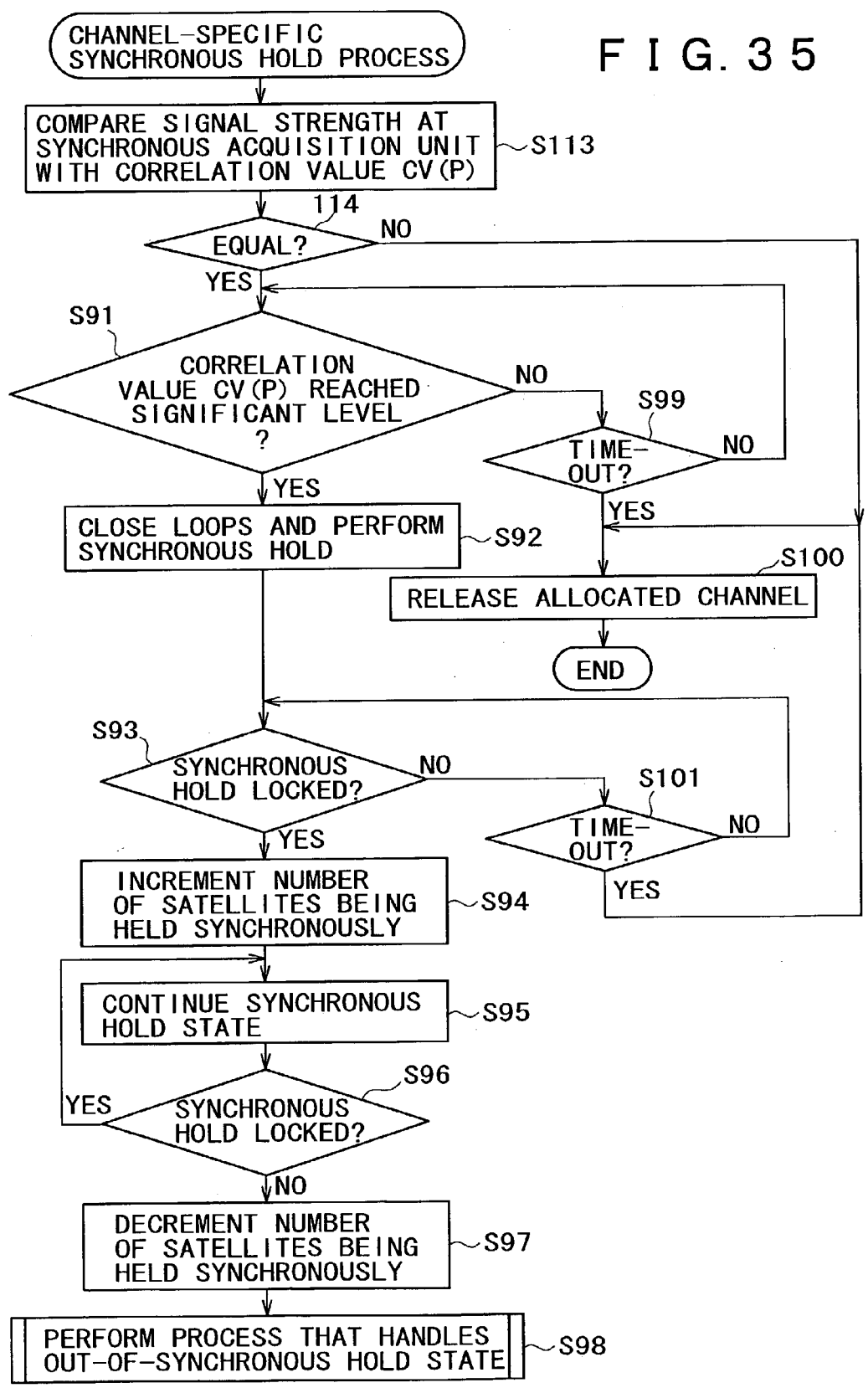
FIG. 35 is a flowchart of steps depicting an example of performing channel-specific synchronous hold processing by use of the embodiment.

FIG. 34 is a flowchart of steps in which the CPU 41 controls the start of synchronous hold processing. FIG. 35 is a flowchart of steps constituting a channel-specific synchronous hold process. It should be noted that FIG. 34 is formed by making partial modifications to the flowchart of FIG. 30, with the same step numbers designating like or corresponding steps of processing. Likewise, FIG. 35 is constituting by making partial modifications to the flowchart of FIG. 31, with the same step numbers also designating like or corresponding steps of processing. What follows is a description of key operations outlined in FIGS. 34 and 35, with emphasis on the differences in steps between FIGS. 34 and 35 on the one hand and FIGS. 30 and 31 on the other hand.

First to be described is the synchronous hold starting process in FIG. 34. In step S83, the CPU 41 assigns an independent channel to the synchronous hold unit 30 with regard to the GPS satellite number received. In step S111, the CPU 41 checks the level of the signal strength received from the synchronous acquisition unit 20.

In step S112, the CPU 41 computes the time to start synchronous hold in keeping with the spread code phase received from the synchronous acquisition unit 20, and generates initial values for the relevant components within the assigned channel based on the IF carrier frequency received from the synchronous acquisition unit 20. At this point, the settings for the low-pass filters 204, 205, 304, 305, 314 and 315 and for the loop filters 207 and 322 in the Costas loop 31 and DLL 32 are determined in accordance with the signal strength checked in step S111.

More specifically, if a low signal strength is detected in step S111, that requires raising the level of sensitivity. In such a case, the settings for the low-pass filters 204, 205, 304, 305, 314 and 315 and for the loop filters 207 and 322 in the Costas loop 31 and DLL 32 should be such as to narrow the bandwidths. A high signal strength, if detected in step S111, necessitates boosting the level of tracking performance. In this case, the settings for the filters involved should be such as to widen the bandwidths.

In step S85 following step S112, the CPU 41 sends the generated initial values through the control register 33 to the relevant components within the channel assigned to the synchronous hold unit 30 in step S83. Concurrently, the CPU 41 times the synchronous hold unit 30 to start synchronous hold processing in synchronism with the phase of the prompt spread code P generated by the spread code generator 320 within the assigned channel. The Costas loop 31 and DLL 32 are left broken at this point. Control is returned from step S85 to step S82, and the next interrupt instruction is awaited.

The channel-specific synchronous hold process outlined in FIG. 35 will now be described. In step S113, the CPU 41 compares the correlation value CV(P) from the synchronous hold unit 30 with the signal strength (i.e., level of the correlation detection signal from the synchronous acquisition unit 20) checked in step S111. In step S114, a check is made to see if the correlation value CV(P) and the signal strength are equivalent.

If the check in step S114 reveals such a difference between the compared values as to make them unequivalent, then the correlation resulting from the synchronous acquisition unit 20 is judged to be a false correlation. In that case, step S100 is reached. In step S100, the channel assigned to the synchronous hold unit 30 in step S83 is released, and the synchronous hold operation on the channel in question is stopped.

If in step S114 the correlation value CV(P) from the synchronous hold unit 30 is judged equivalent to the signal strength detected in step S111, then the above-described step S91 and subsequent steps for synchronous hold processing are carried out.

In this example, as described, the signal strength detected by the synchronous acquisition unit 20 is utilized in preventing the detection of false correlations. Sensitivity and tracking performance are also controlled in keeping with the detected signal strength.

[Second Example of the Synchronous Acquisition and Hold Processing]

In the first example of the synchronous acquisition and hold processing, as described earlier, the received signals from all searchable GPS satellites are synchronously acquired one after another. As soon as a single GPS satellite signal is acquired synchronously, an interruption is generated so as to start acquiring another GPS satellite signal synchronously. In a second example of the synchronous acquisition and hold processing, the orbit information stored in the orbit information memory 46 of the control unit 40 is used to shorten the time required until synchronism is established, i.e., until at least four GPS satellite signals are held synchronously.

Figure 36:
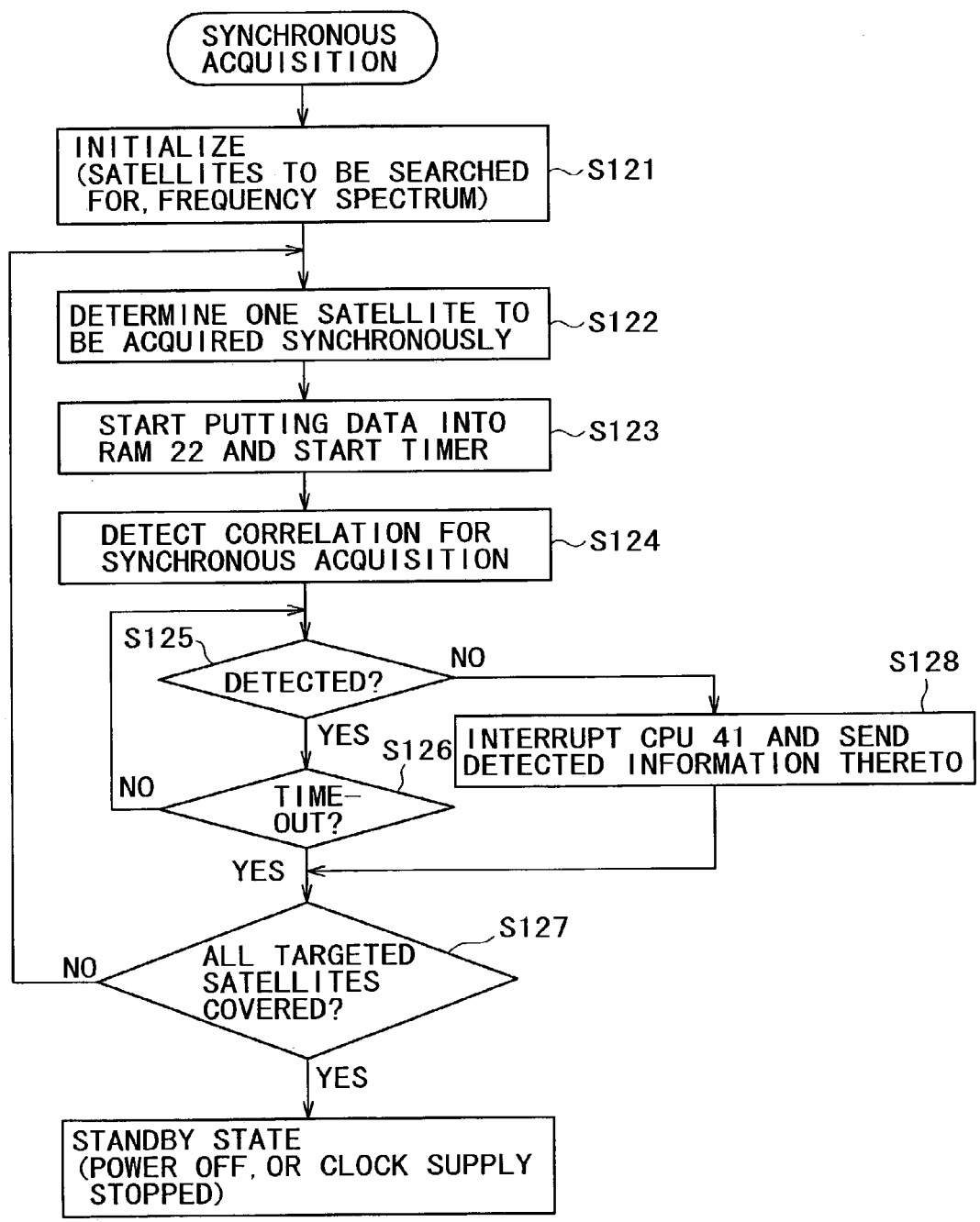
FIG. 36 is a flowchart of steps outlining an example of carrying out synchronous acquisition.

FIG. 36 is a flowchart of steps outlining the flow of synchronous acquisition performed by the synchronous acquisition unit 20 in the second example of the synchronous acquisition and hold processing. Below is a description of what takes place from the time power is applied to the GPS receiving apparatus up to the transition to synchronous hold following the synchronous acquisition process started up and executed by the synchronous acquisition unit 20.

In step S121 of FIG. 36, initialization is carried out preparatory to synchronous acquisition. Specifically, the GPS satellites to be searched for synchronous acquisition and the sequence of the search are established based on the effective orbit information stored in the GPS receiving apparatus. A carrier frequency with the Doppler shift taken into account is computed on the basis of the orbit information, whereby the center and spectrum of the IF carrier frequency to be searched are established.

If the approximate error of the reference oscillation circuit 2 in effect before power-up is known to the GPS receiving apparatus, then the position of the apparatus is assumed to be that which was retrieved upon power-up, i.e., the position that was effective immediately before power was removed most recently. Given that assumption, the center and spectrum of the IF carrier frequency to be searched are determined in accordance with the Doppler shift computed based on the orbit information in the orbit information memory 46. These operations help further to shorten the time required until synchronism is attained and held.

After the initialization, step S122 is reached in which one GPS satellite to be acquired synchronously is set according to the search sequence. This determines both the satellite number of the target satellite to be acquired and the spread code with which to detect correlation.

In step S123, the synchronous acquisition unit 20 starts setting to the RAM 22 the IF data sampled by the sampling circuit 21. The time 45 is started at the same time that the IF data start being set to the memory.

In step S124, the DSP 23, in one of the above-described examples of synchronous acquisition using the digital matched filter, carries out a correlation detection process on the spread code of the GPS satellite signal set in step S122.

In step S125, a check is made to see whether a correlation is detected with the spread code of the GPS satellite signal, i.e., whether the GPS satellite signal is synchronously acquired. Upon detection of the correlation, step S128 is reached. In step S128, an interrupt instruction is issued to the CPU 41, and the results of detection from synchronous acquisition including the GPS satellite number, spread code phase, IF carrier frequency, and signal strength information are transferred to the CPU 41.

If no correlation is judged detected in step S125, step S126 is reached. In step S126, a check is made to see if the current state has lasted a predetermined period of time. If the predetermined time period is not judged to have elapsed yet, step S125 is reached again and correlation detection is continued.

If in step S126 the predetermined time period is judged to have elapsed, then step S127 is reached. In step S127, a check is made to see if the synchronous acquisition search has ended on all GPS satellites to be searched. If there still remains any GPS satellite to be searched, then step S122 is reached again, the next GPS satellite to be acquired is established, and the subsequent steps are repeated for synchronous acquisition.

If in step S127 the synchronous acquisition search is judged to have ended on all GPS satellites to be searched, then the synchronous acquisition operation is terminated, and the synchronous acquisition unit 20 is placed in standby mode.

As described above, this embodiment of the invention is structured to let the CPU 41 switch on or off power to the synchronous acquisition unit 20 or turn on or off the supply of the operation clock signal from the multiplying/dividing circuit 3 to the synchronous acquisition unit 20. When the synchronous acquisition unit 20 is in standby mode, the CPU 41 switches off the supply of power or of the operation clock signal to the unit 20 to prevent unnecessary power dissipation.

In the steps described above, the synchronous acquisition unit 20 searches for significant correlations by following the GPS satellite detection sequence determined by the CPU 41 based on the orbit information. When the synchronous acquisition unit 20 detects a first satellite with a reliably high signal strength, the CPU 41 assigns a channel to the synchronous hold unit 30, establishes the satellite number of the detected satellite as well as the spread code phase and IF carrier frequency involved, and starts a synchronous hold operation as in the first example.

In this second example, it should be noted, the synchronous acquisition unit 20 enters standby mode when completing synchronous acquisition of a single GPS satellite signal. Synchronous acquisition is not carried out on other GPS satellite signals.

In the second example, the CPU 41 assumes the position of the GPS receiving apparatus to be that which is found stored upon power-up or upon start of the operation of the synchronous acquisition unit 20. Based on that assumption, the CPU 41 estimates a line-of-sight distance and a Doppler shift amount through approximate computations relative to each of the GPS satellites that can be acquired by the GPS receiving apparatus.

After the synchronous acquisition unit 20 has detected the spread code phase and IF carrier frequency regarding a single GPS satellite, the CPU 41 computes differences of the line-of-sight distance and of the Doppler shift (i.e., Doppler frequency difference) regarding each of the other, yet-to-be-acquired GPS satellites from the estimated line-of-sight distance and Doppler shift amount regarding the synchronously acquired GPS satellite. The difference of the line-of-sight distance is converted to a spread code phase difference through division by the speed of light.

The spread code phase difference and Doppler frequency difference computed as described above regarding each of the other satellites are supplemented with the spread code phase and IF carrier frequency of the satellite detected by the synchronous acquisition unit 20. The sums are regarded as the spread code phase and IF carrier frequency regarding each of the other satellites.

A channel is assigned to the synchronous hold unit 30 with respect to the GPS satellite acquired by the synchronous acquisition unit 20. A channel is also assigned to the synchronous hold unit 30 for each of the other satellites about which the spread code phase and IF carrier frequency are computed. The results of the synchronous acquisition and of the computations above are taken as initial values with which the synchronous hold operation is started on each of the assigned channels.

Figure 37:
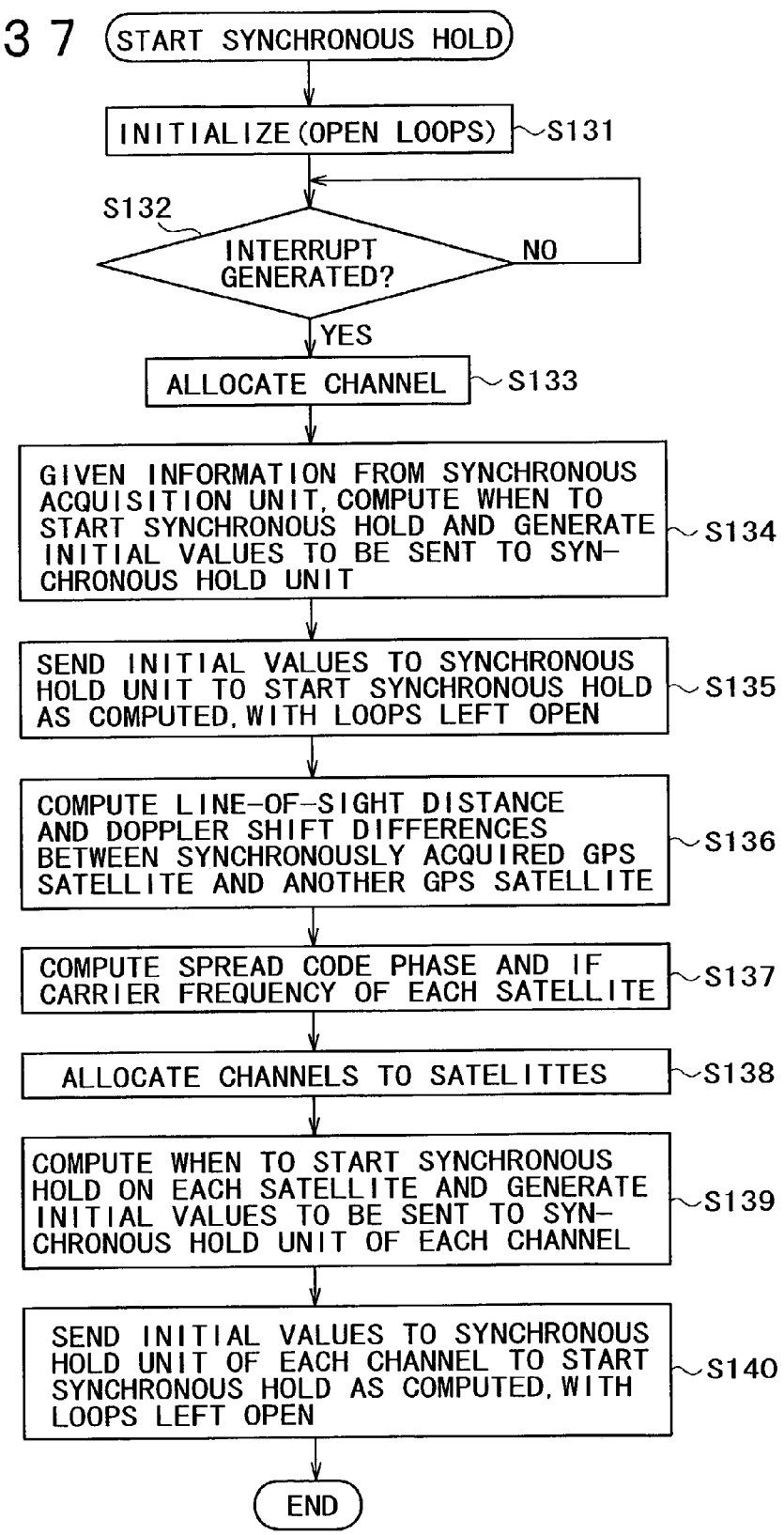
FIG. 37 is a flowchart of steps explaining another example of starting synchronous hold by use of the embodiment.

FIG. 37 is a flowchart of steps outlining how the synchronous hold operation is started.

Before starting the synchronous hold operation in FIG. 37, the CPU 41 assumes the position of the GPS receiving apparatus upon power-up to be the currently stored position.

On that assumption, the CPU 41 estimates approximately the line-of-sight distance and Doppler shift amount relative to each of the GPS satellites that can be acquired by the GPS receiving apparatus.

Upon starting the synchronous hold operation, the CPU 41 goes to step S131 and initializes constants for the NCOs 208 and 323, for the low-pass filers 204, 205, 304, 305, 314 and 315; and for the loop filters 207 and 322 in the Costas loop 31 and DLL 32 of the synchronous hold unit 30. The Costas loop 31 and DLL are initially left broken.

In step S132, the CPU 41 checks for an interrupt instruction from the synchronous acquisition unit 20. If an interrupt instruction is detected, the CPU 41 reaches step S133. In step S133, the CPU 41 receives from the synchronous acquisition unit 20 the satellite number of the acquired GPS satellite, spread code phase, IF carrier frequency, and signal strength information. Concurrently, the CPU 41 assigns an independent channel to the synchronous hold unit 30 regarding the GPS satellite number received.

In step S134, the CPU 41 computes the time to start synchronous hold based on the spread code phase received from the synchronous acquisition unit 20. Concurrently, the CPU 41 generates the initial values for the relevant components within the channel assigned to the synchronous hold unit 30 on the basis of the IF carrier frequency received from the synchronous acquisition unit 20.

In step S135, the CPU 41 sends the generated initial values through the control register 33 to the relevant components within the channel assigned to the synchronous hold unit 30 in step S133. Concurrently, the CPU 41 times the synchronous hold unit 30 to start synchronous hold processing in synchronism with the phase of the prompt spread code P generated by the spread code generator 320. The Costas loop 31 and DLL 32 are left broken at this point.

In step S136, the CPU 41 computes differences of the line-of-sight distance and of the Doppler shift (i.e., Doppler frequency difference) regarding each of the other GPS satellites yet to be acquired by the synchronous acquisition unit 20, from the estimated line-of-sight distance and Doppler shift amount regarding the synchronously acquired GPS satellite. The difference of the line-of-sight distance is converted to a spread code phase difference through division by the speed of light.

In step S137, the CPU 41 supplements the spread code phase difference and Doppler frequency difference computed in step S136 regarding each of the other satellites with the spread code phase and IF carrier frequency of the satellite detected by the synchronous acquisition unit 20, and regards the sums as the spread code phase and IF carrier frequency of each of the other satellites.

In step S138, the CPU 41 assigns an independent channel to the synchronous hold unit 30 with respect to each of the other GPS satellites. In step S139, on the basis of the spread code phase and IF carrier frequency computed in step S137 about each of the other satellites, the CPU 41 computes the time to start the synchronous hold operation on each of the other satellites. Concurrently, the CPU 41 generates the initial values for the relevant components within each of the channels assigned to the synchronous hold unit 30.

In step S140, the CPU 41 sends the generated initial values through the control register 33 to the relevant components within each of the channels assigned to the synchronous hold unit 30 in step S138. Concurrently, the CPU 41 times the synchronous hold unit 30 to start synchronous hold processing on each of the assigned channels of the unit 30 in synchronism with the phase of the prompt spread code P generated by the spread code generator 320. The Costas loop 31 and DLL 32 are left broken at this point.

The synchronous hold processing started as described on each channel proceeds in the same manner as in the above-described flowchart of FIG. 31.

The second example of the synchronous acquisition and hold processing, as explained above, helps shorten the time required from the start-up of synchronous acquisition by the synchronous acquisition unit 20 until at least four GPS satellite signals are held synchronously by the synchronous hold unit 30.

In this second example, the assumed position of the GPS receiving apparatus is different from its actual position, and the spread code phase and IF carrier frequency differ from their actual settings. Still, the probability of detecting correlations and establishing synchronism in a limited time is made high by conducting a search around the initial values on each of the channels assigned to the synchronous hold unit 30.

For example, suppose that the GPS receiving apparatus is switched on 3 kilometers from the stored position resulting in a 3-kilometer line-of-sight deviation. In that case, dividing the line-of-sight distance by the speed of light provides a search over a mere 10-μs time range (=about 10 chips).

In the second example, a plurality of channels assigned to the synchronous hold unit 30 permit parallel processing on multiple satellites. This makes it possible significantly to reduce the time required to establish synchronism with at least four satellites needed for positioning computations and to display the position of the GPS receiving apparatus.

In the flowchart of FIG. 36, the synchronous acquisition unit 20 is shown terminating its processing upon synchronously acquiring one GPS satellite signal and detecting its correlation. Alternatively, following the synchronous acquisition of one GPS satellite signal, the synchronous acquisition unit 20 may proceed with further correlation detection by acquiring another GPS satellite synchronously. In such a case, upon synchronously acquiring the next satellite signal and detecting its correlation, the synchronous acquisition unit 20 transfers the result of the detection to the synchronous hold unit 30. If synchronism has yet to be established with the satellite detected by the synchronous acquisition unit 20, then an independent channel may be assigned to the synchronous hold unit 30; the satellite number of the newly detected satellite, the spread code phase, and IF carrier frequency may be established; and the synchronous hold operation may be started, as in the case of the first GPS satellite.

The line-of-sight distance and the Doppler shift amount relative to each satellite in reference to the orbit information need not be computed only upon power-up. Alternatively, before the synchronous acquisition unit 20 detects correlation through synchronous acquisition, the CPU 41 may compute these quantities based on the orbit information. In this case, following the correlation detection by the synchronous acquisition unit 20 through synchronous acquisition, the CPU 41 may compute only the spread code phase difference and Doppler shift difference between the synchronously acquired GPS satellite and each of the other satellites, as in the earlier examples.

In the second example of the synchronous acquisition and hold processing, it is obvious that any one of the first through the third examples of the method for determining when to start synchronous hold explained in connection with the first example of the synchronous acquisition and hold processing above may be used.

[Third Example of the Synchronous Acquisition and Hold Processing]

A third example of the synchronous acquisition and hold processing involves using the spread code phase difference and Doppler shift difference estimated by the CPU 41 between satellites in the second example above, for the detection of a second and subsequent GPS satellite signals through synchronous acquisition by the synchronous acquisition unit 20 in the first example of the synchronous acquisition and hold processing.

Figure 38:
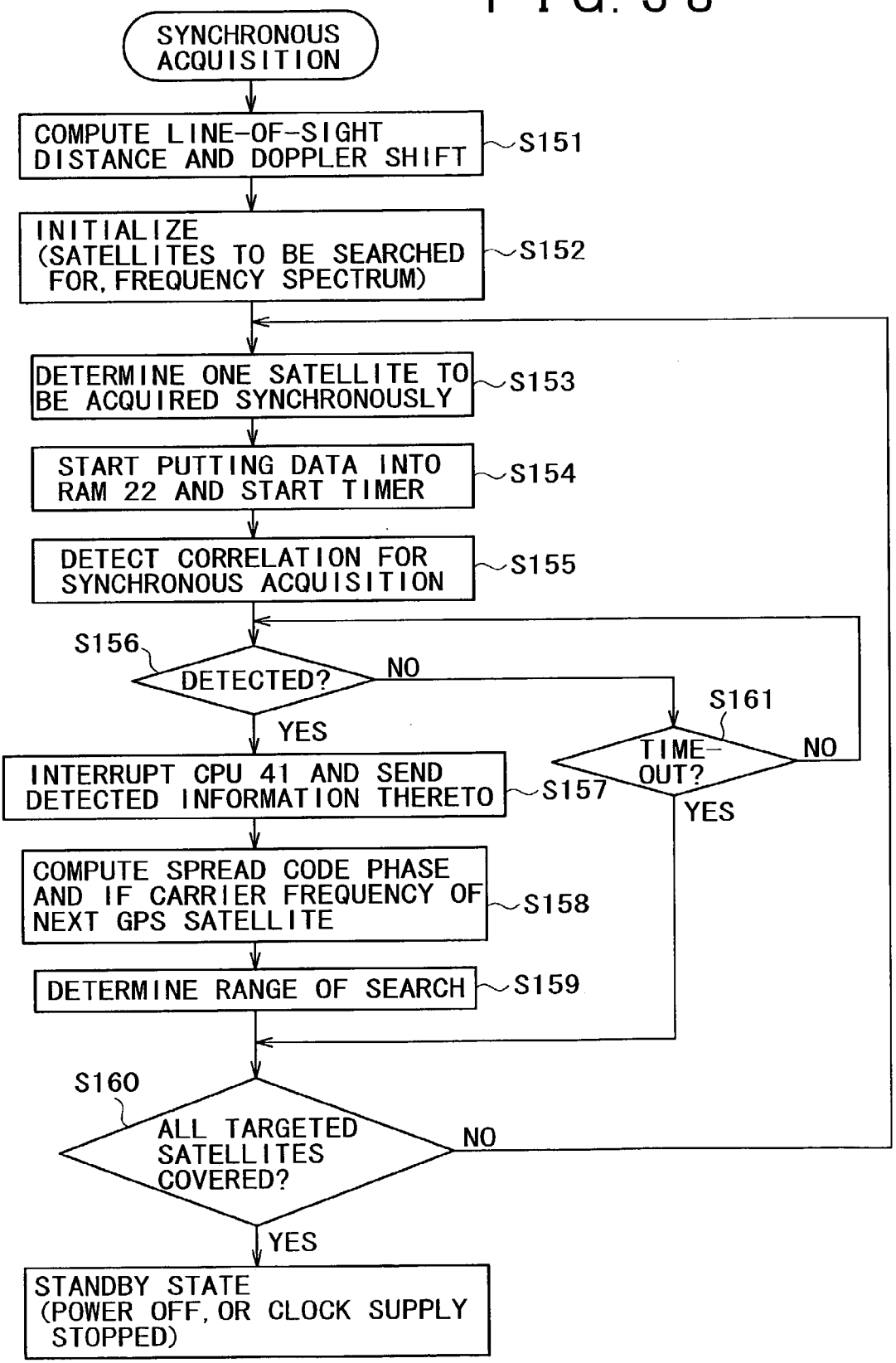
FIG. 38 is a flowchart of steps giving another example of carrying out synchronous acquisition.

FIG. 38 is a flowchart of steps outlining a typical synchronous acquisition process performed by the synchronous acquisition unit 20 in the third example of the synchronous acquisition and hold processing.

In step S151 of FIG. 38, preparatory to starting the synchronous acquisition process, the CPU 41 assumes upon power-up the position of the GPS receiving apparatus to be the currently stored position. Based on that assumption and on GPS satellite orbit information, the CPU 41 estimates approximately the line-of-sight distance and Doppler shift amount regarding each of the GPS satellites that can be acquired by the GPS receiving apparatus.

In step S152, the CPU 41 performs initialization for synchronous acquisition. Specifically, the CPU 41 establishes the GPS satellites to be searched for synchronous acquisition and the sequence of the search on the basis of the effective orbit information stored in the GPS receiving apparatus. The CPU 41 also computes from the orbit information an IF carrier frequency with the Doppler shift taken into account regarding a first GPS satellite in order to establish the center and spectrum of the IF carrier frequency to be searched for.

In step S153 following the initialization, one GPS satellite to be acquired synchronously is set in keeping with the search sequence. This determines both the satellite number of the target satellite to be acquired and the spread code with which correlation is to be detected.

In step S154, the DSP 23 in the synchronous acquisition unit 20 orders the RAM 22 to start receiving the IF data sampled by the sampling circuit 21, and prompts the CPU 41 to start a timer simultaneously with the IF data starting to be set to the memory. The timer used here is the timer 45 in the control unit 40.

In step S155, the DSP 23 performs a correlation detection process on the spread code of the GPS satellite signal set in step S153. The process is carried out using one of the above-described examples of synchronous acquisition involving the digital matched filter.

In step S156, the DSP 23 checks to see whether a correlation is detected with the GPS satellite spread code, i.e., whether the GPS satellite signal is synchronously acquired. If the correlation is judged detected, step S157 is reached. In step S157, the DSP 23 generates an interrupt instruction for the CPU 41, and transfers the results of synchronous acquisition including the GPS satellite number, spread code phase, IF carrier frequency, and signal strength information to the CPU 41.

In step S158, the CPU 41 computes differences of the line-of-sight distance and Doppler shift (i.e., Doppler frequency difference) regarding the next GPS satellite, from the line-of-sight distance and Doppler shift amount estimated in step S151 regarding the GPS satellite currently acquired synchronously. The difference of the line-of-sight distance is converted to a spread code phase difference through division by the speed of light.

The CPU 41 supplements the spread code phase difference and Doppler frequency difference computed regarding the next satellite with the spread code phase and IF carrier frequency of the satellite detected by the synchronous acquisition unit 20 in step S156, regards the sums as the spread code phase and IF carrier frequency of the next satellite, and transfers the results to the DSP 23.

In step S159, upon receipt of the spread code phase and IF carrier frequency about the next satellite from the CPU 41, the DSP 23 establishes the range within which to detect a spread code phase for synchronous acquisition of the next satellite, as well as the range of search for the IF carrier frequency involved.

More specifically, the IF carrier frequency detected upon synchronous acquisition of the first GPS satellite signal is supplemented with the Doppler shift difference received from the CPU 41 to set an approximate range of, say, ±200 Hz for the detection of IF carrier frequencies regarding the second and subsequent GPS satellite signals to be synchronously acquired. The spread code phase detected upon synchronous acquisition of the first GPS satellite signal is supplemented with the spread code phase difference received from the CPU 41 to set an approximate range of, say, ±50 chips for the detection of spread code phases regarding the second and subsequent GPS satellite signals. These settings permit searches for a significant correlation with the next GPS satellite.

In step S160, a check is made to see if the synchronous acquisition search has ended on all GPS satellites to be searched. If there still remains any GPS satellite to be searched, then step S153 is reached again, the next GPS satellite to be acquired synchronously is established, and the synchronous acquisition process is repeated within the ranges set up in step S159.

If in step S160 the synchronous acquisition search is judged to have ended on all GPS satellites to be searched, then the synchronous acquisition process is terminated, and the synchronous acquisition unit 20 is placed in standby mode.

If no correlation is judged detected in step S156, then step S161 is reached. In step S161, a check is made to see if the current state has lasted a predetermined period of time. If the predetermined time period is not judged to have elapsed yet, then step S156 is reached again and correlation detection is continued.

If the predetermined time period is judged to have elapsed in step S161, then step S160 is reached and a check is made to see whether the synchronous acquisition search has ended on all GPS satellites to be searched. If there still remains any GPS satellite to be searched, then step S153 is reached again, the next GPS satellite to be synchronously acquired is set, and the synchronous acquisition process above is repeated. At this point, the search is conducted illustratively within the ranges of search established upon initialization.

If in step S160 the synchronous acquisition search is judged to have ended on all GPS satellites to be searched, then the synchronous acquisition process is terminated, and the synchronous acquisition unit 20 is placed in standby mode.

In standby mode, as discussed above, the CPU 41 turns off the supply of power or of the operation clock signal to the synchronous acquisition unit 20. This prevents wasteful power dissipation of the synchronous acquisition unit 20.

In the third example, as described, the ranges of search for the IF carrier frequency and for the spread code phase are considerably narrowed for synchronous acquisition of the second and subsequent GPS satellites. The time required to detect each of these satellites is reduced significantly compared with the time it took to detect the first satellite.

Whereas all phases with the code length of 1,023 chips must be searched for the first satellite, the range of search for the spread code phase is appreciably limited for the second and subsequent satellites. This increases the probability of eliminating false correlations, which makes it possible to detect the second and subsequent satellites at signal levels lower than that of the first satellite.

In this third example, the synchronous hold unit 30 is controlled in the same manner as in the first example.

The synchronous acquisition unit 20 and synchronous hold unit 30 operate independently of each other. This means that the second and subsequent satellites may be processed by the synchronous acquisition unit 20 using the third example while the synchronous hold unit 30 is allowed to perform its synchronous hold operation parallelly using the second example. The parallel processing scheme, when adopted, raises the speed of processing.

In the third example of the synchronous acquisition and hold processing, it is obvious that any one of the first through the third examples of the method for determining when to start synchronous hold discussed earlier in connection with the third example of the synchronous acquisition and hold processing may be used.

[Process for Handling an Out-of-Synchronous Hold State]

Each of the channels assigned to the synchronous hold unit 30 can maintain synchronism as long as the signal from the corresponding satellite is being received at an appropriate level of signal strength. In practice, however, the reception state of the GPS receiving apparatus changes continuously. Synchronism can be disrupted if the paths of GPS satellite signals are obstructed by buildings or if the signals are disturbed by strong external noises, particularly while the GPS receiving apparatus is on the move. In such cases, synchronization must be restored by acquiring the signals again.

If the out-of-sync state is extremely short, then loop control over the Costas loop 31 and DLL 32 is halted temporarily by turning off the switching circuits 212 and 324 in FIGS. 27 and 28, and then resumed a short time later when the signal strength is returned to normal. This provides instantaneous recovery of synchronism because the spread code phase and IF carrier frequency deviate little in a short time period. Such controls can be limited to the synchronous hold unit 30 alone.

If the out-of-sync state lasts a fairly long time, then the spread code phase and IF carrier frequency may deviate considerably. In that case, the spread code phase and IF carrier frequency with which synchronism was maintained most recently are corrected in a manner compensating for the elapse of time. Synchronous hold processing is then resumed near the spread code phase and IF carrier frequency thus corrected.

Because this embodiment of the invention allows the synchronous acquisition unit 20 and synchronous hold unit 30 to function independently, the synchronous acquisition unit 20 is utilized for re-acquisition of any lost satellite signal. In this case, the synchronous hold unit 30 transfers the spread code phase information through the CPU 41 to the synchronous acquisition unit 20. In turn, the synchronous acquisition unit 20 starts setting the IF data to the RAM 22 in synchronism with the beginning of the spread code in effect immediately before the signal in question was lost.

Consequently, the phase of the spread code desired to be acquired again peaks at about the point in time at which setting of the IF data to the RAM 22 is started. For example, in FIG. 4, the peak appears at the left-hand or right-hand edge of the horizontal axis.

The synchronous hold unit 30 transfers the satellite number and IF carrier frequency of the satellite to be again acquired through the CPU 41 to the synchronous acquisition unit 20. In turn, the synchronous acquisition unit 20 performs a correlation detection process only near the IF carrier frequency, illustratively within ±50 Hz, regarding the satellite in question. In this case, the search for the spread code phase is conducted within a range of, say, ±10 chips.

When the signal strength has recovered, this method will likely allow the synchronous acquisition unit 20 to detect in a very short time the spread code phase and IF carrier frequency of the satellite. Because the scope of the spread code phase to be searched is limited considerably, the probability of false correlations being eliminated is high. This translates into a high possibility of correctly detecting correlations at low signal levels.

If the signal strength has not recovered yet, the IF data are again set to the RAM 22 upon elapse of a predetermined time period (e.g., 1 second=1 millisecond×100), and an attempt is made again to acquire the same satellite synchronously. These steps are repeated until the signal strength recovers, when the synchronous acquisition unit 20 can detect the spread code phase and IF carrier frequency of the GPS satellite in question. What is detected here is handed over to the synchronous hold unit 30, and the synchronous hold state is restored.

Figure 39:
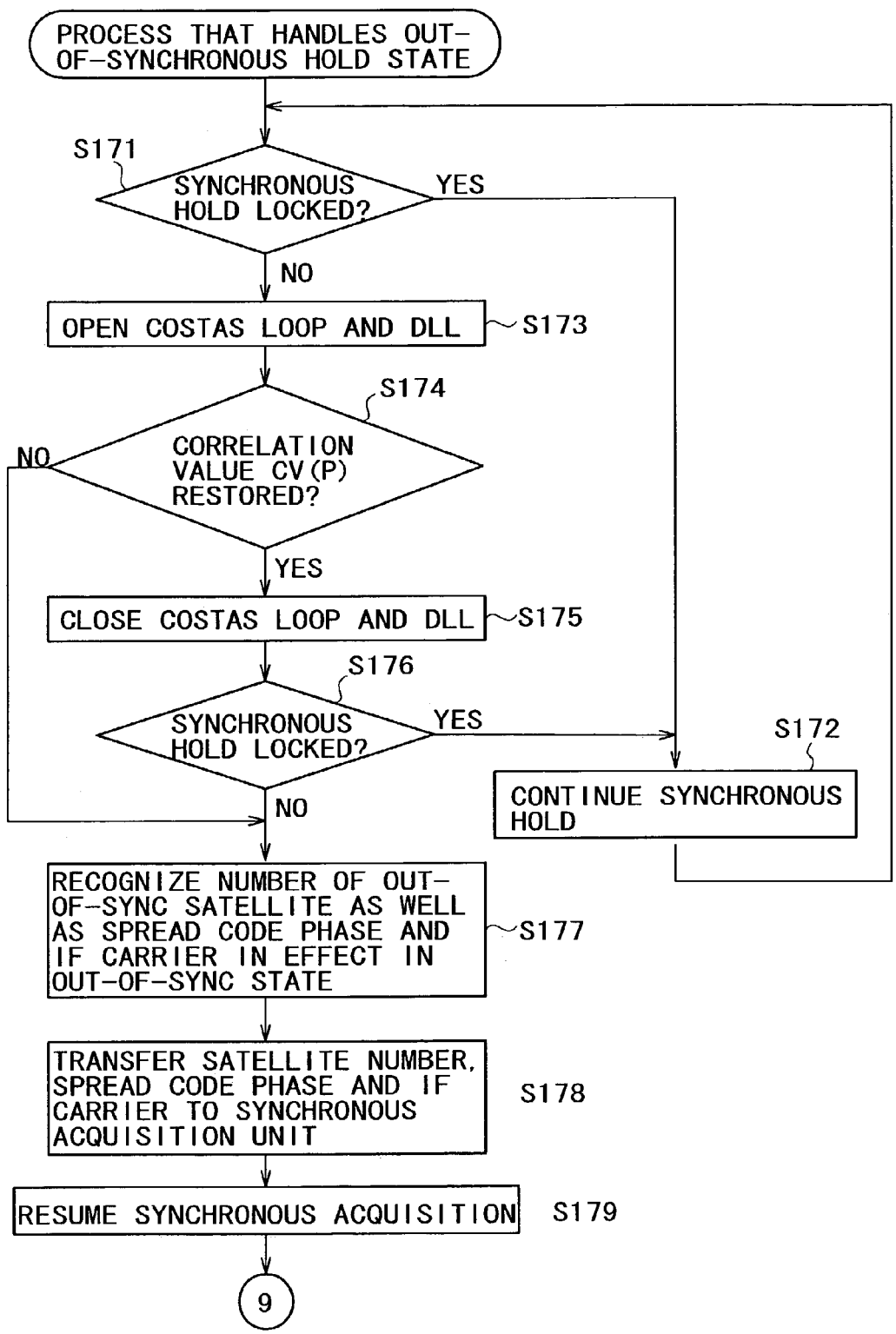
FIG. 39 is a flowchart of steps showing a typical process for handling an out-of-synchronous hold state.
Figure 40:
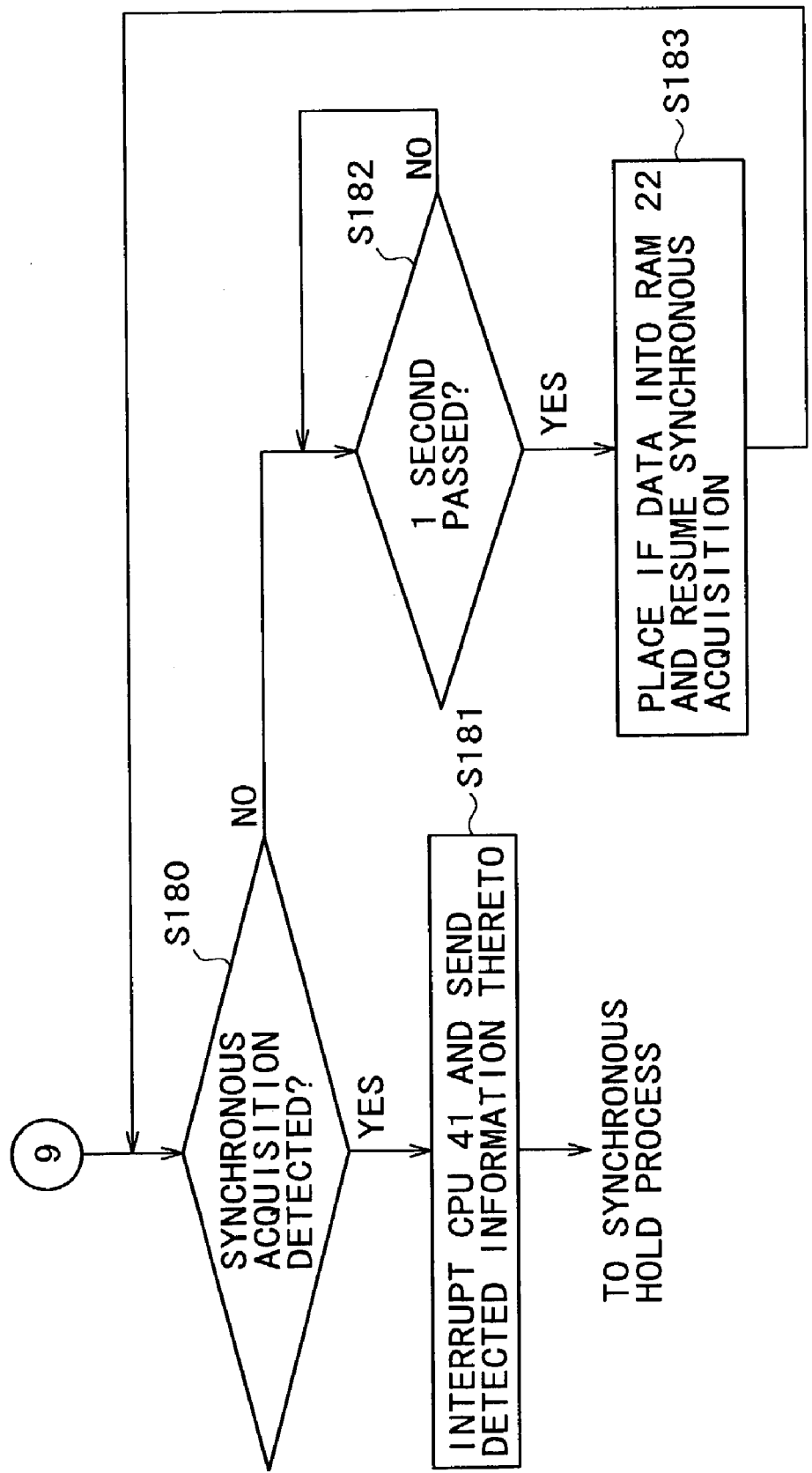
FIG. 40 is another flowchart of steps depicting the process for handling the out-of-synchronous hold state.
Figure 42:
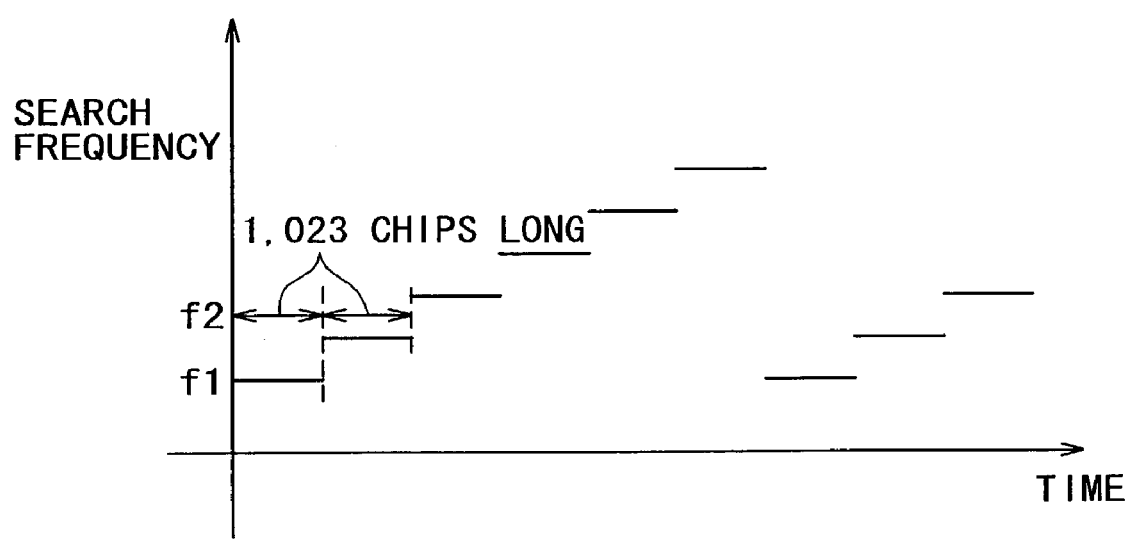
FIG. 42 is a graphic representation explaining how conventionally a carrier and a spread code are synchronized.

FIGS. 39 and 40 are flowcharts of steps performed by the CPU 41 to deal with an out-of-synchronous hold state by taking the above-described circumstances taken into account. These flowcharts apply to a single channel of the synchronous hold unit 30.

In step S171, the CPU 41 checks for an output of the lock discriminator 211 in the Costas loop 31 of the synchronous hold unit 30, verifying whether synchronous hold is being locked. If synchronous hold is judged to be locked, step S172 is reached in which the synchronous hold operation is continued. From step S172, control is returned to step S171, and the check on the state of synchronous hold lock is resumed.

If in step S171 synchronous hold is judged to be unlocked, step S173 is reached. In step S173, the CPU 41 turns off the switching circuits 212 and 324 to break the Costas loop 31 and DLL 32. As mentioned earlier, if the out-of-sync state is short in duration, breaking the loops allows the correlation value CV(P) to return to the significant level.

In step S174, the CPU 41 checks to see if the correlation value CV(P) has recovered to the significant level. If the correlation value CV(P) is judged to be restored to the significant level, then step S175 is reached. In step S175, the switching circuits 212 and 324 are turned on to make the Costas loop 31 and DLL 32. In step S176, the CPU 41 checks to see if synchronous hold is locked. If the state of synchronous hold being locked is detected, then step S172 is reached and the synchronous hold state is sustained.

If in step S176 the synchronous hold locked state is not detected, or if in step S174 the correlation value CV(P) is not judged to have recovered to the significant level, then step S177 is reached. In step S177, the CPU 41 proceeds with synchronous re-acquisition. Specifically, the CPU 41 recognizes the satellite number of the out-of-sync satellite, the phase of the spread code generated by spread code generator 320 in the out-of-sync state, and the IF carrier frequency involved, primarily from the frequency information coming from the applicable channel of the synchronous hold unit 30. In step S178, the satellite number, generated phase of the spread code (starting phase), and IF carrier frequency thus recognized are transferred to the synchronous acquisition unit 20.

In step S179, the synchronous acquisition unit 20 sets the IF data to the RAM. 22 in synchronism with the starting phase of the spread code, and carries out the synchronous acquisition process as described. In step S180 of FIG. 40, a check is made to see if a significant correlation is detected through synchronous acquisition. If in step S180 the significant correlation is judged to be detected, step S181 is reached. In step S181, the DSP 23 gives an interrupt instruction to the CPU 41 along with the spread code phase, IF carrier frequency, signal strength, and satellite number derived from the synchronous acquisition process.

By following the above steps, the CPU 41 prompts the synchronous hold unit 30 to execute the synchronous hold starting process and channel-specific synchronous hold process. This allows the synchronous hold unit 30 to restore the synchronous hold state.

If in step S180 the DSP 23 of the synchronous acquisition unit 20 cannot obtain a significant correlation through synchronous acquisition, then step S182 is reached in which a check is made to see if, say, 1 second has elapsed. Upon elapse of 1 second, step S183 is reached in which the IF data are set to the RAM 22 in synchronism with the starting phase of the spread code as described above before the synchronous acquisition operation is resumed. Control is then returned to step S180, and steps S182 and S183 are repeated until a significant correlation is detected through synchronous acquisition.

With the above steps repeated, the synchronous acquisition unit 20 can detect the spread code phase and IF carrier frequency of a lost GPS satellite when the signal strength of that satellite has recovered. The result of the detection is transferred to the synchronous hold unit 30, and the synchronous hold state is restored.

[Other Embodiments]

With the above-described embodiment, the result of the detection by the synchronous acquisition unit 20 was shown transferred through the CPU 41 to the synchronous hold unit 30. Alternatively, as mentioned earlier, the result may be transferred directly from the synchronous acquisition unit 20 to the synchronous hold unit 30.

With the above embodiment, the synchronous acquisition unit 20 was shown utilizing the digital matched filter. However, the synchronous acquisition unit 20 is not limited in its implementation to the use of a digital matched filter. Alternatively, other arrangements may be made to accomplish what is intended by the invention: that synchronous acquisition of a low precision is taken over by the synchronous acquisition unit so that the result of the acquisition process may be handed over to the synchronous hold unit to minimize the time required to establish synchronism.

The digital matched filter is not limited to the FFT-based type above alone. Alternatively, as mentioned earlier, a transversal filter arrangement may be adopted instead.

As described and according to the invention, the synchronous acquisition process and synchronous hold process are functionally separated for faster synchronous acquisition. The GPS receiving apparatus of the invention takes a shorter time to achieve synchronism with GPS signals than conventional GPS receivers. After power is applied, the inventive GPS receiving apparatus can rapidly display its position and speed.

It has been theoretically unavoidable for conventional GPS receivers, which use the DLL plus Costas loop arrangement for synchronous acquisition, to prolong their processing time when the sensitivity of the receiver is increased. According to the invention, by contrast, synchronous acquisition is accelerated illustratively by use of the digital matched filter while the Costas loops in the synchronous hold unit are narrowed in bandwidths to easily increase sensitivity.

Unlike the conventional method whereby the position of the receiving apparatus is computed every time the FFT-based DSP process is carried out to detect a GPS signal, the synchronous hold unit of the invention can sustain synchronism with the signals from a plurality of GPS satellites in autonomous fashion. This feature is particularly suitable for applications in which the receiver position is to be output in a sustained manner at short time intervals.

Since synchronous acquisition and synchronous hold are functionally separated for faster synchronous acquisition, it takes far less time to acquire any lost signal again than before.

Furthermore, although synchronous acquisition is carried out in a power-consuming DSP process, the time required for synchronous acquisition is limited in practice, and the DSP process is halted the moment the acquisition is accomplished. This means that total power dissipation of the GPS receiving apparatus according to the invention is not appreciably increased despite the use of the DSP process.

As many apparently different embodiments of this invention may be made without departing from the spirit and scope thereof, it is to be understood that the invention is not limited to the specific embodiments thereof except as defined in the appended claims.

What is claimed is:

1. A global positioning system receiving apparatus comprising:
    a synchronous acquisition unit which detects a correlation between a spread code of a received signal from a global positioning system satellite and a spread code provided by the apparatus in order to detect a phase of the spread code of said received signal for synchronous acquisition of said spread code of said received signal, said synchronous acquisition unit further detecting a carrier frequency of said received signal when said spread code of said received signal is acquired synchronously; and
    a synchronous hold unit which has a plurality of channels and which allocates one of said channels to one of a plurality of global positioning system satellites when a spread code of the received signal from the global positioning system satellite in question is synchronously acquired and a carrier frequency of the received signal from the global positioning system satellite in question is detected, said synchronous hold unit further establishing initial values based on the spread code phase of said received signal following detection by said synchronous acquisition unit as well as on the likewise-detected carrier frequency of said received signal, before starting synchronous hold of said spread code and said carrier frequency regarding the signal from the global positioning system satellite in question while decoding the signal from said global positioning system satellite.

2. A global positioning system receiving apparatus according to claim 1, wherein said synchronous hold unit conducts a search for a signal within a range established on the basis of the spread code phase of said received signal and said carrier frequency following detection by said synchronous acquisition unit, said synchronous hold unit further starting a synchronous hold operation on said carrier frequency through a closed loop arrangement when a significant signal strength is detected.

3. A global positioning system receiving apparatus according to claim 1, wherein clock signals for use by said synchronous acquisition unit and said synchronous hold unit are generated by a single oscillator;
    wherein said synchronous acquisition unit sets to a memory said received signal coming from any one of said global positioning system satellites and spanning a predetermined period of time, said synchronous acquisition unit further detecting the spread code phase and said carrier frequency of said received signal with regard to the signal that has been set to said memory; and
    wherein said synchronous hold unit corrects the spread code phase of said received signal in a manner compensating for a time period from the time said synchronous acquisition unit sets to said memory said received signal from the global positioning system satellite in question, until said synchronous acquisition unit detects the spread code phase of said received signal, before starting a synchronous hold operation.

4. A global positioning system receiving apparatus according to claim 1, wherein said synchronous acquisition unit detects a signal strength of said received signal of which the spread code has been acquired synchronously; and
    wherein said synchronous hold unit compares the signal strength of a synchronously held signal with the signal strength of said received signal detected by said synchronous acquisition unit in order to determine whether said synchronously held signal is valid.

5. A global positioning system receiving apparatus according to claim 1, wherein said synchronous acquisition unit detects a signal strength of said received signal of which the spread code has been acquired synchronously; and
    wherein said synchronous hold unit establishes frequency characteristics of a filter arrangement in a synchronous hold loop based on the signal strength of said received signal detected by said synchronous acquisition unit.

6. A global positioning system receiving apparatus according to claim 1, wherein, every time said synchronous acquisition unit detects a spread code phase and a carrier frequency of a received signal from any one global positioning system satellite, said synchronous acquisition unit outputs information about the detected spread code phase and carrier frequency of said received signal; and
    wherein, every time said synchronous hold unit receives either said information about said spread code phase and said carrier frequency of said received signal or information based on said spread code phase and said carrier frequency from said synchronous acquisition unit, said synchronous hold unit has a different channel assigned and starts a synchronous hold operation successively.

7. A global positioning system receiving apparatus according to claim 1, further comprising a control unit for generating information to be sent to said synchronous hold unit, said information being generated on the basis of information about said spread code phase and said carrier frequency of said received signal following detection by said synchronous acquisition unit.

8. A global positioning system receiving apparatus according to claim 7, further comprising a memory for storing orbit information about said global positioning system satellites, said memory being accessible from said control unit;
    wherein, based on the information about said spread code phase and said carrier frequency of said received signal from one global positioning system satellite following detection by said synchronous acquisition unit, said control unit generates setting information to be sent to a channel assigned to said synchronous hold unit regarding said one global positioning system satellite and feeds the generated setting information to said synchronous hold unit; said control unit further referencing said information about said spread code phase and said carrier frequency of said received signal from said one global positioning system satellite as well as said orbit information stored in said memory in order to generate the setting information for synchronously holding the received signal from another global positioning system satellite and to send the generated setting information to another channel of said synchronous hold unit.

9. A global positioning system receiving apparatus according to claim 7, further comprising a memory for storing orbit information about said global positioning system satellites, said memory being accessible from said control unit;

wherein, based on said orbit information stored in said memory, said control unit computes error information about the carrier frequency of a global positioning system satellite in a receivable position and either a line-of-sight distance or a line-of-sight distance error regarding the global positioning system satellite in question, and supplies results of the computation to said synchronous acquisition unit;

wherein, after detecting the spread code phase and the carrier frequency of said received signal from one global positioning system satellite and upon receipt of information from said control unit as well as the information about the detected spread code phase and carrier frequency of said received signal from said one global positioning system satellite, said synchronous acquisition unit estimates a carrier frequency and a spread code phase of the received signal from another receivable global positioning system satellite in order to acquire synchronously the received signal from said another receivable global positioning system satellite near the estimated carrier frequency and spread code phase.

10. A global positioning system receiving apparatus according to claim 1, wherein said synchronous acquisition unit acquires synchronously the received signals from a number of global positioning system satellites large enough for positioning computation, before getting deprived of either a power voltage or a clock signal supplied to said synchronous acquisition unit.

11. A global positioning system receiving apparatus according to claim 1, wherein, if said synchronous hold unit loses a synchronous hold state, then said synchronous hold unit transfers to said synchronous acquisition unit information about each of the global positioning system satellites that were held synchronously as well as information about the spread code phase and the carrier frequency of each global positioning system satellite having been synchronously held; and wherein, based on the information transferred from said synchronous hold unit, said synchronous acquisition unit conducts search for synchronous acquisition near the spread code phase and carrier frequency of each of the received signals from the global positioning system satellites that were held synchronously, and transfers to said synchronous hold unit information about the detected spread code phase and carrier frequency from the search preparatory to resuming the synchronous hold operation.

12. A global positioning system receiving apparatus according to claim 1, wherein said synchronous acquisition unit multiples a result of a fast Fourier transform of the received signal from each of said global positioning system satellites by a result of a fast Fourier transform of said spread code used in said received signal from the global positioning system satellite in question, said synchronous acquisition unit further detecting the spread code phase and carrier frequency of said received signal from each of said global positioning system satellites on the basis of the result of the multiplication.

13. A global positioning system receiving apparatus according to claim 12, wherein said synchronous acquisition unit includes:

fast Fourier transformation means for performing a fast Fourier transform of said received signal from each of said global positioning system satellites;

a first memory to which to write the result of the fast Fourier transform sent from said fast Fourier transformation means;

a second memory which stores the result of the fast Fourier transform of said spread code used in said received signal from each of said global positioning system satellites;

multiplying means for multiplying the result of the fast Fourier transform retrieved from said first memory, by the result of the fast Fourier transform of said spread code following retrieval from said second memory;

memory controlling means for shifting a memory address by an amount reflecting said carrier frequency before reading either the result of the fast Fourier transform of said received signal or the result of the fast Fourier transform of said spread code, from the shifted address within said first memory or said second memory respectively;

inverse fast Fourier transformation means for performing an inverse fast Fourier transform of the result of the multiplication from said multiplying means in order to output a correlation detected between said received signal and said spread code; and correlation point detecting means for detecting a correlation point between said received signal and said spread code by searching for a peak of correlation between said received signal and said spread code based on the output of correlation detection from said inverse fast Fourier transformation means.

14. A global positioning system receiving apparatus according to claim 12, wherein said synchronous acquisition unit includes:

fast Fourier transformation means for performing a fast Fourier transform of said received signal from each of said global positioning system satellites;

a first memory to which to write the result of the fast Fourier transform sent from said fast Fourier transformation means;

a second memory which stores the result of the fast Fourier transform of said spread code used in said received signal from each of said global positioning system satellites;

multiplying means for multiplying the result of the fast Fourier transform retrieved from said first memory, by the result of the fast Fourier transform of said spread code following retrieval from said second memory;

inverse fast Fourier transformation means for performing an inverse fast Fourier transform of the result of the multiplication from said multiplying means in order to output a correlation detected between said received signal and said spread code; and correlation point detecting means for detecting a correlation point between said received signal and said spread code by searching for a peak of said correlation based on the output of correlation detection from said inverse fast Fourier transformation means while shifting a memory address from which to read either the result of the fast Fourier transform of said received signal or the result of the fast Fourier transform of said spread code from within said first memory or said second memory respectively.

15. A global positioning system receiving apparatus according to claim 12, wherein the fast Fourier transform of said received signal and the fast Fourier transform of said spread code are performed at intervals of M periods of said spread code, M being at least 2 to the n-th power, n being an integer.

16. A global positioning system receiving apparatus according to claim 15, wherein, upon carrying out the fast Fourier transform of said received signal from any one of said global positioning system satellites, said synchronous acquisition unit obtains a number of data spanning one period of said spread code by preprocessing the data which constitute said received signal from the global positioning system satellite in question and which span M periods of said spread code, M being at least 2 to the n-th power, n being an integer, said synchronous acquisition unit further performing a fast Fourier transform of the data spanning one period of said spread code resulting from said preprocessing.

17. A global positioning system receiving apparatus according to claim 16, wherein said preprocessing involves executing an algorithm for computing a subset composed of S[0], . . . S[N−1] in a Fourier transform, N being the number of data making up the received signal which comes from said global positioning system satellite and which spans M periods of said spread code, said subset being part of the data composed of d[0], . . . d[MN−1] making up said received signal; and wherein it is assumed that S[k]=D[k·times·M+r], where D represents a Fourier transform of data d; k denotes 0, 1, . . . , N−1; and r stands for a constant based on a Doppler frequency, provided 0.1toreq·r<M.

18. A global positioning system receiving apparatus according to claim 16, wherein, if the total number of data constituting said received signal from said global positioning system satellite and spanning M periods of said spread code is denoted by MN, then said preprocessing involves regarding every M data elements as one word to be stored into a memory, so that said memory stores M words making up the data which constitute said received signal from said global positioning system satellite and which span the M periods of said spread code, before a fast Fourier transform is performed on the data placed in said memory on a word by word basis.

19. A global positioning system receiving apparatus comprising:
a preprocessing unit which, given a received signal with a carrier modulated by a signal having data spread-spectrum-encoded by a spread code, preprocesses the data that span M periods of said spread code in order to obtain a number of data spanning one period of said spread code, M being at least 2 to the n-th power, n being an integer;
fast Fourier transformation means for performing a fast Fourier transform of the received signal data spanning one period of said spread code following the preprocessing;
a first memory to which to write the result of the fast Fourier transform sent from said fast Fourier transformation means;
a second memory which stores the result of the fast Fourier transform of said spread code used in said received signal;
multiplying means for multiplying the result of the fast Fourier transform retrieved from said first memory, by the result of the fast Fourier transform of said spread code following retrieval from said second memory;
inverse fast Fourier transformation means for performing an inverse fast Fourier transform of the result of the multiplication from said multiplying means in order to output a correlation detected between said received signal and said spread code; and
correlation point detecting means for detecting a correlation point between said received signal and said spread code by searching for a peak of correlation between said received signal and said spread code based on the output of correlation detection from said inverse fast Fourier transformation means;
wherein said preprocessing unit executes an algorithm for computing a subset composed of SF[0], . . . S[N−1] in a Fourier transform, N being the number of data making up the received signal which comes from a global positioning system satellite and which spans M periods of said spread code, said subset being part of the data composed of d[0], . . . d[MN−1] making up said received signal; and
wherein it is assumed that S[k]=D[k·times·M+r], where D represents a Fourier transform of data d; k denotes 0, 1, . . . , N−1; and r stands for a constant based on a Doppler frequency, provided 0.1toreq·r<M.

20. A global positioning system receiving apparatus according to claim 19, wherein, if the total number of data constituting said received signal from a global positioning system satellite and spanning M periods of said spread code is denoted by MN, then said preprocessing unit regards every M data elements as one word to be stored into a memory, so that said memory stores M words making up the data which constitute said received signal from said global positioning system satellite and which span the M periods of said spread code, before a fast Fourier transform is performed on the data placed in said memory on a word by word basis.

21. A global positioning system satellite signal receiving method comprising the steps of:
performing synchronous acquisition by detecting a correlation between a spread code of a received signal from a global positioning system satellite and a spread code provided by a receiving side in order to detect a phase of the spread code of said received signal for synchronous acquisition of said spread code of said received signal, said synchronous acquisition step further detecting a carrier frequency of said received signal when said spread code of said received signal is acquired synchronously; and
performing synchronous hold by allocating one of a plurality of channels to any one of a plurality of global positioning system satellites when a spread code of the received signal from the global positioning system satellite in question is synchronously acquired and a carrier frequency of the received signal from the global positioning system satellite in question is detected, said synchronous hold step further establishing initial values based on the spread code phase of said received signal following detection in said synchronous acquisition step as well as on the likewise-detected carrier frequency of said received signal, before starting synchronous hold of said spread code and said carrier frequency regarding the signal from the global positioning system satellite in question while decoding the signal from said global positioning system satellite.

22. A global positioning system satellite signal receiving method according to claim 21, wherein said synchronous hold step conducts a search for a signal within a range established on the basis of the spread code phase of said received signal and said carrier frequency following detection in said synchronous acquisition step, said synchronous hold step further starting a synchronous hold operation on said carrier frequency through a closed loop arrangement when a significant signal strength is detected.

23. A global positioning system satellite signal receiving method according to claim 21, wherein clock signals for use in said synchronous acquisition step and said synchronous hold step are generated by a single oscillator;
wherein said synchronous acquisition step sets to a memory said received signal which comes from any one of said global positioning system satellites and which spans a predetermined period of time, said synchronous acquisition step further detecting the spread code phase and said carrier frequency of said received signal with regard to the signal that has been set to said memory; and
wherein said synchronous hold step corrects the spread code phase of said received signal in a manner compensating for a time period from the time said synchronous acquisition step sets to said memory said received signal from the global positioning system satellite in question, until said synchronous acquisition step detects the spread code phase of said received signal, before starting a synchronous hold operation.

24. A global positioning system satellite signal receiving method according to claim 21, wherein said synchronous acquisition step detects a signal strength of said received signal of which the spread code has been acquired synchronously; and
wherein said synchronous hold step compares the signal strength of a synchronously held signal with the signal strength of said received signal detected in said synchronous acquisition step in order to determine whether said synchronously held signal is valid.

25. A global positioning system satellite signal receiving method according to claim 21, wherein said synchronous acquisition step detects a signal strength of said received signal of which the spread code has been acquired synchronously; and
wherein said synchronous hold step establishes frequency characteristics of a filter arrangement in a synchronous hold loop based on the signal strength of said received signal detected in said synchronous acquisition step.

26. A global positioning system satellite signal receiving method according to claim 21, wherein, every time said synchronous acquisition step detects a spread code phase and a carrier frequency of a received signal from any one global positioning system satellite, said synchronous acquisition step outputs information about the detected spread code phase and carrier frequency of said received signal; and
wherein, every time said synchronous hold step receives either said information about said spread code phase and said carrier frequency of said received signal or information based on said spread code phase and said carrier frequency from said synchronous acquisition step, said synchronous hold step has a different channel assigned and starts a synchronous hold operation successively.

27. A global positioning system satellite signal receiving method according to claim 21, and for use with a memory for storing orbit information about said global positioning system satellites, the method further comprising the step of:
generating initial setting information used for synchronously holding said received signal from said one global positioning system satellite in said synchronous hold step, based on the information about said spread code phase and said carrier frequency of said received signal from one global positioning system satellite following detection in said synchronous acquisition step; said initial setting generating step further referencing said information about said spread code phase and said carrier frequency of said received signal from said one global positioning system satellite as well as said orbit information stored in said memory in order to generate initial setting information for synchronously holding the received signal from another global positioning system satellite.

28. A global positioning system satellite signal receiving method according to claim 21, and for use with a memory for storing orbit information about said global positioning system satellites, said memory being accessible from a control unit, the method further comprising the step of:
effecting control by computing error information about the carrier frequency of a global positioning system satellite in a receivable position and either a line-of-sight distance or a line-of-sight distance error regarding the global positioning system satellite in question based on said orbit information stored in said memory, before transferring results of the computation to said synchronous acquisition step for use therein;
wherein, after detecting the spread code phase and the carrier frequency of said received signal from one global positioning system satellite and upon receipt of the information computed in said control step as well as the information about the detected spread code phase and carrier frequency of said received signal from said one global positioning system satellite, said synchronous acquisition step estimates a carrier frequency and a spread code phase of the received signal from another receivable global positioning system satellite in order to acquire synchronously the received signal from said another receivable global positioning system satellite near the estimated carrier frequency and spread code phase.

29. A global positioning system satellite signal receiving method according to claim 21, further comprising the steps of:
if said synchronous hold step loses a synchronous hold state, then performing repeat synchronous acquisition involving a search for synchronous acquisition of a spread code phase and a carrier frequency of a satellite signal based on information about the global positioning system satellites that were held synchronously as well as on the spread code phase and carrier frequency of said received signal from each of said global positioning system satellites having been held synchronously, said search being conducted near the spread code phase and the carrier frequency of each global positioning system satellite that was synchronously held; and
effecting repeat synchronous hold comprising resumption of the synchronous hold operation following said repeat synchronous acquisition step and based on information about the detected spread code phase and carrier frequency.

30. A global positioning system satellite signal receiving method according to claim 21, wherein said synchronous acquisition step multiples a result of a fast Fourier transform of the received signal from each of said global positioning system satellites by a result of a fast Fourier transform of said spread code used in said received signal from the global positioning system satellite in question, said synchronous acquisition step further detecting the spread code phase and carrier frequency of said received signal from each of said global positioning system satellites on the basis of the result of the multiplication.

31. A global positioning system satellite signal receiving method according to claim 30, wherein said synchronous acquisition step further comprises the steps of:
performing a fast Fourier transform of said received signal from each of said global positioning system satellites before writing the result of the fast Fourier transform to a first memory;
multiplying the result of the fast Fourier transform retrieved from said first memory, by the result of the fast Fourier transform of said spread code used in said received signal from each of said global positioning system and retrieved from a second memory;
performing memory control by shifting a memory address by an amount reflecting said carrier frequency before reading either the result of the fast Fourier transform of said received signal or the result of the fast Fourier transform of said spread code, from the shifted address within said first memory or said second memory respectively;
performing an inverse fast Fourier transform of the result of the multiplication from said multiplying step in order to output a correlation detected between said received signal and said spread code; and
detecting a correlation point between said received signal and said spread code by searching for a peak of correlation between said received signal and said spread code based on the output of correlation detection from said inverse fast Fourier transformation step.

32. A global positioning system satellite signal receiving method according to claim 30, wherein said synchronous acquisition step further comprises the steps of:
performing a fast Fourier transform of said received signal from each of said global positioning system satellites before writing the result of the fast Fourier transform to a first memory;
multiplying the result of the fast Fourier transform retrieved from said first memory, by the result of the fast Fourier transform of said spread code used in said received signal from each of said global positioning system and retrieved from a second memory;
performing an inverse fast Fourier transform of the result of the multiplication from said multiplying step in order to output a correlation detected between said received signal and said spread code; and
detecting a correlation point between said received signal and said spread code by searching for a peak of said correlation based on the output of correlation detection from said inverse fast Fourier transformation step while shifting a memory address from which to read either the result of the fast Fourier transform of said received signal or the result of the fast Fourier transform of said spread code from within said first memory or said second memory respectively.

33. A global positioning system satellite signal receiving method according to claim 30, wherein the fast Fourier transform of said received signal and the fast Fourier transform of said spread code are performed at intervals of M periods of said spread code, M being at least 2 to the n-th power, n being an integer.

34. A global positioning system satellite signal receiving method according to claim 33, wherein, upon carrying out the fast Fourier transform of said received signal from any one of said global positioning system satellites, said synchronous acquisition step obtains a number of data spanning one period of said spread code by preprocessing the data which constitute said received signal from the global positioning system satellite in question and which span M periods of said spread code, M being at least 2 to the n-th power, n being an integer, said synchronous acquisition step further performing a fast Fourier transform of the data spanning one period of said spread code resulting from said preprocessing.

35. A global positioning system satellite signal receiving method according to claim 34, wherein said preprocessing involves executing an algorithm for computing a subset composed of $S[0], \ldots S[N-1]$ in a Fourier transform, N being the number of data making up the received signal which comes from said global positioning system satellite and which spans M periods of said spread code, said subset being part of the data composed of $d[0], \ldots d[MN-1]$ making up said received signal; and
wherein it is assumed that $S[k]=D[k \cdot \text{times} \cdot M+r]$, where D represents a Fourier transform of data d; k denotes 0, 1, ..., N−1; and r stands for a constant based on a Doppler frequency, provided $0 \text{toreq} \cdot r < M$.

36. A global positioning system satellite signal receiving method according to claim 34, wherein, if the total number of data constituting said received signal from said global positioning system satellite and spanning M periods of said spread code is denoted by MN, then said preprocessing involves regarding every M data elements as one word to be stored into a memory, so that said memory stores M words making up the data which constitute said received signal from said global positioning system satellite and which span the M periods of said spread code, before a fast Fourier transform is performed on the data placed in said memory on a word by word basis.

37. A global positioning system satellite signal receiving method comprising the steps of:
given a received signal with a carrier modulated by a signal having data spread-spectrum-encoded by a spread code, preprocessing the data that span M periods of said spread code in order to obtain a number of data spanning one period of said spread code, M being at least 2 to the n-th power, n being an integer;
performing a fast Fourier transform of the received signal data spanning one period of said spread code following the preprocessing;
writing to a first memory the result of the fast Fourier transform sent from said fast Fourier transformation step;
writing to a second memory the result of the fast Fourier transform of said spread code used in said received signal;
multiplying the result of the fast Fourier transform retrieved from said first memory, by the result of the fast Fourier transform of said spread code following retrieval from said second memory;
performing an inverse fast Fourier transform of the result of the multiplication from said multiplying step in order to output a correlation detected between said received signal and said spread code; and
detecting a correlation point between said received signal and said spread code by searching for a peak of correlation between said received signal and said spread code based on the output of correlation detection from said inverse fast Fourier transformation step;
wherein said preprocessing unit executes an algorithm for computing a subset composed of $SF[0], \ldots S[N-1]$ in a Fourier transform, N being the number of data making up the received signal which comes from a global positioning system satellite and which spans M periods of said spread code, said subset being part of the data composed of d[0], . . . d[MN−1] making up said received signal; and wherein it is assumed that S[k]=D[k·times·M+r], where D represents a Fourier transform of data d; k denotes 0, 1, . . . , N−1; and r stands for a constant based on a Doppler frequency, provided 0.1toreq·r<M.

38. A global positioning system satellite signal receiving method according to claim 37, wherein, if the total number of data constituting said received signal from a global positioning system satellite and spanning M periods of said spread code is denoted by MN, then said preprocessing step regards every M data elements as one word to be stored into a memory, so that said memory stores M words making up the data which constitute said received signal from said global positioning system satellite and which span the M periods of said spread code, before a fast Fourier transform is performed on the data placed in said memory on a word by word basis.

* * * * *